United States Patent
Barakat et al.

(10) Patent No.: US 12,250,315 B2
(45) Date of Patent: Mar. 11, 2025

(54) COMPUTER NETWORK SYSTEMS FOR CRYPTOGRAPHICALLY-SECURED, TOKEN-BASED OPERATIONS AND METHODS OF USE THEREOF

(71) Applicant: Broadridge Financial Solutions, Inc., Lake Success, NY (US)

(72) Inventors: Horacio Barakat, New York, NY (US); Harsha Kolagani, Hyderabad (IN); Kishore Seshagiri, Hyderabad (IN); Ashfaq Shaik, Hyderabad (IN); John Garahan, Annandale, NJ (US); Vijay Mayadas, New York, NY (US); Michael McMahon, Jersey City, NJ (US)

(73) Assignee: Broadridge Financial Solutions, Inc., Lake Success, NY (US)

( * ) Notice: Subject to any disclaimer, the term of this patent is extended or adjusted under 35 U.S.C. 154(b) by 0 days.

(21) Appl. No.: 18/186,753

(22) Filed: Mar. 20, 2023

(65) Prior Publication Data
US 2023/0318834 A1  Oct. 5, 2023

Related U.S. Application Data

(63) Continuation of application No. 17/706,438, filed on Mar. 28, 2022, now Pat. No. 11,611,438.
(Continued)

(51) Int. Cl.
*H04L 29/06*    (2006.01)
*G06F 16/16*    (2019.01)
(Continued)

(52) U.S. Cl.
CPC .......... *H04L 9/3213* (2013.01); *G06F 16/162* (2019.01); *H04L 9/3236* (2013.01); *H04L 9/38* (2013.01); *H04L 9/50* (2022.05)

(58) Field of Classification Search
CPC ............... G06F 16/162; G06F 21/562; G06F 2221/2119; H04L 9/3263; H04L 2209/64;
(Continued)

(56) References Cited

U.S. PATENT DOCUMENTS 8,447,983 B1   5/2013   Beck et al.
9,967,238 B1   5/2018   Hogan et al.
(Continued)

OTHER PUBLICATIONS

International Search Report and Written Opinion from International Application No. PCT/US2022/022212 dated Jul. 5, 2022.
(Continued)

*Primary Examiner* — Tri M Tran
(74) *Attorney, Agent, or Firm* — GREENBERG TRAURIG, LLP

(57) ABSTRACT

Systems and methods of the present disclosure enable reversible blockchain operations. An operation-reverse operation pair specifies an operation for exchange of a first token for a second token, and a reverse operation for return of the second token for the first token upon at least one condition being satisfied. A self-executing software container (SESC) executes the operation-reverse operation pair according to the condition by detecting a transfer of the first token into a first segregated data structure, and a transfer of the second token from a second token storage to a first token storage. The SESC initiates a transfer of the first token from the first segregated data structure to a second segregated data structure in response to the transfer of the second token. Upon detecting a reverse operation matching the condition, the SESC initiates a transfer of the first token back to the first segregated data structure.

20 Claims, 34 Drawing Sheets

Related U.S. Application Data

(60) Provisional application No. 63/166,917, filed on Mar. 26, 2021.

(51) Int. Cl.
    *H04L 9/32*     (2006.01)
    *H04L 9/00*     (2022.01)
    *H04L 9/38*     (2006.01)

(58) Field of Classification Search
    CPC ..... H04L 9/3213; H04L 2209/56; H04L 9/50; H04L 9/38
    See application file for complete search history.

(56) References Cited

U.S. PATENT DOCUMENTS

| | | | |
|---|---|---|---|
| 11,501,370 B1* | 11/2022 | Paya | G06Q 20/3676 |
| 2008/0046734 A1 | 2/2008 | Kilian-Kehr | |
| 2019/0340609 A1 | 11/2019 | Mayadas et al. | |
| 2019/0370811 A1 | 12/2019 | Zhang et al. | |
| 2021/0073913 A1* | 3/2021 | Ingargiola | H04L 67/104 |
| 2021/0119807 A1* | 4/2021 | Chen | H04L 9/3242 |

OTHER PUBLICATIONS

Ouaddah et al., "FariAccess: a new Blockchain-based access control framework for the Internet of Things", Security and Communication Networks, 2017.

* cited by examiner

COMPUTER NETWORK SYSTEMS FOR CRYPTOGRAPHICALLY-SECURED, TOKEN-BASED OPERATIONS AND METHODS OF USE THEREOF

FIELD OF TECHNOLOGY

The subject matter herein generally relates to database-centered computer network systems and computer-implemented methods for cryptographically-secured distributed data operations including the secured management of data operations across multiple parties.

BACKGROUND OF TECHNOLOGY

A computer network system may include a group of computer systems and other computing hardware devices that are linked together through communication channels to facilitate communication and resource-sharing among a wide range of users.

SUMMARY OF THE DISCLOSURE

In some aspects, the techniques described herein relate to a method including: receiving, by at least one processor, an activity initiation request from a first client device associated with a first user; wherein the activity initiation request includes: at least one operation for exchange of a first token type for a second token type, and at least one reverse operation for exchange of the second token type for the first token type upon at least one condition being satisfied; wherein the first token type includes a first cryptographic hash on a blockchain; wherein the second token type includes a second cryptographic hash on the blockchain; wherein the first client device is a node on the blockchain; receiving, by the at least one processor, an activity initiation response from a second client device associated with a second user; wherein the activity initiation response indicates an acceptance of the activity initiation request; wherein the second client device is a node on a blockchain; generating, by the at least one processor, at least one self-executing software container (SESC) on the blockchain; wherein the at least one SESC includes a plurality of instructions for execution of the at least one operation and the at least one reverse operation based at least in part on the at least one condition; wherein the plurality of instruction of the at least one SESC are configured to: detect a transfer of the first token type into a first segregated token storage; wherein the first segregated data structure is associated with a first segregated data structure of a third-party entity; wherein the first client device has permissions to access the first segregated token storage; wherein the first segregated data structure includes a schema configured to store the first token type; detect a transfer of the second token type from a second token storage associated with the second client device to a first token storage associated with the first client device; automatically initiate a transfer of the first token type from the first segregated data structure to a second segregated token storage in response to the transfer of the second token type; wherein the second segregated token storage is associated with a second segregated data structure of the third-party entity; wherein the second client device has condition-dependent permissions to access the second segregated token storage; wherein the first segregated data structure includes a schema configured to store the first token type; detect at least one reverse operation matching the at least one condition; and initiate a transfer of the first token type from the second segregated token storage back to the first segregated token storage.

In some aspects, the techniques described herein relate to a method, wherein the activity initiation request includes activity parameters including at least one of: a first token transfer amount associated with the first token type, a second token transfer amount associated with the second token type, at least one condition identifier identifying the at least one condition, a time identifier identifying a time limit to satisfy the at least one condition, a first client device identifier identifying the first client device, or a second client device identifier identifying the second client device.

In some aspects, the techniques described herein relate to a method, further including: generating, by the at least one processor, at least one instruction of the plurality of instructions based at least in part on each activity parameter of the activity parameters; and generating, by the at least one processor, the at least one SESC based at least in part on the plurality of instructions.

In some aspects, the techniques described herein relate to a method, further including: determining, by the at least one processor, a first token stored amount of the first token type in a first token storage associated with the first client device; generating, by the at least one processor, a segregated first token type having the first token transfer amount; generating, by the at least one processor, a stored first token type having an updated first token stored amount of the first token stored amount less the first token transfer amount; deleting, by the at least one processor, the first token stored amount of the first token type from the first token storage; adding, by the at least one processor, the updated first token stored amount to the first token storage; and transferring, by the at least one processor, the first token transfer amount of the first token type into a first segregated token storage.

In some aspects, the techniques described herein relate to a method, further including: receiving, by the at least one processor, an asset-linked data segregation message including an indication of a movement of a first asset-linked data into the first segregated data structure; and generating, by the at least one processor, the first token type in the first segregated token storage to represent the first asset-linked data in the first segregated data structure.

In some aspects, the techniques described herein relate to a method, further including: receiving, by the at least one processor, an asset-linked data provision message including an indication of a provision of a second asset-linked data in a second client data structure; wherein the second client data structure includes a schema configured to store the second asset-linked data; and generating, by the at least one processor, the second token type in a second client token storage to represent the second asset-linked data in the second client data structure.

In some aspects, the techniques described herein relate to a method, wherein the first client device, the second client device and the third-party entity are associated with a particular entity; and wherein the first segregated data structure and the second segregated data structure are the same segregated data structure.

In some aspects, the techniques described herein relate to a method, further including instructing, by the at least one processor, at least one display associated with the first client device to render a second token type receipt notification indicating receipt of the second token type in the first token storage.

In some aspects, the techniques described herein relate to a method, further including: receiving, by the at least one processor, at least one first token type return request from the first client device; wherein the first token type return request includes a return of the second token type according to the at least one condition; and initiating, by the at least one processor, the at least one reverse operation.

In some aspects, the techniques described herein relate to a method, further including instructing, by the at least one processor, at least one display associated with the first client device to render a first token type return notification indicating receipt of the first token type in the first segregated token storage.

In some aspects, the techniques described herein relate to a system including: at least one processor configured to execute software instructions, wherein the software instructions, upon execution, cause the at least one processor to perform steps to: receive activity initiation request from a first client device associated with a first user; wherein the activity initiation request includes: at least one operation for exchange of a first token type for a second token type, and at least one reverse operation for exchange of the second token type for the first token type upon at least one condition being satisfied; wherein the first token type includes a first cryptographic hash on a blockchain; wherein the second token type includes a second cryptographic hash on the blockchain; wherein the first client device is a node on the blockchain; receive an activity initiation response from a second client device associated with a second user; wherein the activity initiation response indicates an acceptance of the activity initiation request; wherein the second client device is a node on a blockchain; generate at least one self-executing software container (SESC) on the blockchain; wherein the at least one SESC includes a plurality of instructions for execution of the at least one operation and the at least one reverse operation based at least in part on the at least one condition; wherein the plurality of instruction of the at least one SESC are configured to: detect a transfer of the first token type into a first segregated token storage; wherein the first segregated data structure is associated with a first segregated data structure of a third-party entity; wherein the first client device has permissions to access the first segregated token storage; wherein the first segregated data structure includes a schema configured to store the first token type; detect a transfer of the second token type from a second token storage associated with the second client device to a first token storage associated with the first client device; automatically initiate a transfer of the first token type from the first segregated data structure to a second segregated token storage in response to the transfer of the second token type; wherein the second segregated token storage is associated with a second segregated data structure of the third-party entity; wherein the second client device has condition-dependent permissions to access the second segregated token storage; wherein the first segregated data structure includes a schema configured to store the first token type; detect at least one reverse operation matching the at least one condition; and initiate a transfer of the first token type from the second segregated token storage back to the first segregated token storage.

In some aspects, the techniques described herein relate to a system, wherein the activity initiation request includes activity parameters including at least one of: a first token transfer amount associated with the first token type, a second token transfer amount associated with the second token type, at least one condition identifier identifying the at least one condition, a time identifier identifying a time limit to satisfy the at least one condition, a first client device identifier identifying the first client device, or a second client device identifier identifying the second client device.

In some aspects, the techniques described herein relate to a system, wherein the at least one processor is further configured to execute the software instructions which cause the at least one processor to perform steps to: generate at least one instruction of the plurality of instructions based at least in part on each activity parameter of the activity parameters; and generate the at least one SESC based at least in part on the plurality of instructions.

In some aspects, the techniques described herein relate to a system, wherein the at least one processor is further configured to execute the software instructions which cause the at least one processor to perform steps to: determine a first token stored amount of the first token type in a first token storage associated with the first client device; generate a segregated first token type having the first token transfer amount; generate a stored first token type having an updated first token stored amount of the first token stored amount less the first token transfer amount; delete the first token stored amount of the first token type from the first token storage; add the updated first token stored amount to the first token storage; and transfer the first token transfer amount of the first token type into a first segregated token storage.

In some aspects, the techniques described herein relate to a system, wherein the at least one processor is further configured to execute the software instructions which cause the at least one processor to perform steps to: receive an asset-linked data segregation message including an indication of a movement of a first asset-linked data into the first segregated data structure; and generate the first token type in the first segregated token storage to represent the first asset-linked data in the first segregated data structure.

In some aspects, the techniques described herein relate to a system, wherein the at least one processor is further configured to execute the software instructions which cause the at least one processor to perform steps to: receive an asset-linked data provision message including an indication of a provision of a second asset-linked data in a second client data structure; wherein the second client data structure includes a schema configured to store the second asset-linked data; and generate the second token type in a second client token storage to represent the second asset-linked data in the second client data structure.

In some aspects, the techniques described herein relate to a system, wherein the first client device, the second client device and the third-party entity are associated with a particular entity; and wherein the first segregated data structure and the second segregated data structure are the same segregated data structure.

In some aspects, the techniques described herein relate to a system, wherein the at least one processor is further configured to execute the software instructions which cause the at least one processor to perform steps to instruct at least one display associated with the first client device to render a second token type receipt notification indicating receipt of the second token type in the first token storage.

In some aspects, the techniques described herein relate to a system, wherein the at least one processor is further configured to execute the software instructions which cause the at least one processor to perform steps to: receive at least one first token type return request from the first client device; wherein the first token type return request includes a return of the second token type according to the at least one condition; and initiate the at least one reverse operation.

In some aspects, the techniques described herein relate to a system, wherein the at least one processor is further configured to execute the software instructions which cause the at least one processor to perform steps to instruct at least one display associated with the first client device to render a first token type return notification indicating receipt of the first token type in the first segregated token storage.

BRIEF DESCRIPTION OF THE DRAWINGS

The present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ the present disclosure.

DETAILED DESCRIPTION

Figure 1:
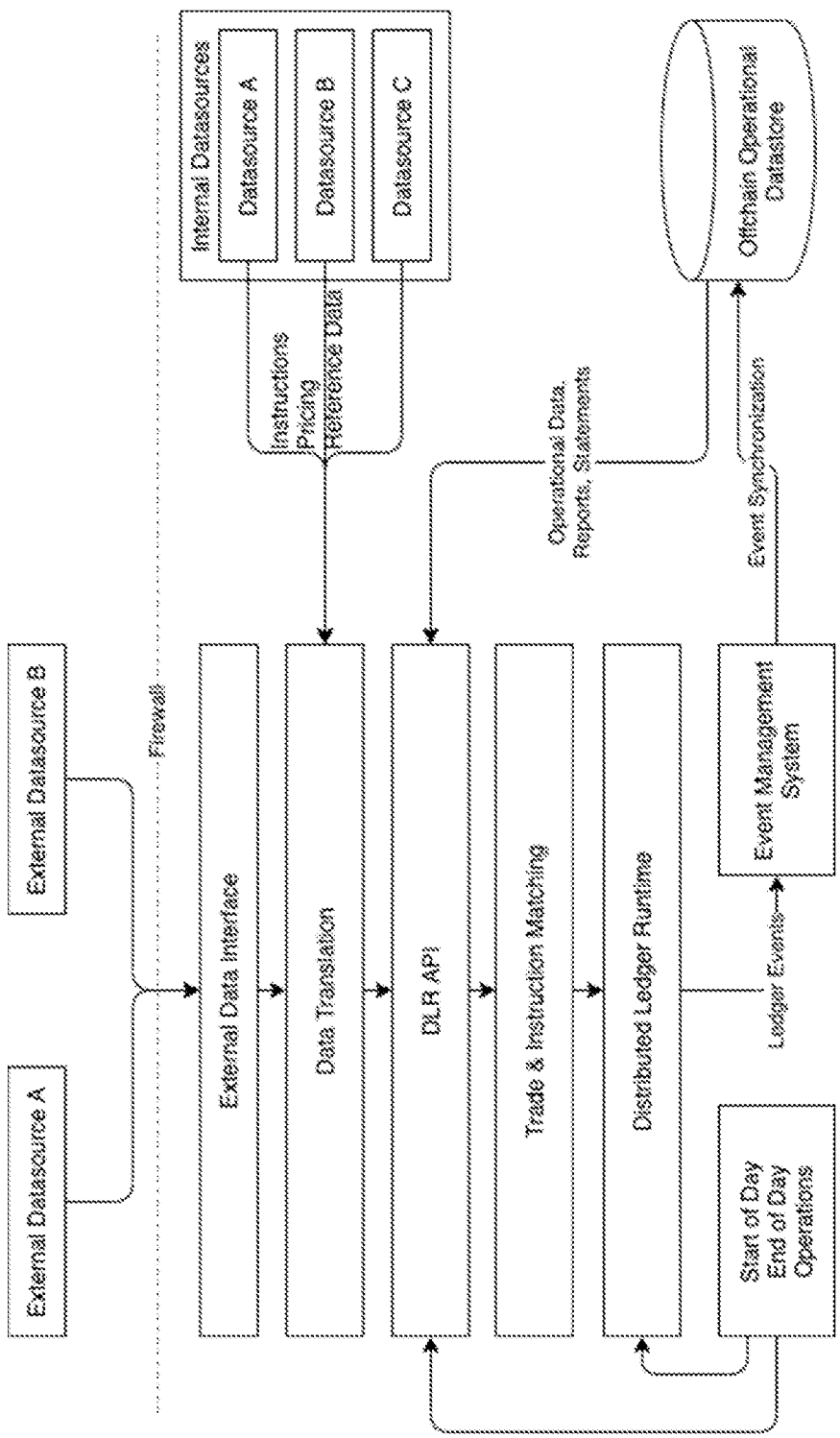
FIGS. 1-11 show line drawings and/or screenshots of flow diagrams and/or certain computer architectures which are representative of some exemplary aspects of the present disclosure in accordance with at least some principles of at least some embodiments of the present disclosure.

In some embodiments and, optionally, in combination of any embodiment described above or below, the exemplary inventive cryptographically-secured, distributed database-centered computer system may be programmed/configured to facilitate in setting up self-contained, self-executing software containers (SESCs) representing a state of a particular data. Each SESC may contain the particular data and particular independent software code (ISC) which would be executed on the particular data when particular transaction (s) (e.g., data message(s), etc.) are/is directed to particular SESC(s). In some embodiments and, optionally, in combination of any embodiment described above or below, each SESC is an Ethereum smart contract-like structure.

In some embodiments and, optionally, in combination of any embodiment described above or below, the exemplary inventive cryptographically-secured, distributed database-centered computer system may be programmed/configured so that the blockchain data residing in distributed manner across nodes and/or residing in off-the-blockchain memory storage may be read only when an exemplary inventive smart contract would be executed by the exemplary inventive cryptographically-secured, distributed database-centered computer system. For example, a particular smart contract may check the identity of the invoker and, then, may retrieve only the data that the invoker is entitled to receive so that to ensure that the data privacy and/or confidentiality would be maintained.

Illustrative examples of utilizing SESCs for managing n-lateral (e.g., bi-lateral) automatically reversing blockchain operations, such as SESCs for performing and securing re-purchase agreements (REPO). In some embodiments, at least one technical problem in blockchain related technology relates to identifying tokens to reverse an operation and automatically performing the reversal of the operation. When a token is transferred to between wallets on the blockchain, scenarios may arise when the transfer of the token needs to be reverse, such as upon certain conditions being satisfied. But due to the confidentiality and immutable inherent to blockchain technology, the operation for transferring the token cannot be simply reversed. Thus, as part of a technical solution to at least this technological problem, the present disclosure provides techniques for combining one or more SESCs with one or more intermediary and/or segregated wallets on the blockchain to enable initiating the transfer of the token and completing and/or reversing the transfer upon certain conditions.

As an example, a repurchase agreement (REPO) is a form of short-term borrowing. For example, typically, a seller sells security(ies) to a buyer (e.g., investor) for a pre-determined time (e.g., overnight) or for an open period of time, and then buys the sold security(ies) back at the end of the term or at some point during the open period term. For the party selling the security and agreeing to repurchase it in the future, it is a repo; for the party on the other end of the transaction, buying the security and agreeing to sell in the future, it is a reverse repurchase agreement. Typically, there are three types of repurchase agreements:

i. a third-party repo (in this arrangement, a clearing agent or bank conducts the transactions between the buyer and seller and protects the interests of each, by holding the securities and ensures the seller receives cash at the onset of the agreement and the buyer transfers funds for the benefit of the seller and delivers the securities at maturation);

ii. a specialized delivery repo (this arrangement requires a bond guarantee at the beginning of the agreement and upon maturity); and iii. a held-in-custody (HIC) repo (in this arrangement, the seller receives cash for the sale of the security, but holds it in a custodial account for the buyer; however, there is a risk the seller may become insolvent and the borrower may not have access to the collateral).

In some embodiments and, optionally, in combination of any embodiment described above or below, the exemplary inventive cryptographically-secured, distributed database-centered computer system may be programmed/configured to obtain inputs data (e.g., via one or more specialized APIs) regarding at least one of:

i. financial instrument trades,
ii. trade settlements,
iii. current positions (i.e., custodian current positions),
iv. securities' static prices, and
v. trading accounts.

In some embodiments and, optionally, in combination of any embodiment described above or below, the exemplary inventive cryptographically, distributed database-centered computer system may be programmed/configured to generate output data (e.g., via one or more specialized APIs) regarding at least one of:

i. trade settlements,
ii. positional, trading, and/or account reconciliations,
iii. securities' static prices.

In some embodiments and, optionally, in combination of any embodiment described above or below, the exemplary inventive cryptographically-secured, distributed database-centered computer system may be configured to make sure that, for example, there would be only a single copy of a trade stored in the blockchain. In some embodiments and, optionally, in combination of any embodiment described above or below, the exemplary inventive cryptographically-secured, distributed database-centered computer system may be configured to match operations (such as trades) across entities (based on data inputted via respective nodes) and add or associate a unique identifier to each matched pair. For example, the exemplary inventive cryptographically-secured, distributed database-centered computer system may be configured to match operations based at least in part, on pre-determined parameters and the associated request for the operations. For example, if a reference number is available, it might be used as the first parameter, after that, match on at least one of entity identifiers, product ID, currency, trade quantity, cash amount, price, trade rate, and other similar-suitable parameters. For example, operations which would be only partial matches, the exemplary inventive cryptographically-secured, distributed database-centered computer system may be configured to subject them to a repair mechanism/methodology and then fall into the consensus/agreement process. For example, operations which could not be matched or where only one party would have submitted would be separately held and would not me stored in the exemplary inventive blockchain.

In some embodiments and, optionally, in combination of any embodiment described above or below, the exemplary inventive cryptographically-secured, distributed database-centered computer system may be configured to be associated with a respectively digital Wallet-like application/structure which may be programmed to store a running cash balance and provide for cash movements to be passed through to respective API interfaces to respective systems (e.g., member nodes' systems). Herein, the term "wallet" refers to a storage location for storing tokens or other digitized assets, and is addressed on the cryptographically-secured, distributed database-centered computer system, via a physical or virtual (e.g., logical) network address and/or storage address or any suitable combination thereof to enable operations between entities using the tokens and/or other digitized assets.

In some embodiments and, optionally, in combination of any embodiment described above or below, the exemplary inventive cryptographically-secured, distributed database-centered computer system may be configured to reconcile the hold-in-custody (HIC) account positions against the custodian API query result(s) for respective account(s).

In some embodiments and, optionally, in combination of any embodiment described above or below, the exemplary inventive cryptographically-secured, distributed database-centered computer system may be configured to tokenize assets in a separate account. In some embodiments and, optionally, in combination of any embodiment described above or below, the exemplary inventive cryptographically-secured, distributed database-centered computer system may be configured to allow custodians (e.g., a third-party bank, etc.) to access/view its client's operations, such as, e.g., trades, positions, and/or the HIC account activity. In some embodiments and, optionally, in combination of any embodiment described above or below, the exemplary inventive cryptographically-secured, distributed database-centered computer system may be configured to allow a movement to the HIC account and trading of the asset tokens. In some embodiments and, optionally, in combination of any embodiment described above or below, the exemplary inventive cryptographically-secured, distributed database-centered computer system may be configured to reconcile an on-chain account against a custodian position to ensure that asset(s) is/are present.

In some embodiments and, optionally, in combination of any embodiment described above or below, the exemplary inventive cryptographically-secured, distributed database-centered computer system may be configured to reduce transaction costs due to immobilization of collateral, both between counterparties and internal movements. In some embodiments and, optionally, in combination of any embodiment described above or below, the exemplary inventive cryptographically-secured, distributed database-centered computer system may be configured to reduce failed matches by storing each trade and all related approvals/data. In some embodiments and, optionally, in combination of any embodiment described above or below, the exemplary inventive cryptographically-secured, distributed database-centered computer system may be configured to reduce computer processing time required to record, track and reconcile operations and reverse operations, such as, e.g., for repo transactions. For example, data management of repo transaction via the exemplary innovative blockchain-based methodologies of the present disclosure related in minimizing memory resource that computers need to allocate for storing and/or management each repo transaction.

In some embodiments and, optionally, in combination of any embodiment described above or below, the exemplary inventive cryptographically-secured, distributed database-centered computer system may be configured to immobilize collateral tokens and tokenized assets by executing one or more of the following instructions:

i. allowing parties to agree that collateral will remain "in custody" or "segregated" at a current custodian location (e.g., borrower's electronic books/records) (HIC account(s));

ii. setting up the custodian as a member node of the network and move the collateral tokens via the blockchain; and iii. setting a repo-specific account at the custodian electronic system.

Broadridge has established a Distributed Ledger Repo ("DLR") solution for repurchase agreements ("repo"). The DLR solution uses distributed ledger technology to allow collateral to be represented digitally on a distributed ledger while also enable specific repo-related steps via the use of self-executing software containers (SESCs), including the movement of collateral tokens. Collateral and movements thereof are digitally represented on the distributed ledger via the collateral tokens. The DLR solution eliminates the need to move collateral between separate custodians for each counterparty and, instead, allows the collateral to be "immobilized" with a single custodian who acts for the benefit of both counterparties.

In some embodiments, a smart contract may include any suitable computer code that, upon the occurrence of a specified condition or conditions, is capable of running automatically according to pre-specified functions. The code can be stored and processed on a distributed ledger and would write any resulting change into the distributed ledger.

The DLR solution may enable the execution of reversible operations between (i) two sub-entities of a particular entity (e.g., branches or departments of a single entity), e.g. Company A's NY Branch and Company A's Paris Branch (an "intraentity repo"); (ii) affiliated entities, i.e., two separate entities under common ownership or control; and (iii) unaffiliated entities.

FIGS. 1 through 11 illustrate systems and methods of automated cryptographically secure distributed ledger based operations paired with reverse operations to coordinate account and/or profile interactions. The following embodiments provide technical solutions and/or technical improvements that overcome technical problems, drawbacks and/or deficiencies in the technical fields involving the security and efficiency of change in ownership of data such as tokenized assets. As explained in more detail, below, technical solutions and/or technical improvements herein include aspects of improved data segregation and recordation to remove steps for transferring the data between locations, such as between accounts or profiles, by leveraging distributed ledger-based smart contracts (e.g., SESC's) to segregate and control the data, thus improving efficiency and security of the data. Based on such technical features, further technical benefits become available to users and operators of these systems and methods. Moreover, various practical applications of the disclosed technology are also described, which provide further practical benefits to users and operators that are also new and useful improvements in the art.

In some embodiments, at least one additional technical problem in blockchain related technology relates to identifying tokens to reverse an operation and automatically performing the reversal of the operation. When a token is transferred to between wallets on the blockchain, scenarios may arise when the transfer of the token needs to be reverse, such as upon certain conditions being satisfied. But due to the confidentiality and immutable inherent to blockchain technology, the operation for transferring the token cannot be simply reversed. Thus, as part of a technical solution to at least this technological problem, the present disclosure provides techniques for combining one or more SESCs with one or more intermediary and/or segregated wallets on the blockchain to enable initiating the transfer of the token and completing and/or reversing the transfer upon certain conditions.

FIG. 1 depicts a block diagram of a system architecture for distributed ledger based data exchange using paired operation-reverse operation ledger events in accordance with aspects of embodiments of the present disclosure.

In some embodiments, a DLR system may include an implementation that provides various data exchange processing capabilities for paired operation-reverse operations, such as, e.g., Repurchase Agreements and the underlying position management. In some embodiments, at a high level, the DLR system may be categorized into two or more verticals, including, but not limited to: (1) Distributed Ledger Technology ("DLT") Applications/Components, and (2) Non-DLT Applications/Components.

In some embodiments, the Non-DLT Applications/Components may include software and/or hardware modules that are built on non-blockchain technology stacks. These components provide functionalities that enable a user to interact with various parts of the application and also interface with the DLT Applications/Components. Such Non-DLT Applications/Components may include, e.g., an External Data Interface, Data Translation, DLR API, Internal Datasources, Off-chain Operation Datastore, Event Management System, among others or any combination thereof.

In some embodiments, the External Data Interface may enable External Datasources, such as External Datasource A and External Datasource B, to send and receive data to the DLR system.

In some embodiments, the External Datasources may include, e.g., any suitable computing device, such as user computing devices (e.g., laptop computers, desktop computers, mobile computing devices including smartphones, tablets and/or wearables, etc.), external or remote servers and/or mainframes and/or databases, or any other suitable computing device or any combination thereof.

In some embodiments, the External Datasources may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the DLR system may include any suitable Cloud or Server system interfacing for interfacing with a blockchain ledger. In some embodiments, the term "server" may refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the DLR System may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, the DLR System may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, as detailed herein, the DLR System may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™; (33) Windows Runtime (WinRT™); (34) IBM i™; (35) IBM AIX™; (36) Microsoft DirectX™; (37) Eclipse Rich Client Platform or other suitable computer platforms or any combination thereof.

In some embodiments, the External Datasources may send messages to the External Data Interface to interact with the DLR system according to a messaging protocol of the External Data Interface. In some embodiments, the messaging protocol may include a request-response type message system such as using application programming interfaces (API), e.g., simple object access protocol (SOAP), Representational State Transfer (REST), or other suitable API. In some embodiments, the messaging protocol may include, e.g., publish-subscribe message patterns (e.g., data distribution service (DDS), or other suitable publish-subscribe solution). Any suitable message pattern, message system and/or message protocol may be employed.

In some embodiments, APIs may define interactions between multiple software intermediaries, such as between the External Datasources and the External Data Interface. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, External Datasources and the External Data Interface may be configured to operate in a centralize or distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below.

In some embodiments, the External Data Interface may provide data from the External Datasources to a Data Translation layer for, e.g., formatting, pre-processing, cleansing, among other tasks. For example, in some embodiments, a message from one or more of the External Datasources may include external data including commands, metadata, data labels, data fields, among other items and attributes that refer to and/or depend on other information. Accordingly, the Data Translation layer may interface with an Internal Datasource to reference the items and attributes of the external data to identify references and dependencies. In some embodiments, for example, the external data may include commands that refer to instructions for operations on the distributed ledger, or DLT. Thus, the Data Translation may identify the corresponding instructions in an Internal Datasource such as Datasource A. Similarly, the external data may refer to particular assets, objects, data files, or other items that include a certain value or quantity associated therewith. For example, the external data may specify a tokenized asset, such as a security asset or bond or other asset, that may include a predetermined value or price. Thus, the Data Translation may query the Internal Datasources, e.g., Datasource B, to identify the value of the items in the external data. The Data Translation may also query the Internal Datasources, such as a Datasource C among other Datasources, for any other reference data and other dependencies and associated data.

In some embodiments, the Internal Datasources may include one or more databases. In some embodiments, the databases may include, e.g., a centralized or distributed database, cloud storage platform, decentralized system, server or server system, among other storage systems. In some embodiments, a database may refer to an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity—relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, the Data Translation may query the Internal Datasources uses any suitable query language, such as, e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

In some embodiments, the external data, along with any instructions, value/quantity/pricing, and/or reference data from the Internal Datasources may be provided to the DLT Applications/Components via a suitable DLR API. Accordingly, the DLT Applications/Components may be instructed to operate on the external data to effectuate real-time data exchange using paired operation-reverse operation ledger events. In some embodiments, the DLT Applications/Components may include applications and/or components that are built using Distributed Ledger Technology and are deployed on a Distributed Ledger. In general parlance these are also called as "Smart Contract Applications". Herein, the DLT Applications/Components are referred to as a "Distributed Component". In some embodiments, the Distributed Components may be configured to perform operations including, but not limited to:

Governance of Distributed Ledger State,
Governance of Entities/Participants of the ecosystem,
Grant/Revoke entitlements,
Governance of actions & interactions on various data points,
Governance on Data State,
Governance on Operation/Transaction States, and
Governance on Asset States.

In some embodiments, there may be various Distributed Components, each with their own responsibilities, as are described in more detail below. Distributed Components are deployed on "Distributed Ledger Infrastructure" also aliased as "Blockchain Infrastructure". In some embodiments, each Distributed Component may be developed and integrated into a Distributed Ledger Runtime, e.g., using separate and individual build and deployment pipelines.

In some embodiments, the Distributed Ledger Runtime may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, to facilitate paired operation-reverse operation events, a Distributed or Non-Distributed Component may operate on the external data using a Trade and Instruction Matching layer. In some embodiments, to ensure reciprocal operations and reverse operations, such as for a repurchase agreement, the items of the external data being exchanged using the Distributed Ledger Runtime may be paired with the corresponding operation and/or reverse operation. Accordingly, the Trade and Instruction Matching layer may include functionality to compare the items, values/quantities/prices, instructions, and other attributes of the external data with known attributes to match a reverse operation with the corresponding executed operation, or to identify a new operation ahead of a later reverse operation. Accordingly, the Distributed Ledger Runtime may then identify and execute the appropriate smart contract or SESC matching the operation and/or reverse operation.

In some embodiments, the DLR API may also instruct and receive start of day and end of day operations performed by the Distributed Ledger Runtime. For example, the Distributed Ledger Runtime may produce, either automatically or by command form the DLR API, to perform operations, set permissions, generate analytics, among other operations at a start of each day or at an end of each day or both. The results of these operations may be collected by the DLR API via a suitable API request and provided to the Internal Datasources for storage.

In some embodiments, the Distributed Ledger Runtime may also automatically output each ledger event to an Event Management System. In some embodiments, the Event Management System may track and record events such as, e.g., data or token movement instructions, segregated instructions to segregate tokens and/or assets to a segregated account or profile, transaction completion, smart contract operations, among other events.

In some embodiments, the Event Management System may synchronic the ledger events with a an Off-chain Operation Datastore to record and track each event, operational data, reports, statements, among other data, analytics and statistics.

In some embodiments, the data storage solution of the Off-chain Operation Datastore may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage solution may, additionally or alternatively, include one or more data storage devices such as, e.g., a hard drive, solid-state drive, flash drive, or other suitable storage device. In some embodiments, the data storage solution may, additionally or alternatively, include one or more temporary storage devices such as, e.g., a random-access memory, cache, buffer, or other suitable memory device, or any other data storage solution and combinations thereof.

In some embodiments, the distributed ledger runtime and/or the event management system may orchestrate operations on the blockchain to automatically execute operation-reverse operations pairs. To do so, the distributed ledger runtime and/or the event management system may receive an activity initiation request from a first client device associated with a first user. The first client device may include a computing device in communication with the blockchain, such as a node on the blockchain. Thus, the first client device may include a first token storage ("first wallet") for storing tokens, including tokenized assets, for the first user of the first client device.

The operation request may include parameters that specify and operation to be performed relative to the first client device, such as for the transfer of one or more first tokens of one or more first token types in exchange for a transfer of one or more second tokens of one or more second token types between the first client device and a second client device. Similar to the first client device, the second client device may include a second token storage ("second wallet") for storing tokens, including tokenized assets, for a second user of the second client device.

In some embodiments, the operation request may include parameters that specify a reverse operation, for example to enable the first user and the second user to temporarily exchange assets, such as for a repo transaction as will be described further below. Thus, the reverse operation may include parameters that specify a reverse operation that revers the operation of the operation request according to defined conditions, such as, e.g., time limits, installments, or other conditions or any combination thereof. Accordingly, the parameters of the reverse operation may include the return of the one or more second tokens of the one or more second token types in exchange for a return of the one or more first tokens of the one or more first token types between the first client device and the second client device under the defined conditions.

In some embodiments, parameters of the activity initiation request may include, e.g., a first token transfer amount associated with the first token type, a second token transfer amount associated with the second token type, at least one condition identifier identifying the at least one condition, a time identifier identifying a time limit to satisfy the at least one condition, a first client device identifier identifying the first client device, or a second client device identifier identifying the second client device, among others or any combination thereof.

In some embodiments, each of the first token type and the second type may be tokenizations of one or more associated asset types on the blockchain. Accordingly, each of the first token type and the second type may include, e.g., a cryptographic hash defining a token on the blockchain.

In some embodiments, the second user via the second client device may accept the activity initiation request via an activity initiation response. In some embodiments, the activity initiation response may include a rejections or modification to the parameters of the activity initiation request, in which case the first user and the second user may continue to exchange messages, e.g., in the form of activity initiation response and activity initiation response, until the activity initiation response signifies an acceptance of the activity initiation request. In some embodiments, the acceptance of the activity initiation request may cause the distributed ledger runtime to enter the parameters of the activity initiation request so create an SESC, such as a smart contract, to control the operation-reverse operation pair. Both the activity initiation request and the activity initiation response may include, e.g., a suitable application programming interface (API) message.

In some embodiments, the distributed ledger runtime may create the SESC according to the parameters of the activity initiation request. For example, a template SESC for blockchain activities including operation-reverse operation pairs may be accessed and configured according to the parameters. Each parameter of the activity initiation request may be entered into a corresponding field of the template SESC to create a set of instructions based on the parameters. As a result, a customized SESC with specifically configured instructions is created that may automatically control the movement of tokens between the first node and the second node based on the parameters and conditions of the activity initiation request.

In some embodiments, the SESC may include instructions to coordinate token movement using one or more segregated token storages. The segregated token storage includes a segregated data structure that has a schema configured to store tokens of the blockchain according to particular permissions and conditions. For example, the segregated token storage may hold tokens from the first user for the second user's benefit, thus resulting a reduced or no permissions for the first user to access the tokens unless certain conditions are satisfied for the return of the tokens to the first user. Similarly, the segregated token storage may limit permissions for the second user to access the tokens until certain conditions are satisfied for the completion of the transfer to the second user.

In some embodiments, the SESC may ensure that the first tokens to be exchanged for the second tokens are moved into a segregated token storage for the benefit of the second user. Thus, the SESC may detect that the first tokens are transferred into the first segregated token storage. The transfer into the first segregated token storage may signify the deposit of an asset underlying the first token into a segregated asset store, such as, e.g., a segregated account. Thus, the SESC may detect that the asset is segregated based on the segregation of the first token into the first segregated token storage.

In some embodiments, the first segregated token storage may be configured as a "long box" account that is attributed to the first user. In some embodiments, the first segregated token storage may be configured as a "FBO" ("for-the-benefit-of") account that is attributed to the second user. In some embodiments, separate segregated token storages may be employed for the long box and for the FBO accounts, or one segregated token storage may be employed to perform both functions, e.g., based on transactions on the blockchain and/or the permissioning between the first and second users. In some embodiments, the first segregated token storage may be associated with a third-party entity or other entity. In some embodiments, the long box and the FBO may be associated with the same entity or with different entities.

In some embodiments, the SESC may automatically cause the transfer of the first token from the first token storage of the first client device into the first segregated token storage in response to an asset-linked data segregation message. The asset-linked data segregation message may specify that asset-linked data (e.g., data linked to the first token and to the underlying asset) has been deposited or otherwise moved into the segregated data structure associated with the segregated token storage. Thus, the segregated data structure may include a node on the blockchain that reports, e.g., via the DLR API when asset-linked data is received for an operation-reverse operation pair. The SESC may then automatically move the associated first token from the first token storage to the first segregated token storage associated with the segregated data structure.

In some embodiments, the SESC may then detect that the second user has transferred the second token to the first user by a blockchain transaction transferring the second token from the second token storage to the first token storage. As a result, the SESC may determine that the operation has been performed by exchanging the first token for the second token.

In some embodiments, to ensure that the first user is aware of transfer of the second token, the SESC may automatically generate an instruction to the first client device. The instruction may cause the first client device to render a notification that includes an indication that the transfer of the second token to the first has successfully occurred.

In some embodiments, the SESC may automatically cause the transfer of the second token from the second token storage of the second client device into the first token storage in response to an asset-linked data provision message. The asset-linked data provision message may specify that asset-linked data (e.g., data linked to the second token and to the underlying asset) has been deposited or otherwise moved into a second data structure associated with the second token storage. Thus, the second data structure may include a node on the blockchain that reports, e.g., via the DLR API when asset-linked data is received for an operation-reverse operation pair. The SESC may then automatically create the second token in the second token storage to tokenize the asset-linked data, and move the associated second token from the second token storage to the first token storage.

In some embodiments, the movement of the first token into the first segregated token storage and the movement of the second token into the first token storage may trigger the SESC to attribute the first token to the second user temporarily. For example, the permissions of the first segregated token storage may be changed to remove permissions from the first user. In some embodiments, the SESC may also add permissions for the second user, such as condition-dependent permissions including an access permission upon the first user violating the condition of the operation-reverse operation pair, or other suitable condition-dependent permission or any combination thereof. In some embodiments, the SESC may create a transaction on the blockchain that moves attribution of the first token in the first segregated token storage from the first user to the second user to record the change in the attribution. Alternatively, or in addition, the SESC may transfer the first token from the first segregated token storage to a second segregated token storage, e.g., associated with second user (as an FBO). Any suitable combination of the above may be employed.

In some embodiments, the first token may remain in the segregated token storage, either the first, second or both, until the condition for the reverse operation is satisfied. For example, the first user may be required to return a certain token, token type or the second token to the second user in order to require the first token, or else the first token may be provided to the second user. The condition may include a time limit. Thus, the SESC may, upon expiration of the time limit, may transfer the first token from the segregated token storage to the second token storage if the first user has not satisfied the conditions.

In some embodiments, the SESC may detect a transfer of the second token (or other token or token type according to the parameters of the activity initiation request) back to the second token storage from the first token storage. Where such a transfer satisfies the condition, the SESC may deem that the condition for the reverse operation is met and automatically execute the reverse operation.

To do so, in some embodiments, the SESC may automatically initiate a transfer of the first token type from the first and/or second segregated token storage back to the first segregated token storage, back to the first token storage or any combination thereof such that the first token is returned to the first user. In some embodiments, the SESC may then create one or more instructions to the first client device, the second client device, or both to render a notification indicating a first token type return notification indicating receipt of the first token type in the first segregated token storage.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L and FIG. 2M depict block diagrams of another architecture for the DLR system for distributed ledger based repurchase transaction execution in accordance with aspects of embodiments of the present disclosure.

In some embodiments, the DLR system may include an architecture including an API core, Datasources, a distributed ledger layer and an event management system. For example, external Datasources and a multi-page application (e.g., on a user computing device) may interface with the DLR system via data interfaces of the API core. The data interfaces may provide the data to various data processing components, such as a data enrichment services, data ingestion services, interfaces among others. In some embodiments, the data processing components may include, e.g., microservices or other software services run locally or remotely.

In some embodiments, the API core may also interface with internal datasource, e.g., including the internal datasources described above. In some embodiments, the internal datasources may include, e.g., datasources recording impact, back office data for an entity, and any other data. In some embodiments, the API core may include interfaces for interfacing with each datasource, such as, e.g., an impact feed ingestion to interface with the impact datasource, among any additional data interfaces (e.g., Interface X and Interface Y).

Additionally, the API core may include an application ingress controller to control data input from the multi-page application, as well as via a load balance from, e.g., http and https requests over the Internet. In some embodiments, the application ingress controller may distribute data from the multi-page application and the load balancer to various aspects of the API core to orchestrate DLR functionality.

In some embodiments, the application ingress controller may provide data to an onboarding service. The onboarding service may orchestrate APIs for Entity management, Account management and Relationship management to create and manager identity and account related data. In some embodiments, the onboarding service may include, e.g., microservices or other software services run locally or remotely.

In some embodiments, the application ingress controller may provide data to a business objects service. The business objects service may orchestrate APIs for, e.g., Reference Data, Asset management, Asset Eligibility management among others. In some embodiments, the business objects service may include, e.g., microservices or other software services run locally or remotely.

In some embodiments, the application ingress controller may provide data to an operations service. The operations service may orchestrate APIs for, e.g., a Repo (exchange) Manager service, a Negotiations service, a Movements service, among others. In some embodiments, the operations service may include, e.g., microservices or other software services run locally or remotely.

These are applications and components that are built on traditional tech stacks. These components provide functionalities that allow a user to interact with various parts of the application and also interface with the Distributed Components In some embodiments, the interfaces may provide various integration points to consumes data from various data sources like Messaging Queues, API's, Flat files, File transmissions etc. Based on the upstream systems data format and integration point is built into interfaces. Various parsing capabilities are available for all sorts of upstream message formats.

In some embodiments, the application UI of the multi-page application may include UI Screens providing functionality such as, e.g.:
 i. Data grids to show trade information
 ii. Data grids to show inventory positions
 iii. Data grids to show trade audit reports
 iv. Forms and wizards to create and revise data
 v. Data grids to create exports of data In some embodiments, the Event Management System (EMS) listens to all events on the ledger infrastructure and creates a copy of the event and resulting trade state in a operational data store. This operational datastore is then used to build trade views, data grids and other user interactions.

In some embodiments, the EMS is responsible to react to certain significant ledger events and trigger a response. For example, automated settlement of a trade when instructions are received and match from both participants In some embodiments, each of the onboarding, business objects and operations services may orchestrate API requests to interface with the distributed ledger layer for engaging Distributed Components for managing the paired operation-reverse operation exchanges. In some embodiments, an Entity Manager for each entity registered in the distributed ledger layer may include Distributed Components for each aspect of the exchange lifecycle. In some embodiments, each Entity Manager (e.g., Entity Manager for A, Entity Manager for B, etc.) may be generated by a distributed component including an entity onboarder, e.g., according to API requests from the Entity service of the onboarding service in the API core. Creating of the Entity Manager may initialize per entity instances of each Distributed Component, including, e.g., an Account Manager, a Relationship Manager, a Reference Data Manager, an Asset Manager, a Repo Manager, and a Movement Manager.

In some embodiments, the Distributed Components may be categorized into multiple verticals, including but not limited to:
 i. Distributed Data Objects (DDO),
 ii. Distributed Business Managers (DBM),
 iii. Distributed Business Workflows (DBW), and
 iv. Distributed Business Libraries (DBL)

In some embodiments, DDO may be configured to provide an immutable data structure which holds "Current Data State". Accordingly, in some embodiments, the DDO hold business data and provide a representation of current state of business data or other operation data.

In some embodiments, the DDO of the DLR system may include, e.g.:
 An Entity object,
 ReferenceData objects,
 Trade objects,
 Asset objects,
 Delivery objects,
 Shell objects,
 Obligation objects,
 Negotiation objects,
 Among other suitable DDOs.

Figure 2A:
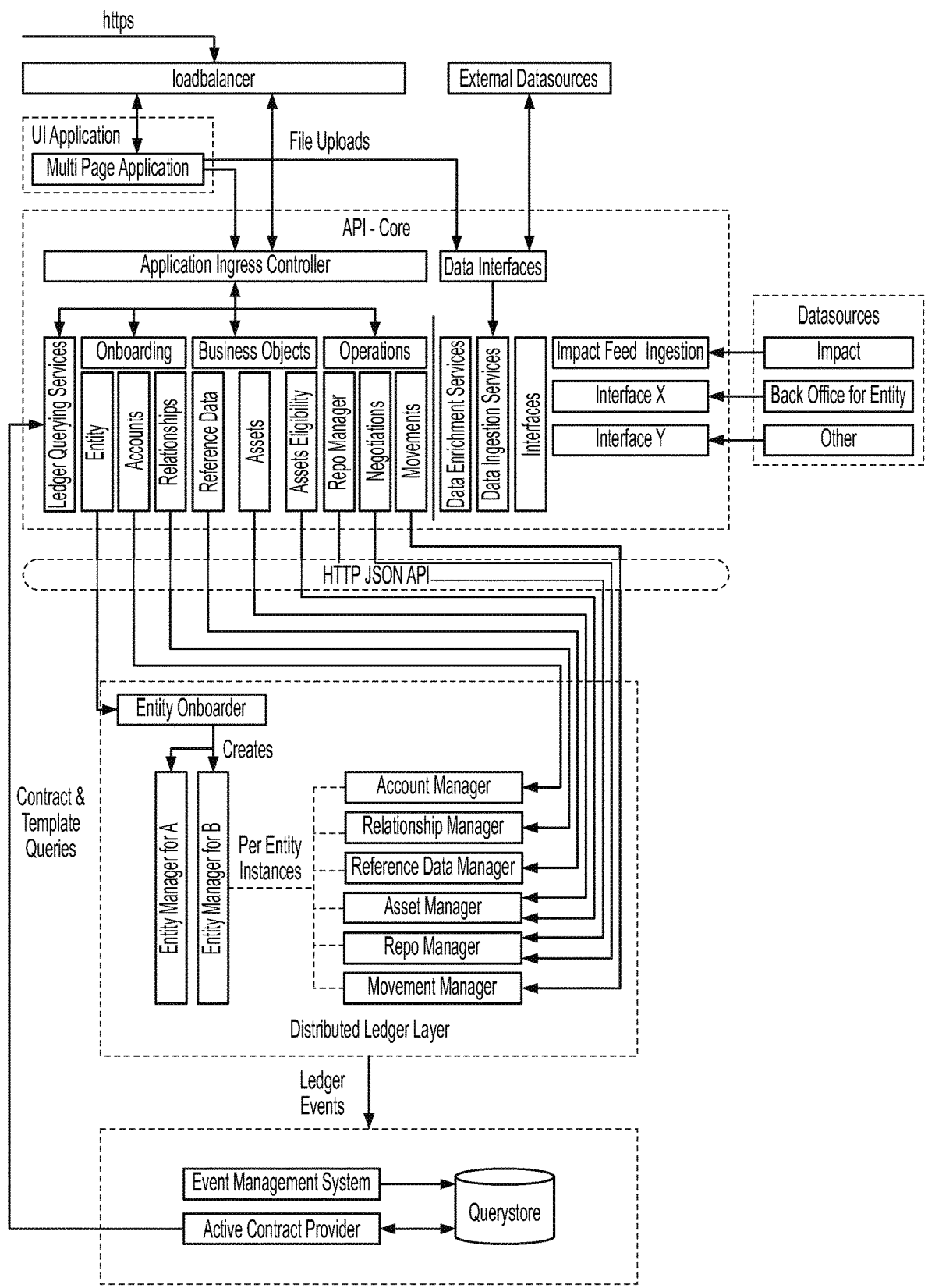
Figure 2B:
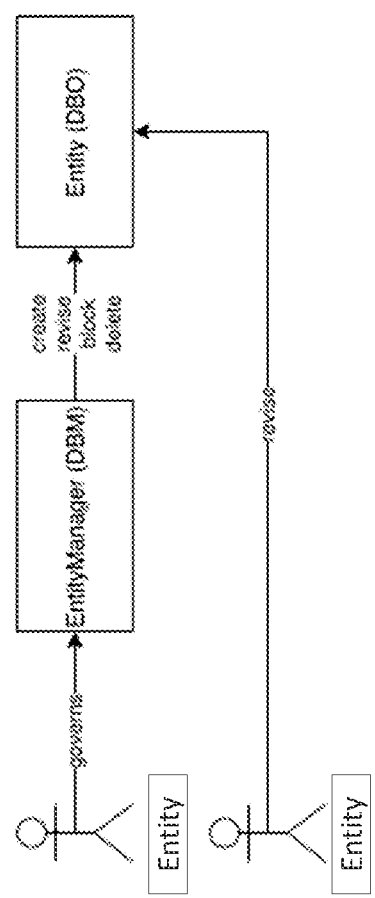

In some embodiments, the Entity DDO may be created as part of an onboarding process. In some embodiments, the Entity DDO may be governed by a DLR system administrator, such as the application provider hosting and/or managing the DLR system. Thus, the DLR system administrator may hold governance authority to create/revise/block/delete and entity. Entities are created from EntityManager, as illustrated in FIG. 2B.

In some embodiments, each Entity object may carry data points about a particular entity registered with the DLR system, such as, e.g.,
 Entity Details and Identifiers
 Entity Configurations
 Accounts
 Holiday Schedules
 Trading relationships In some embodiments, trading relationships in an entity define which accounts have been mapped to certain type of trades and counterparties.

In some embodiments, an entity object can be looked up in the distributed system via EntityId, which may include an alphanumeric identifier. In some embodiments, the EntityId may have format restrictions thereon to ensure security and reliability, such as, e.g., being limited to minimum 3 characters and maximum 32 characters.

1. ReferenceData

Figure 2C:
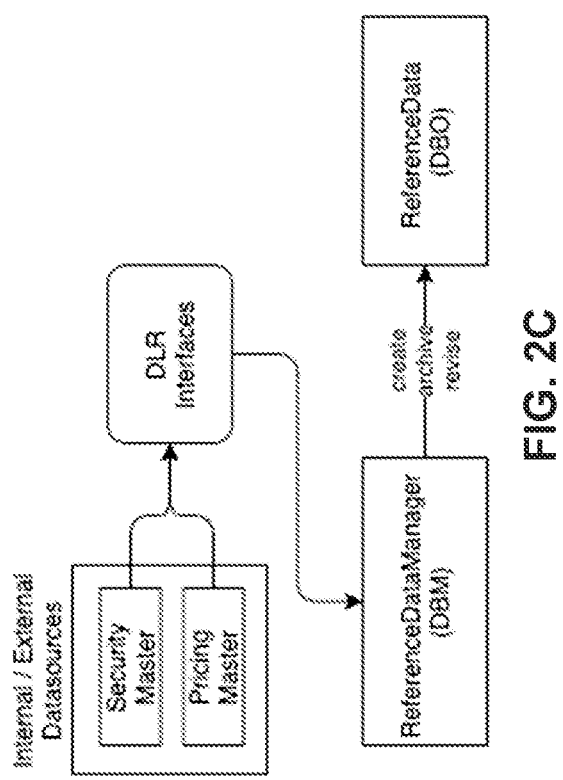

In some embodiments, the ReferenceData DDO may be created by a ReferenceDataManager. Based on a certain pre-configured intervals (Start of Day, End of Day, Hourly etc), the DLR system receives reference data from certain preconfigured data sources (e.g. Reuters, Bloomberg, Internal Master Sources etc.). In some embodiments, reference elements concerning entity information (e.g., significant business elements) may be picked from this data and sent to ReferenceDataManager, which in turn creates ReferenceData, as illustrated in FIG. 2C.

In some embodiments, the ReferenceData may be categorized into two verticals: Security Meta Data, and Security Pricing Data. In some embodiments, the ReferenceData may include additional or different verticals depending on the entity and the application of the DLR system.

In some embodiments, the Security Meta Data may include details about a security asset with data points including but not limited to
 AssetClass,
 AssetSubClass,
 ISINCode,
 Country,
 Rating,
 Haircut,
 Limit,
 FirstCouponDate,
 LastCouponDate,
 CouponPaymentDate,
 IssueDate, and
 MaturityDate.

In some embodiments, the Security Pricing Data may include details about a pricing of the security asset and various data points that affect the end value calculations. These data points are inclusive, but not limited to below:
 IndexBaseRate,
 PoolFactor,
 AssetPrice,
 StrikePrice,
 CurrentRate,
 SecurityCoupon,
 DirtyPrice, and
 AccruedInterestFactor.

In some embodiments, a ReferenceData object can be looked up on the distributed system via an associated CUSIP identifier, which is an alphanumeric with a fixed length of 9 characters.

Figure 2D:
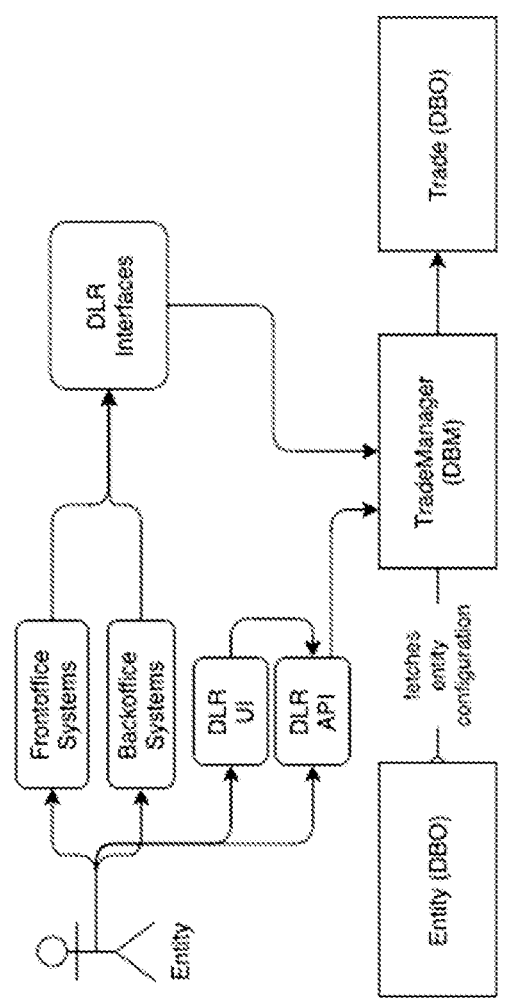

In some embodiments, the Trades DDO may be created from TradeManager as illustrated in FIG. 2D. In some embodiments, the Trades DDO may include a digital representation of a Trade and contains various data points that define and govern the state of a trade between any two or more entities. In some embodiments, creation of a Trade DDO may be possible via any of the below options or other suitable DDO creation options:

Log in into DLR UI and keying in trade values
Authenticating and interacting with DLR API
Receiving trade instructions from the entities Front Office System
This instruction can be in SWIFT MT or MX, XML or Entities proprietary format
Receiving trade instructions from the entities Back Office System
This instruction can be in SWIFT MT or MX, XML or Entities proprietary format In some embodiments, the Trades DDO may be categorized into multiple immediate verticals, such as, e.g., Outright Trades and Finance Trades, among any other verticals. In some embodiments, the Outright Trades may include "Buy/Sell trades" where two parties exchange cash against collateral in a single settlement leg. In some embodiments, Finance Trades may include "Finance Transactions" or "Repurchase Agreements". As part of Finance Trades, cash may borrowed over collateral in an Open Settlement Leg and cash is returned with interest over collateral in a close settlement leg.

In some embodiments, a Trade object can be looked up in the distributed system via TradeIdentifier. The TradeIdentifier may include, e.g., an alphanumeric string with varying length(configurable).

Figure 2E:
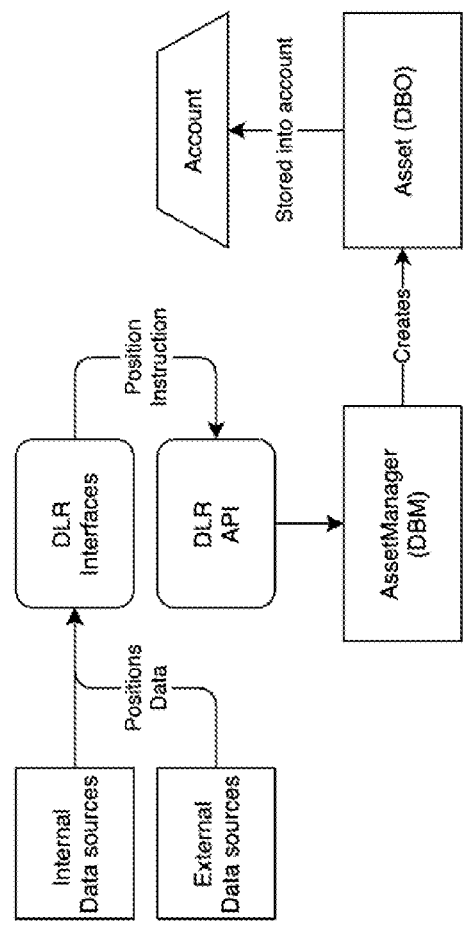
Figure 2F:
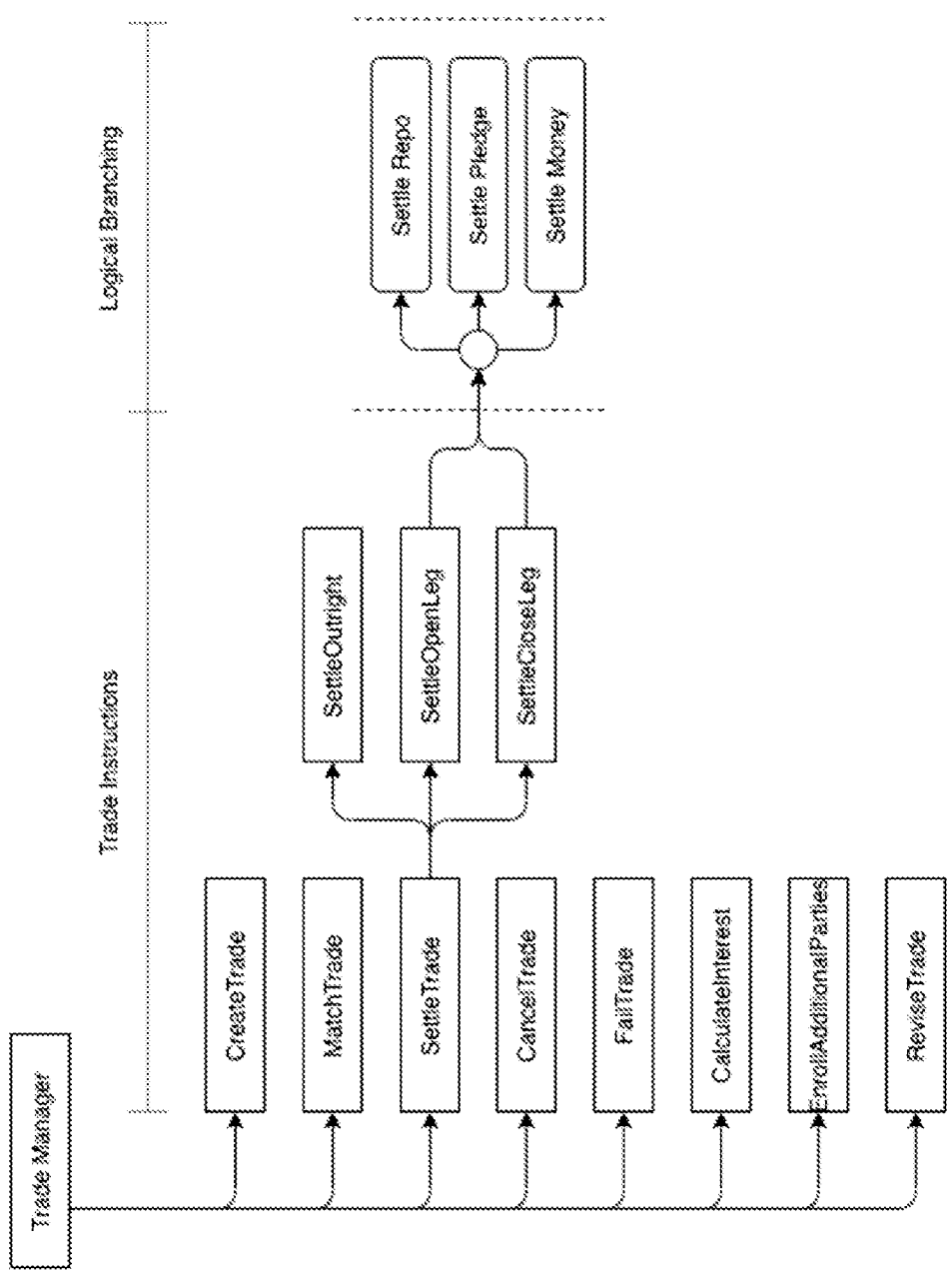

In some embodiments, the Asset DDO may be created by AssetManager as illustrated in FIG. 2E. An Asset object may include a digitally modelled representation of a real-life asset like a Fixed Income Securities or Cash. Assets when created can be held in "buckets", which may also be termed "accounts".

In some embodiments, assets modelled for Fixed Income Securities can be looked up in the distributed system via standard identifiers like CUSIP or ISIN.

In some embodiments, assets modelled for cash can be looked up in the distributed system via their currency code as defined in ISO-4217. ISO 4217 is a standard published by International Organization for Standardization (ISO) that defines alpha codes and numeric codes for the representation of currencies and provides information about the relationships between individual currencies and their minor units. This data is published in three tables: Table A.1—Current currency & funds code list, Table A.2—Current funds codes, and Table A.3—List of codes for historic denominations of currencies and funds.

a) Delivery

In some embodiments, the Delivery DDO may be created as part of the "Asset Settlement" operations by AssetManager. Delivery is a shortlived object, that's designed to act as a "Blocking Object" or "Reservation Object" or a "Temporary Object State"

In some embodiments, whenever a trade is executed and is to be settled, the Delivery DDO is made to create "Deliveries" for both asset tokens in the exchange, such as collateral, cash, etc. As part of this operation, as its mentioned in the trade, amount and quantity units of collateral and cash is split from "Asset" and created as a Delivery. This Delivery is then tagged with the Trade identifier, which can then be looked up by the Asset Managers of both the parties. More details about this object and its various states are mentioned in Trade Settlement—Asset Delivery Mechanism b) Shell In some embodiments, a Shell DDO is created by the TradeManager. In some embodiments, the Shell DDO object is similar to a Trade and is used as a reservation bucket to have certain amount of collateral and cash blocked/reserved for certain type of trades. The operation of the Shell DDO is illustrated in FIGS. 3A-3E, 4A-4E and 5A-5E as described below.

c) Obligation

In some embodiments, an Obligation DDO is created by AssetManager. Obligation DDOs are created in response to instructions from a clearance entity or other entity managing the clearance process.

d) Negotiation

In some embodiments, a Negotiation DDO object is created by TradeManager. The Negotiation DDO object acts as an audit record of events as part of which the terms and conditions for the repurchase agreement were negotiated between both parties. These terms can include various trade attributes like, Open Date, Close Date, Finance Rate, Principal amount etc.

2. Distributed Business Managers a) EntityManager

In some embodiments, an entity manager is a singleton instance, which means only one instance of this object exists. In some embodiments, using an EntityManager, the Distributed Ledger Layer may perform onboarded onto the applications services, may be configured to use/trigger application services, may be configuration for an entity can be revised, may perform subscription to applications services can be managed or any the suitable Entity management functions or any combination thereof. In some embodiments, an Application Provider managing the Distributed Ledger Layer may governance rights on EntityManager.

b) ReferenceDataManager

In some embodiments, a ReferenceDataManager is a singleton instance, which means only one instance of this object exists. In some embodiments, an application receives security details and pricing data from various configured data sources like Reuters, Bloomberg or any other internal data source. These Data sources are integrated into Interfaces application, which consumes this data and triggers a "RegisterReferenceData" operation. As part of this operation, it looks up current ReferenceData objects using CUSIP or ISIN and derives if there is any change. In some embodiments, where no previous ReferecceData object is found then a new ReferenceData object is created, where a change is observed between current data and previous ReferenceData object, then the old ReferenceData object is Archived and a new ReferenceData object is created with the latest data. In some embodiments, interfaces can be configured to receive security, pricing updates at a certain interval of time like hourly, start of day, end of day etc. In some embodiments, an Application Provider managing the Distributed Ledger Layer may governance rights on ReferenceDataManager.

c) TradeManager

In some embodiments, a TradeManager may be a singleton Instance, which means only one instance of this object exists. In some embodiments, the TradeManager is integrated with Applications API and Interfaces and is responsible to manage various trade lifecycles like creation, revision, settlement etc. Few of the trade lifecycle operations are shown in the diagram illustrated in FIG. 2F. In some embodiments, an application receives trade and settlement instructions from participants and triggers various trade management sub routines. These move the trade from one data state to another. In some embodiments, an entity managing the Distributed Ledger Layer may governance rights on and can delegate revision rights to Trade Participants over the Trade object.

d) AssetManager

In some embodiments, an instance of AssetManager is created per onboarded entity. In some embodiments, each AssetManager may be responsible for managing the digitized assets for an entity, creation of an Asset object and tagging it to a certain Account, loading and revising positions for an entity and creating deliveries of Collateral & Cash assets for a Trade. In some embodiments, entity of the AssetManager may hold governance rights on and can provide delegated rights to Application Provider to delegate some operations like Start of day/end of day load, position synchronization etc.

3. Distributed Business Managers

In some embodiments, Distributed Business Managers take care of management of Distributed Business Objects in a standard way as the market prescribes. There would be certain scenarios where an entity wants to execute a trade in a certain flow. These are also called as client specific workflows and have been tailored by entities to match their internal operations and interactions with their counterparties.

These flows might involve slight deviations to the market prescribed flow, but the final state being fully compliant with how the market expects it to be. To enable entities to build their own optimized workflows, these are designed per client and deployed as needed.

Figure 2G:
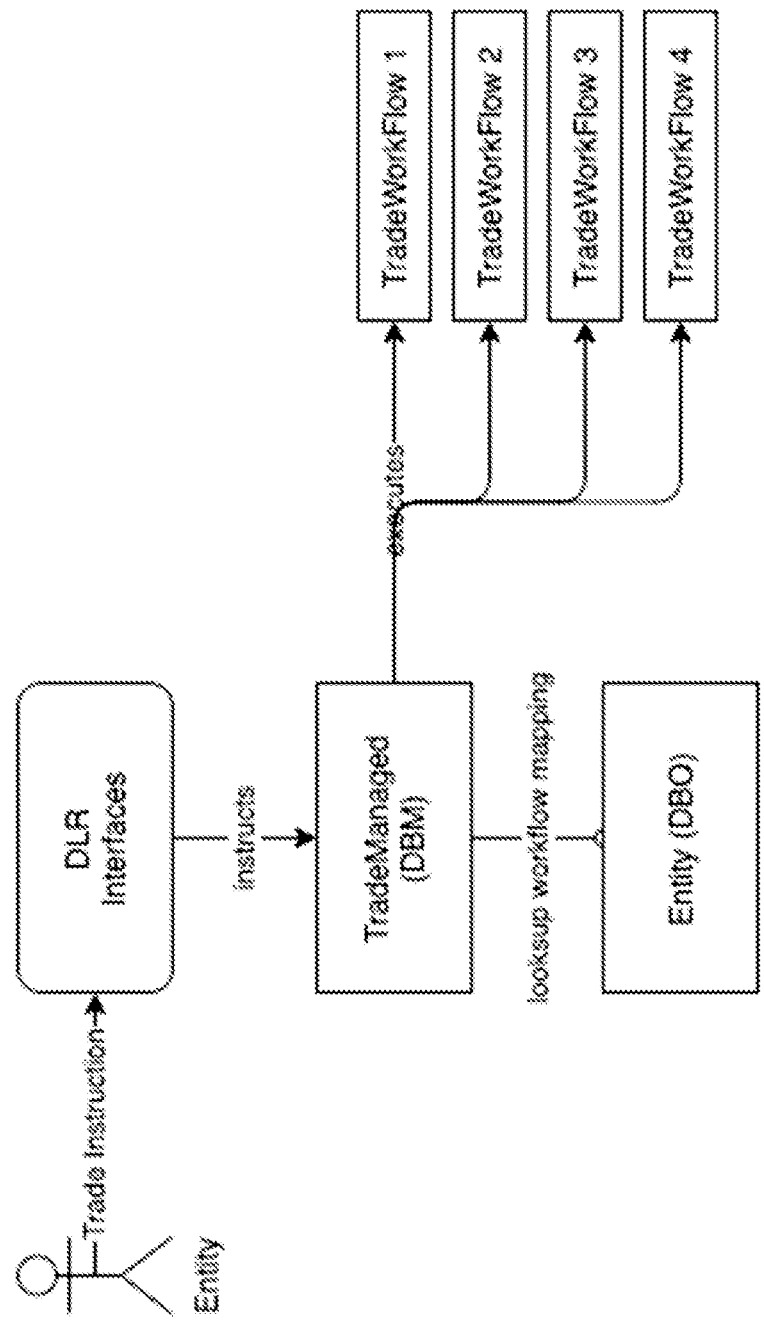

When an instruction is received from an entity, its checked against Entity configuration in Entity object. Based on account-trade type combination, these instructions are mapped to a certain entity workflow. Which is then executed, as depicted in FIG. 2G. These Distributed Business Workflows may be built per entity and in some cases can be reused between entities who follow the same market practice.

4. Distributed Business Libraries

In some embodiments, the distribute ledger layer may include distributed business libraries including, e.g., various utility subroutines that help in various Trade management operations. These contain some mathematical functions that enable operations like below:
  i. Calculate Interest
  ii. Calculate Collateral Allocation quantity based on trade amount and collateral pricing
  iii. Calculate Collateral Market value
  iv. Calculate Collateral value with coupon
  v. Calculate Coupon Value

5. Trade Settlement—Asset Delivery Mechanism

In some embodiments, once a trade is registered in the system, there are few attributes that dictate the behavior of its state. Attributes may include, but are not limited to:
  i. Trade Participants
    a. Provider: The party who is responsible to provide collateral
    b. Receiver: The party who is responsible to provide cash
  ii. Collateral Identifier and quantity
    a. A trade can have single or multiple collaterals
  iii. Cash Identifier and amount
    a. Usually, USD As the application receives a settlement instruction, after various validations including but not limited to checking participants inventory for having enough cash or collateral, a series of steps wrapped in an atomic transaction are executed.
  Consider the following
  i. Trade registered between PartyA and PartyB.
    a. PartyA is provider. Provides collateral and receives cash
    b. PartyB is receiver. Provider cash and receives collateral
  ii. Trade needs to settle
    a. 5 million quantity of CUSIP1
    b. 5 Million quantity of CUSIP2
  iii. Trade needs to settle 10 million as cash (USD) amount
  iv. Party A has an inventory of below
    a. CUSIPA: 10 Million
    b. CUSIPB: 15 Million
    c. USD: 2 Million
  v. Party B has an inventory of below
    a. CUSIPA: 2 Million
    b. USD: 20 Million In some embodiments, every delivery object will have itself tagged to a TradeIdentifier, making this delivery exclusive to that trade. Deliveries cannot be revised or transferred or allocated to trades that do not match its trade identifier. Deliveries can be recalled, in case the trade gets cancelled. All below operations are an atomic sequence. Everything will be rolled back to initial state if some step fails.

Figure 2H:
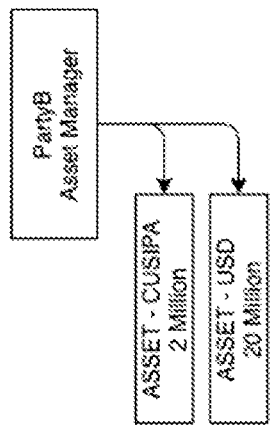
Figure 2H:
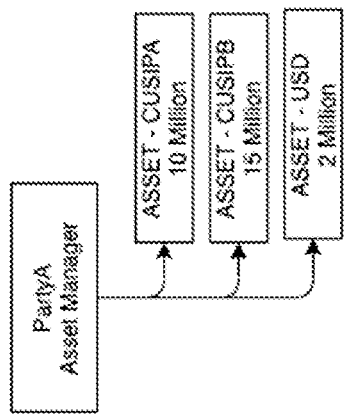

In an example trade, an initial state of inventory is depicted in FIG. 2H.

Figure 2I:
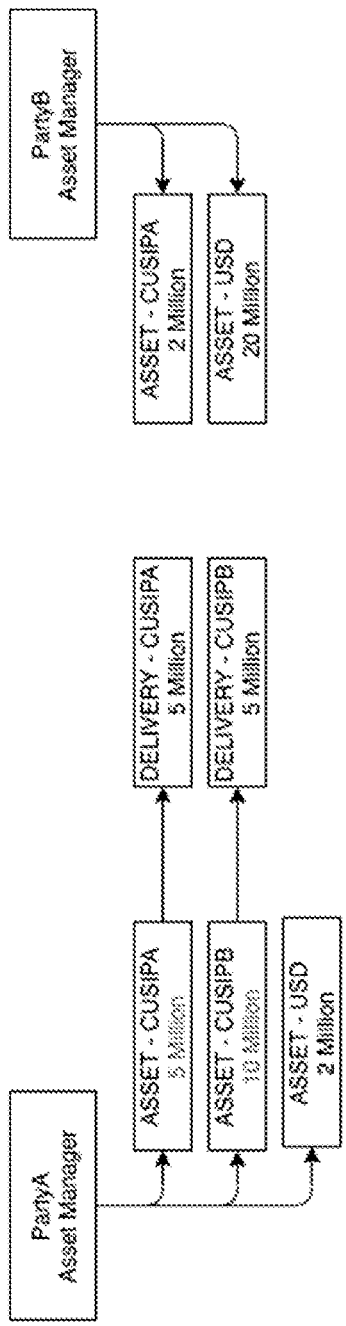

Delivery creation where the provider creates delivery of collateral is depicted in FIG. 2I.

Figure 2J:
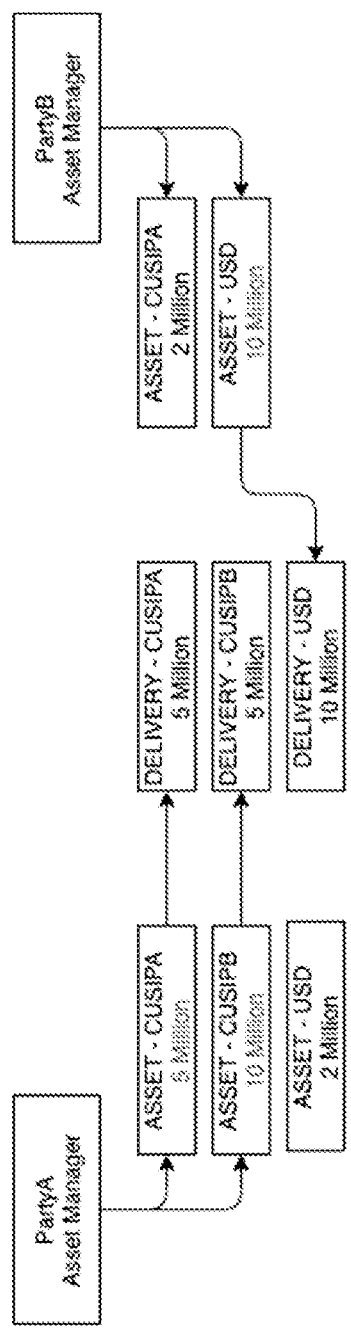

Delivery creation where the receiver creates delivery of cash is depicted in FIG. 2J.

Figure 2K:
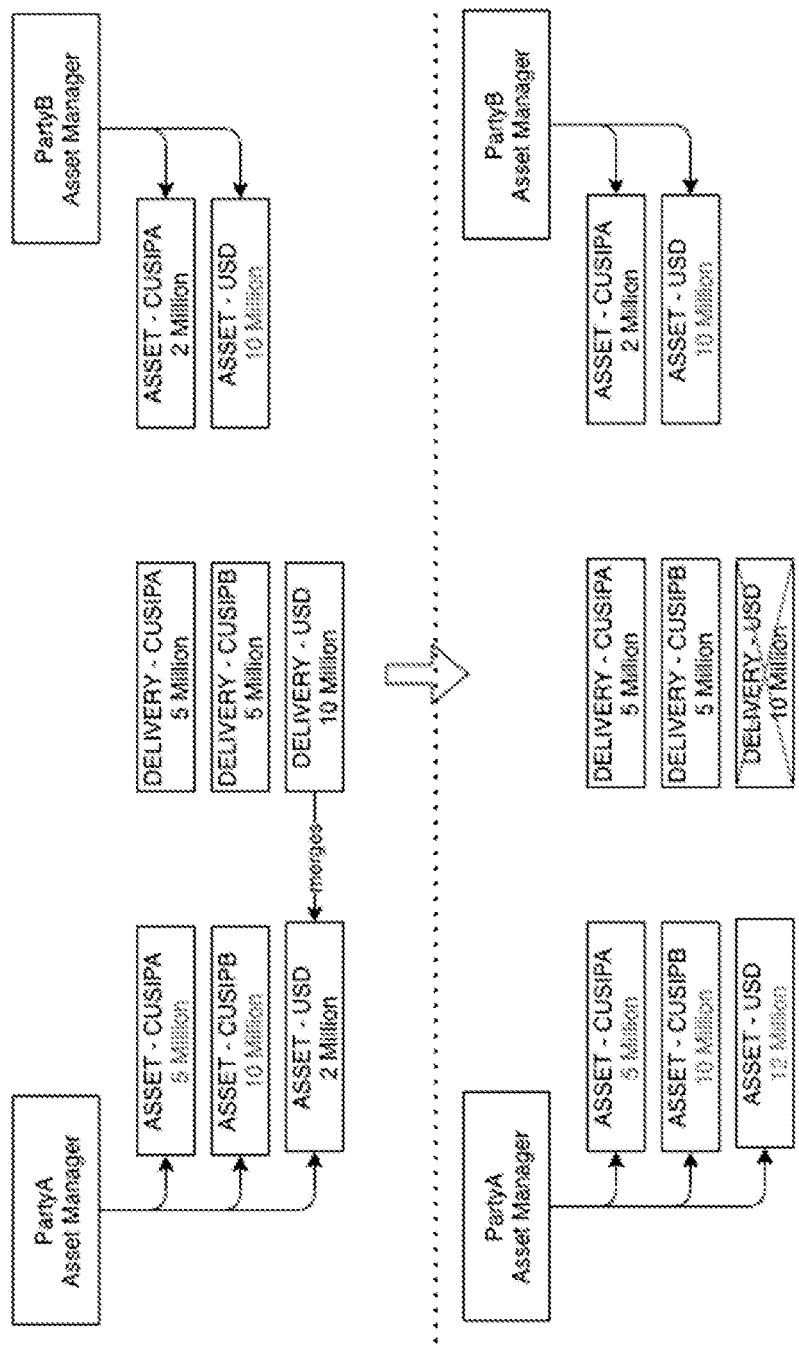

Delivery acceptance where the provider accepts delivery of cash is depicted in FIG. 2K.

Figure 2L:
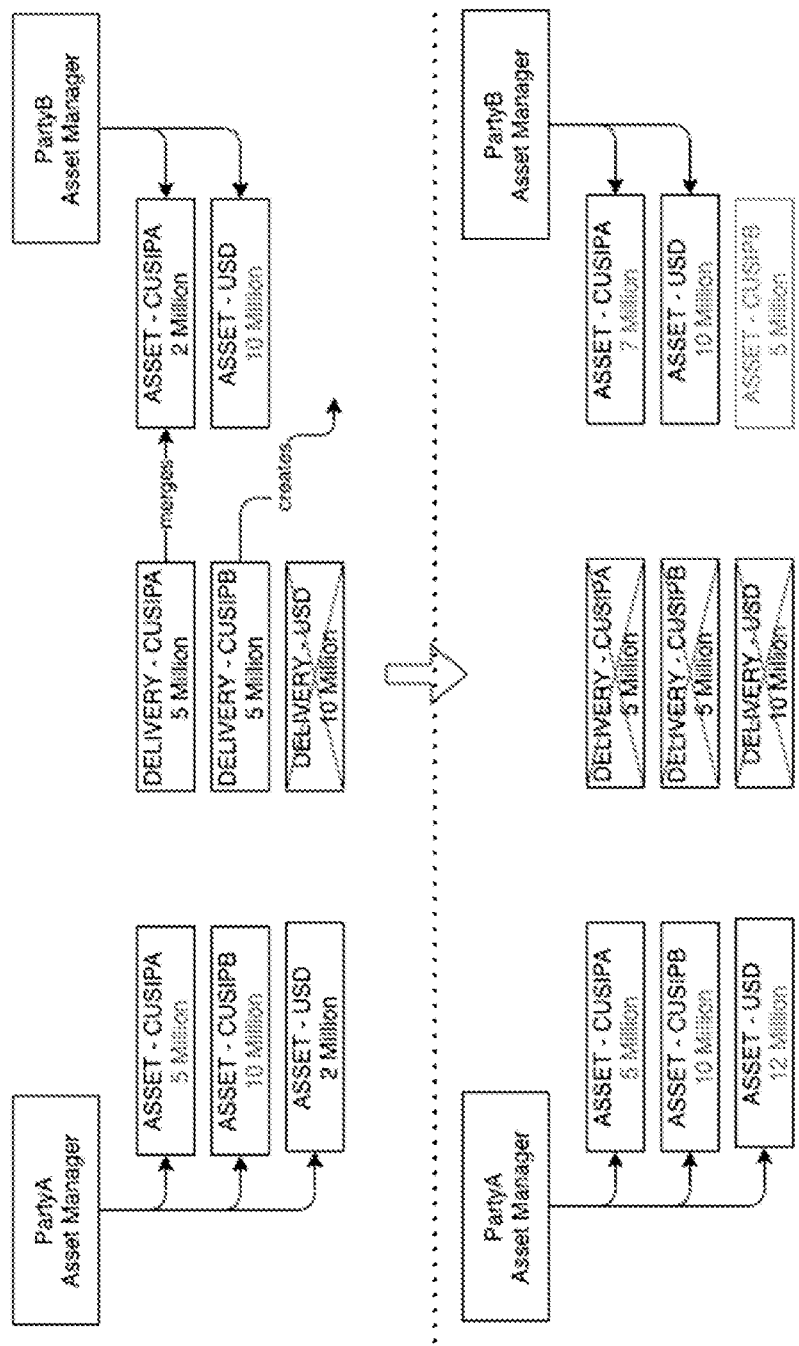

Delivery Acceptance where the receiver accepts delivery of collateral is depicted in FIG. 2L.

Figure 2M:
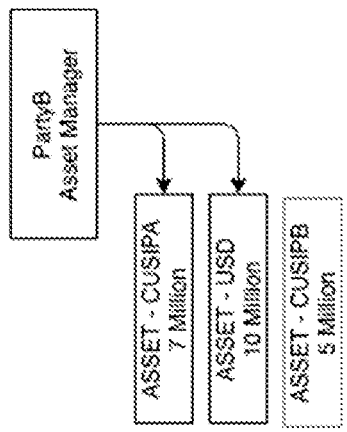
Figure 2M:
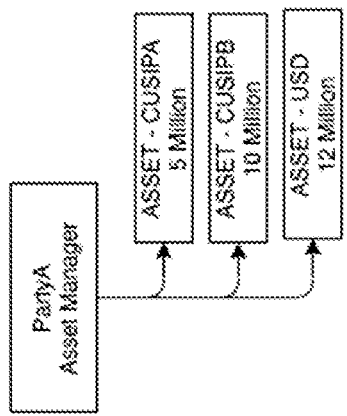
Figure 3A:
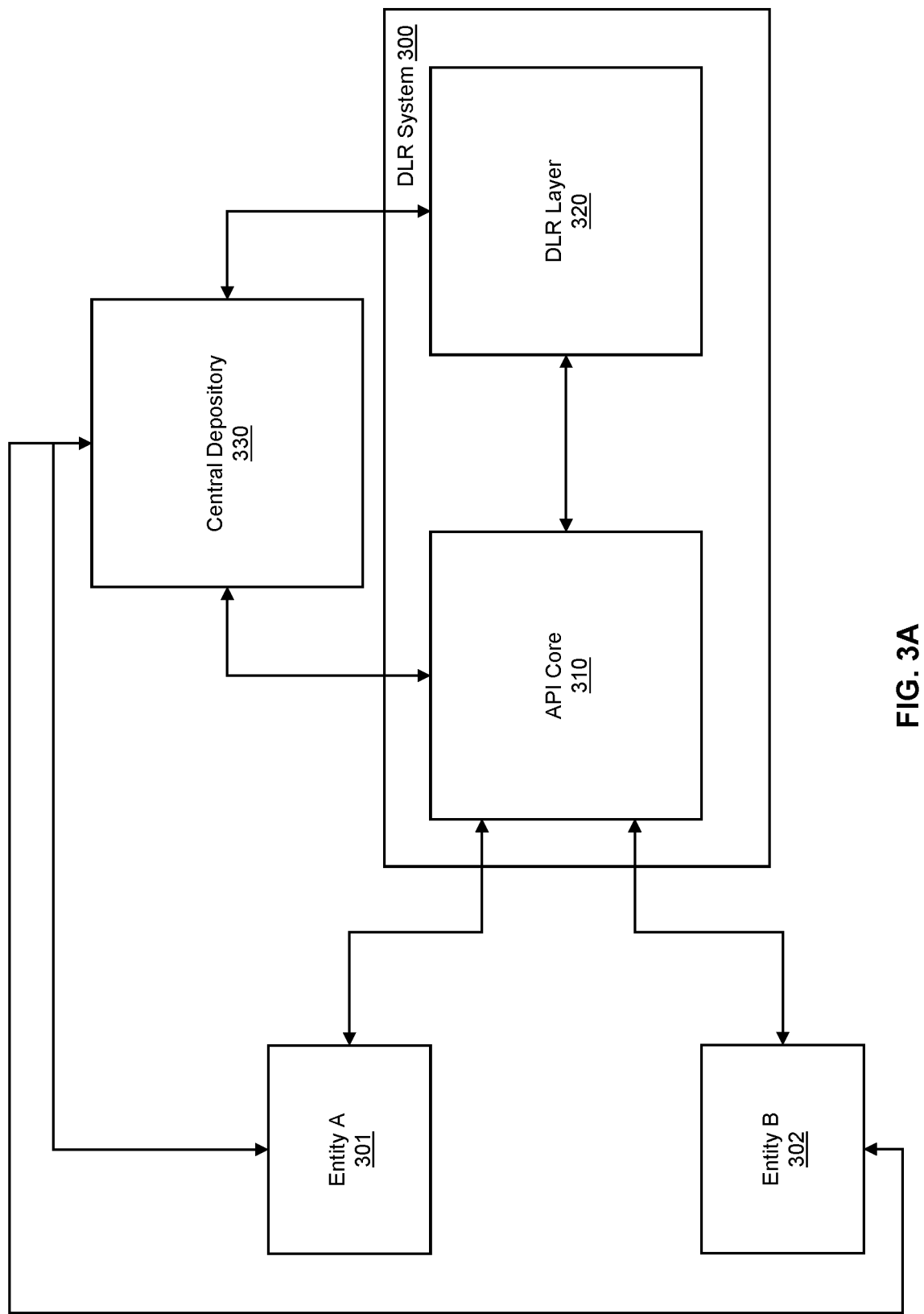
Figure 3B:
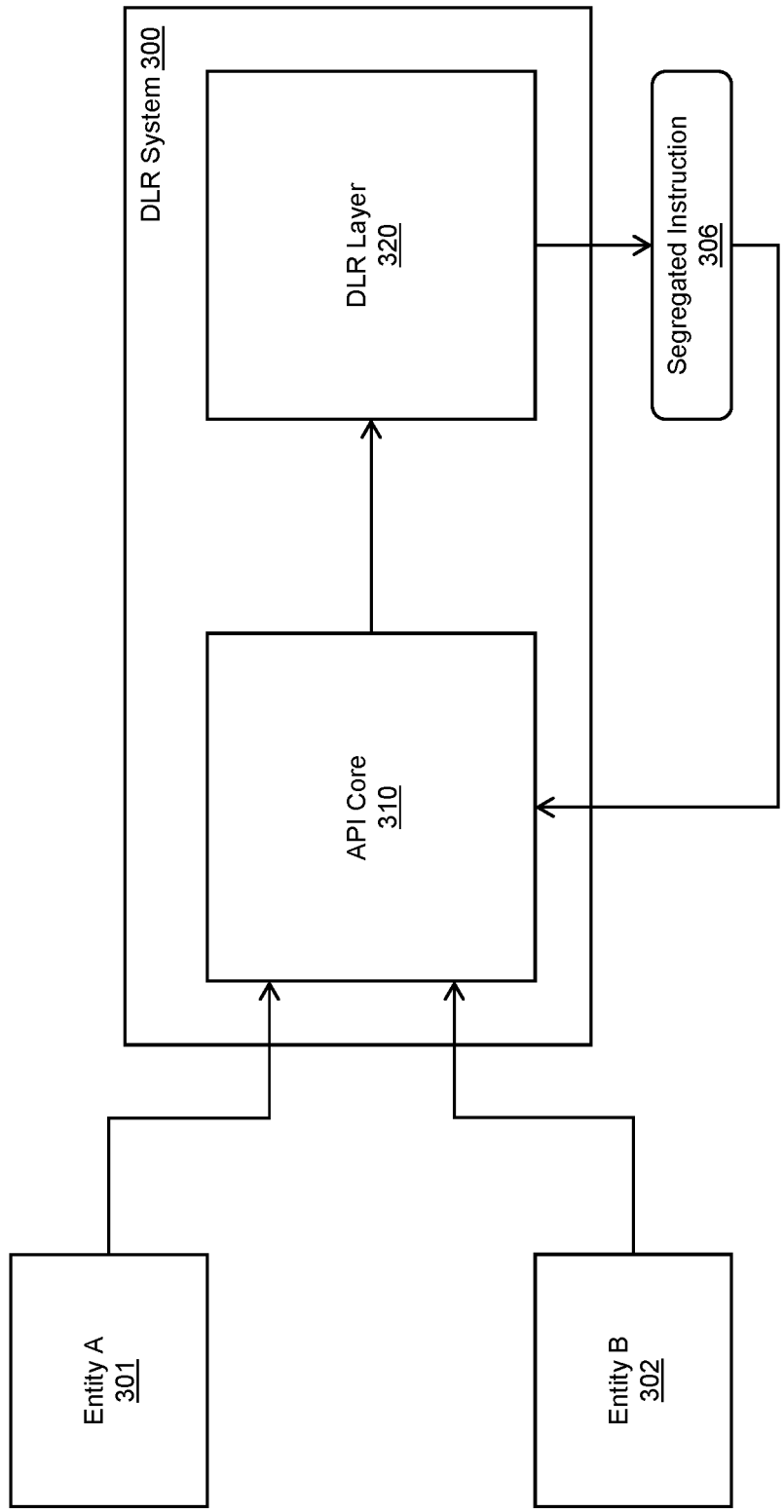
Figure 3C:
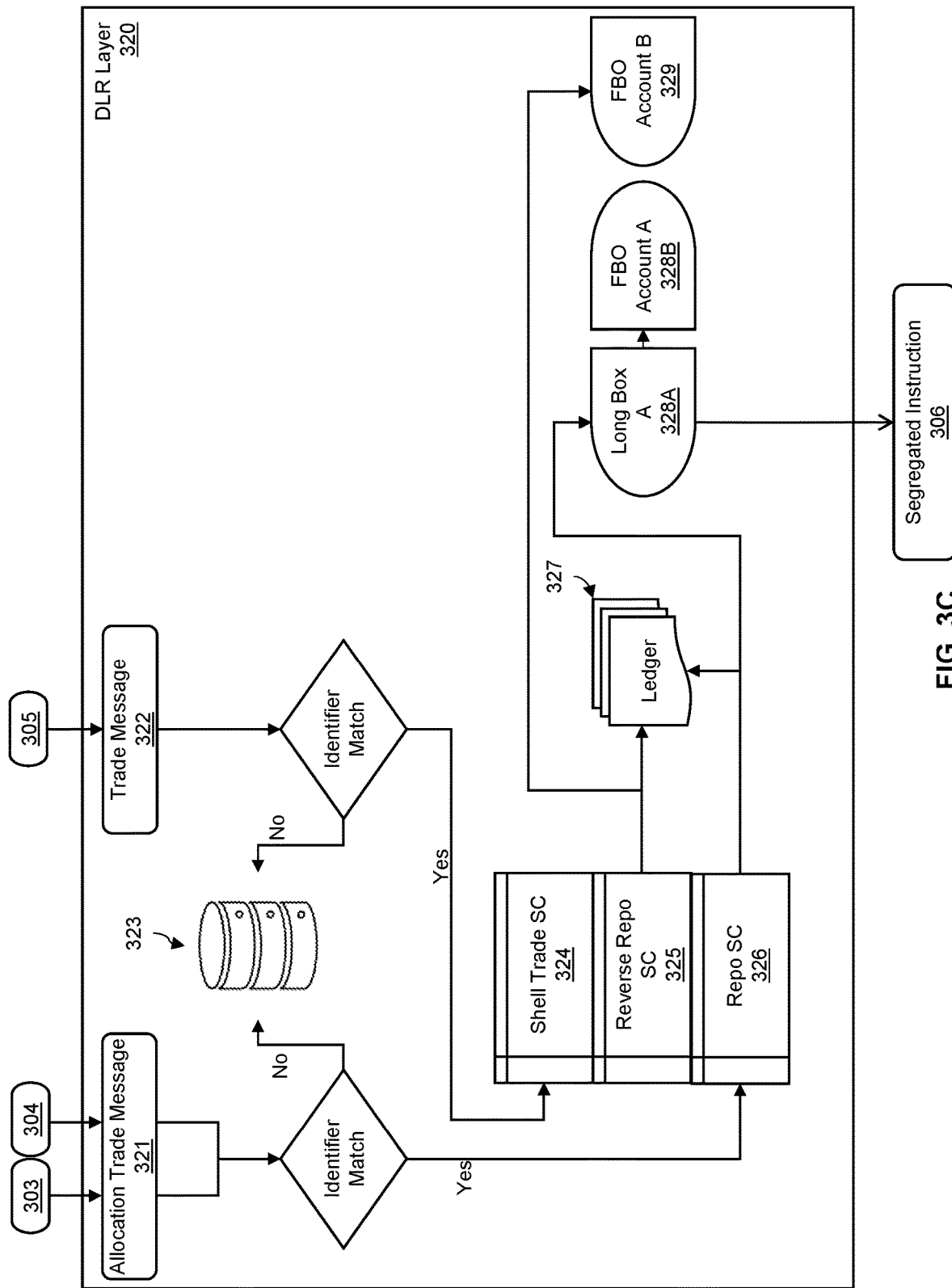
Figure 3D:
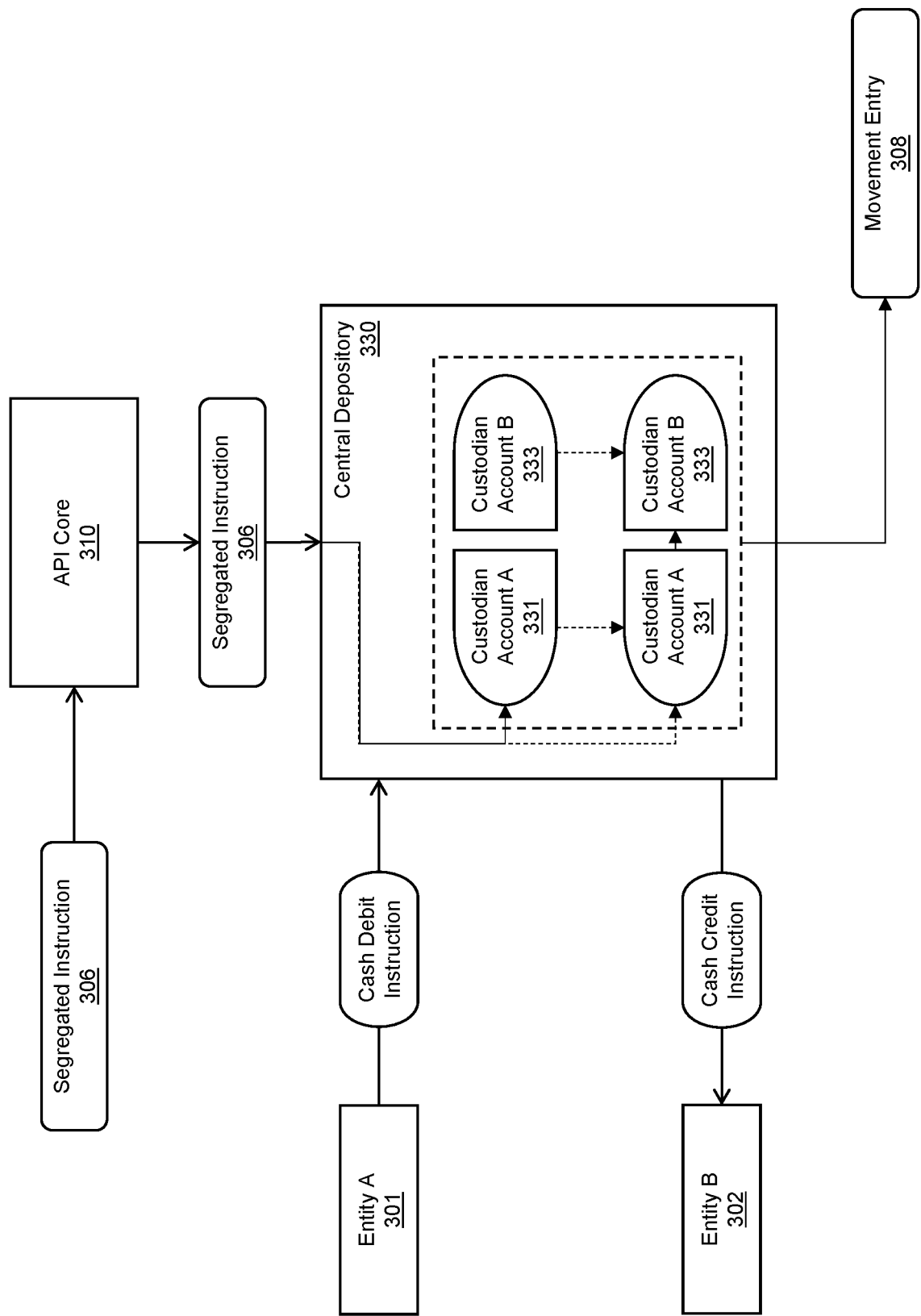
Figure 3E:
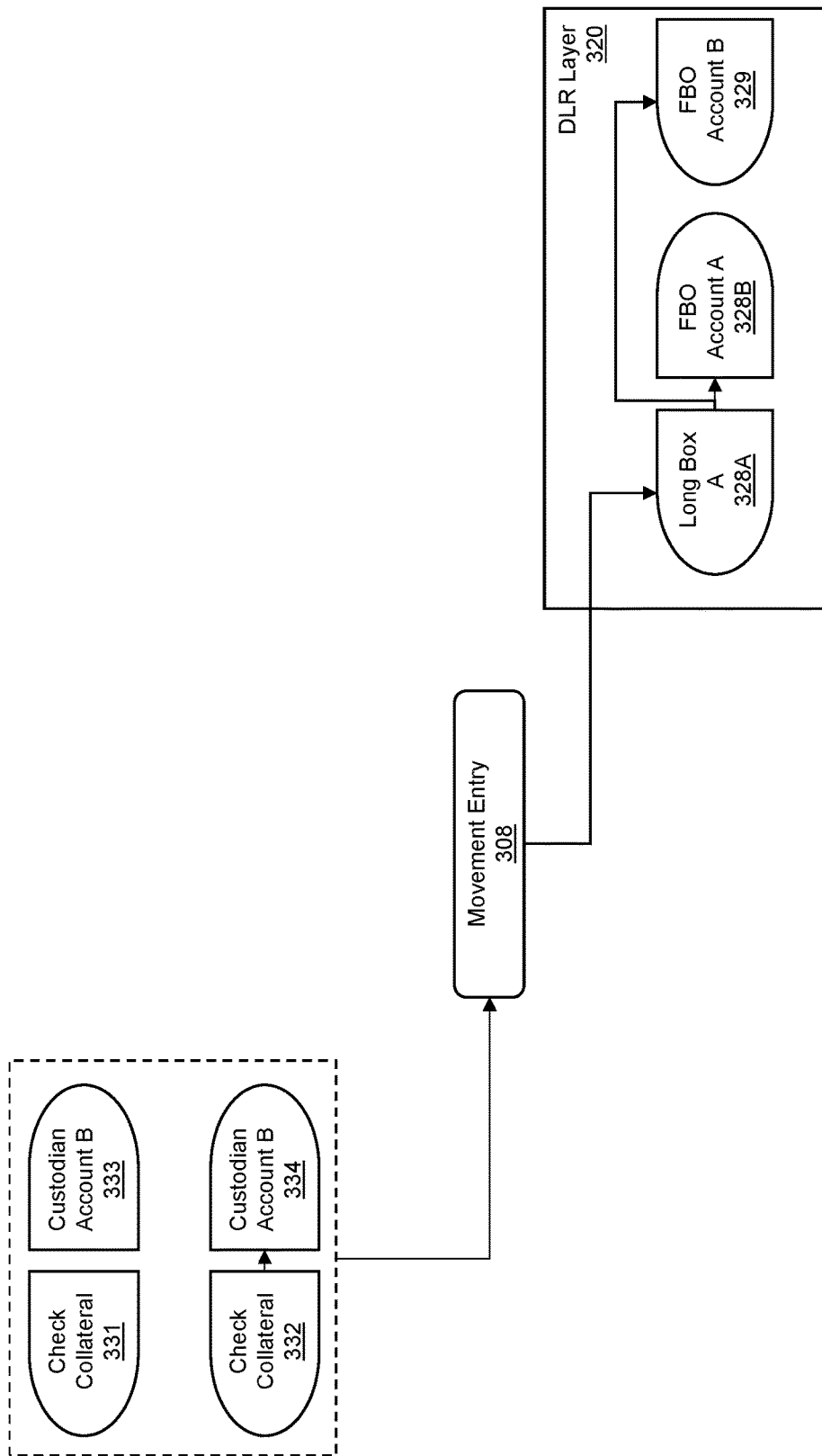
Figure 4A:
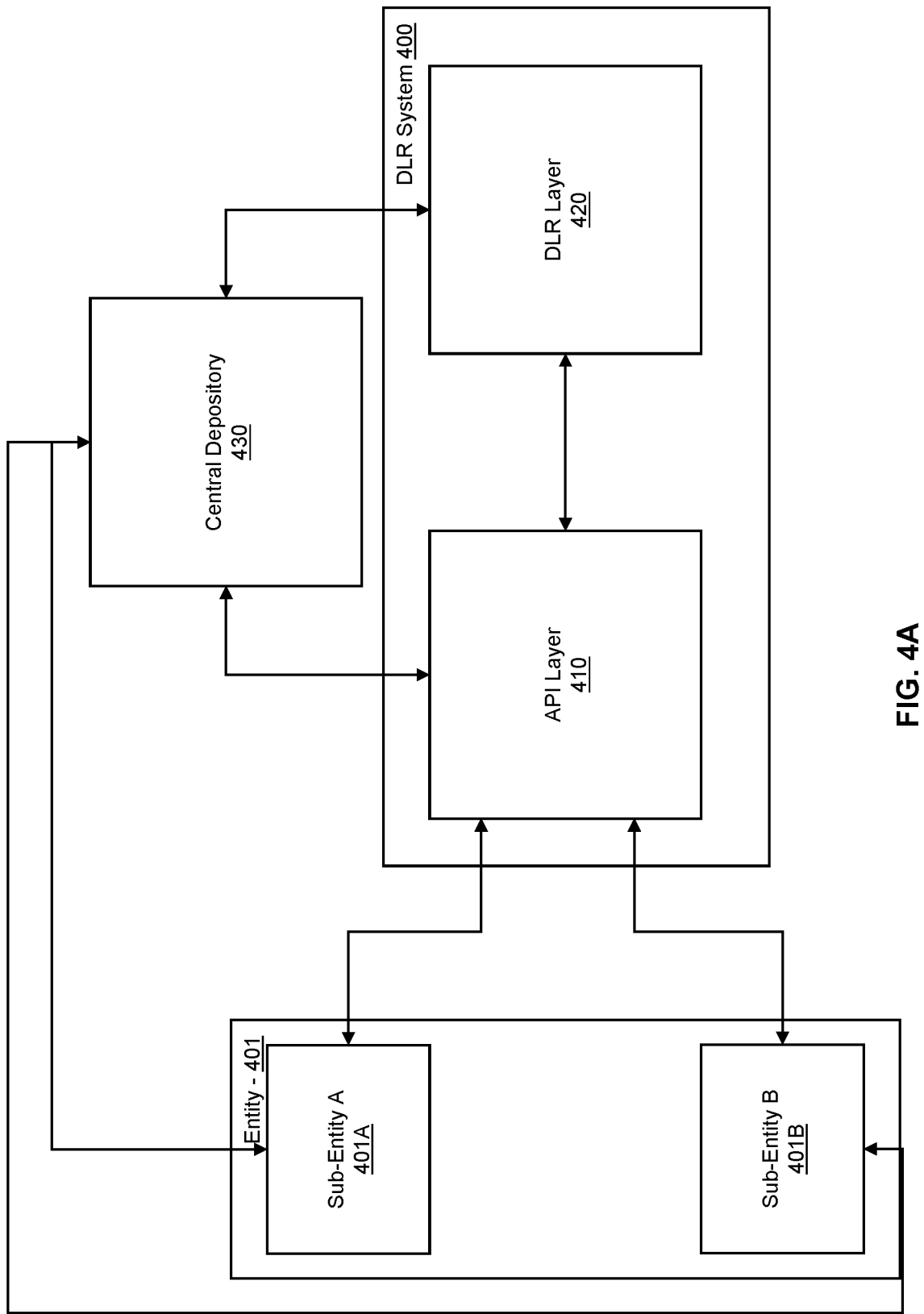
Figure 4B:
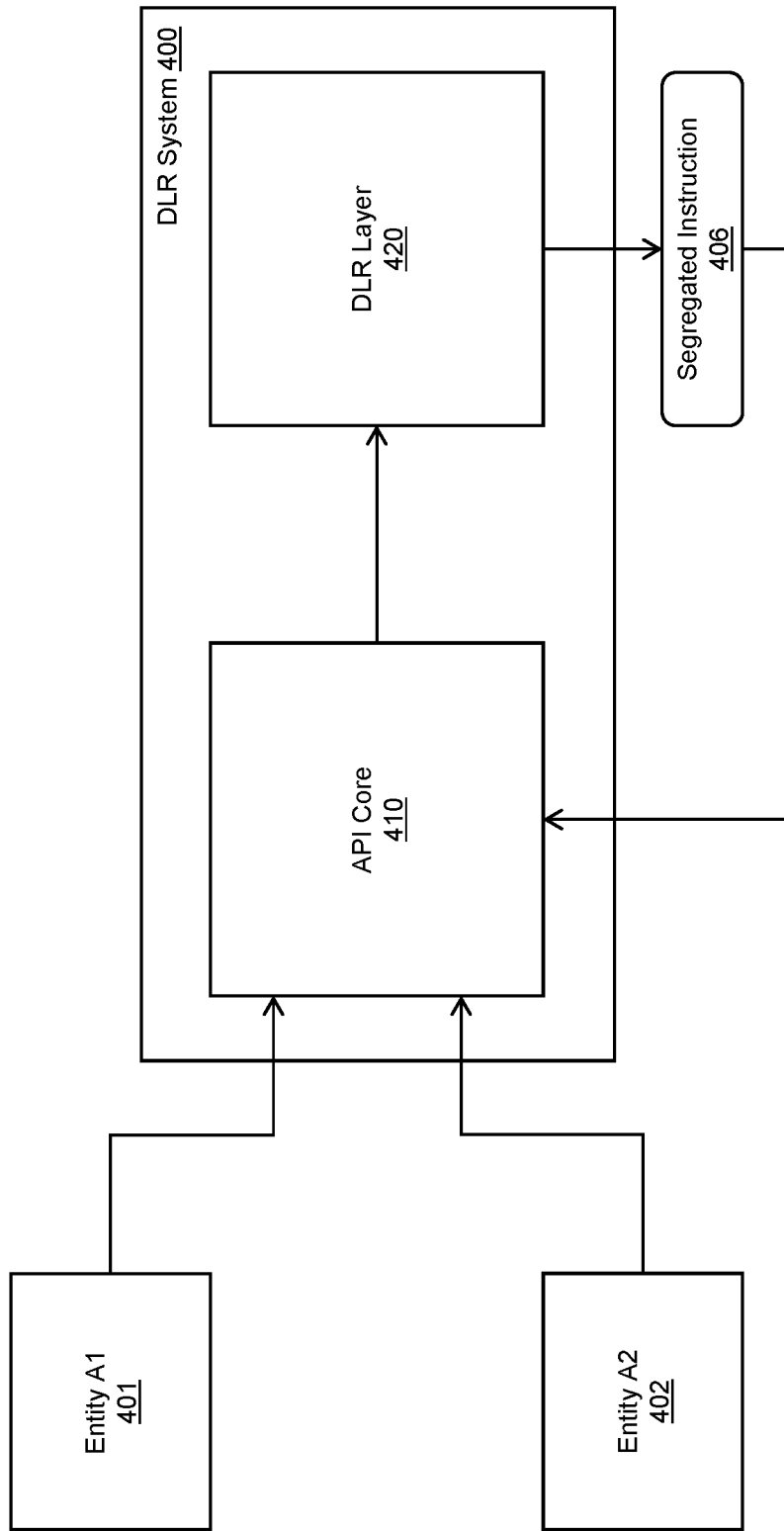
Figure 4C:
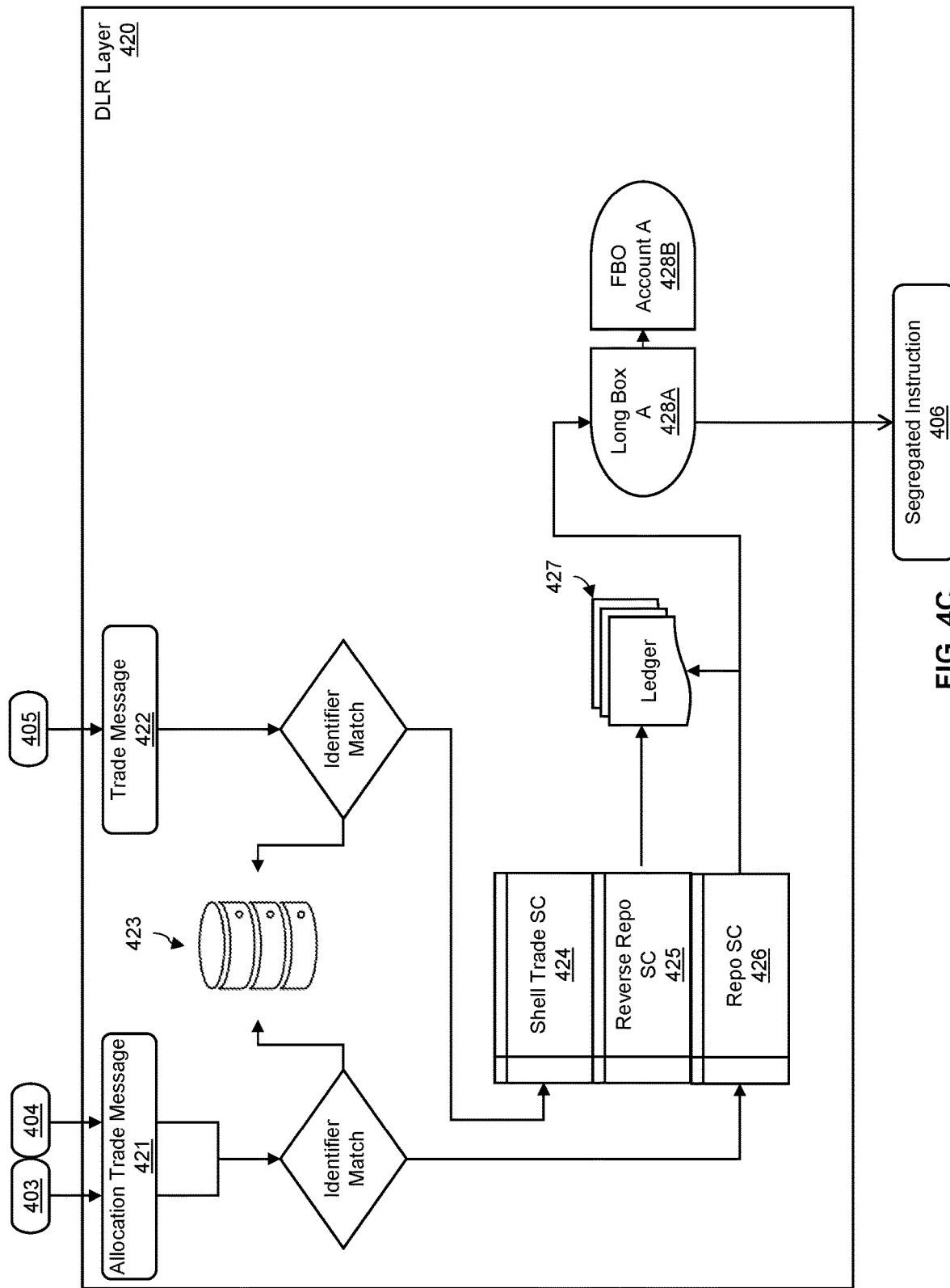
Figure 4D:
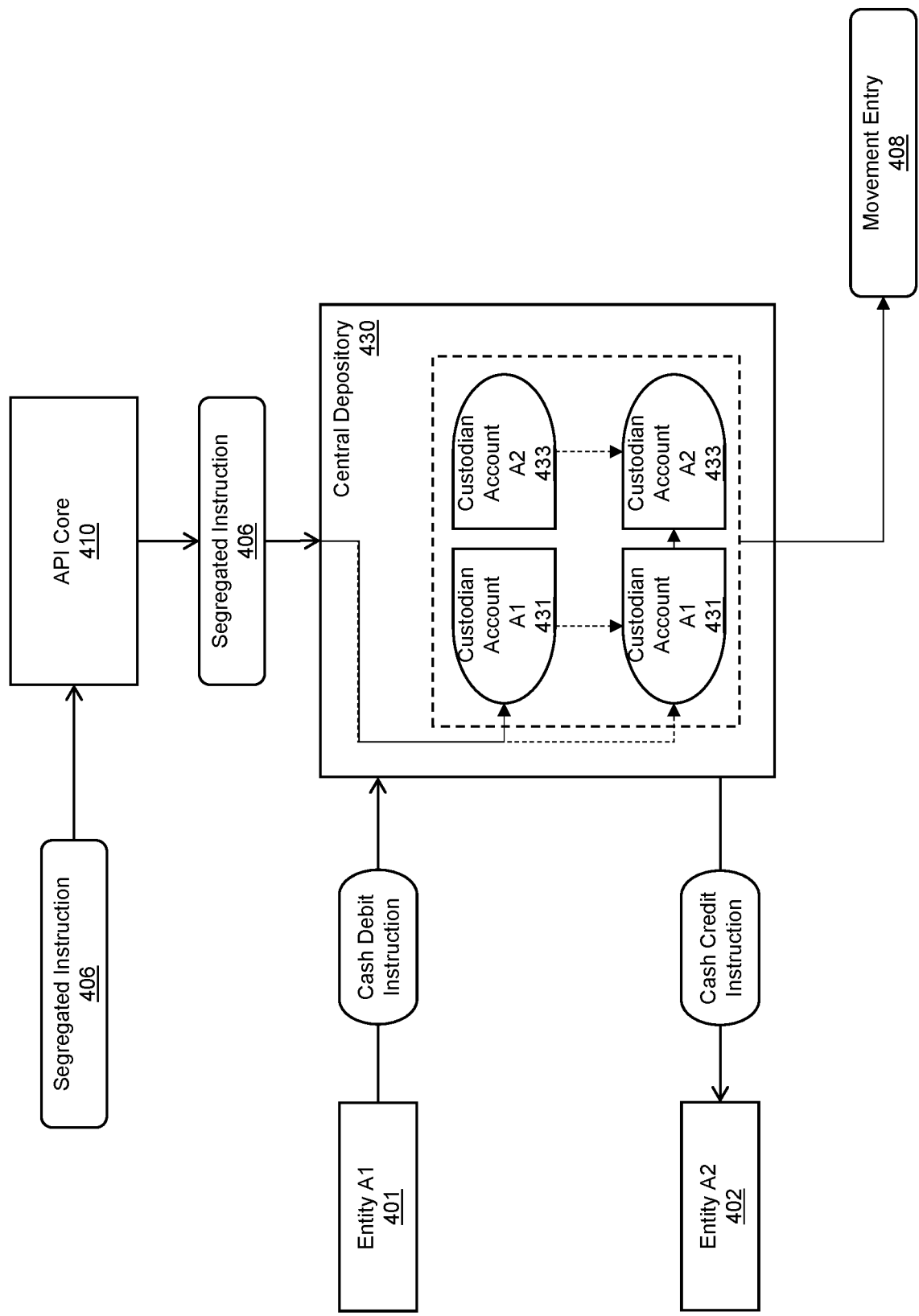
Figure 4E:
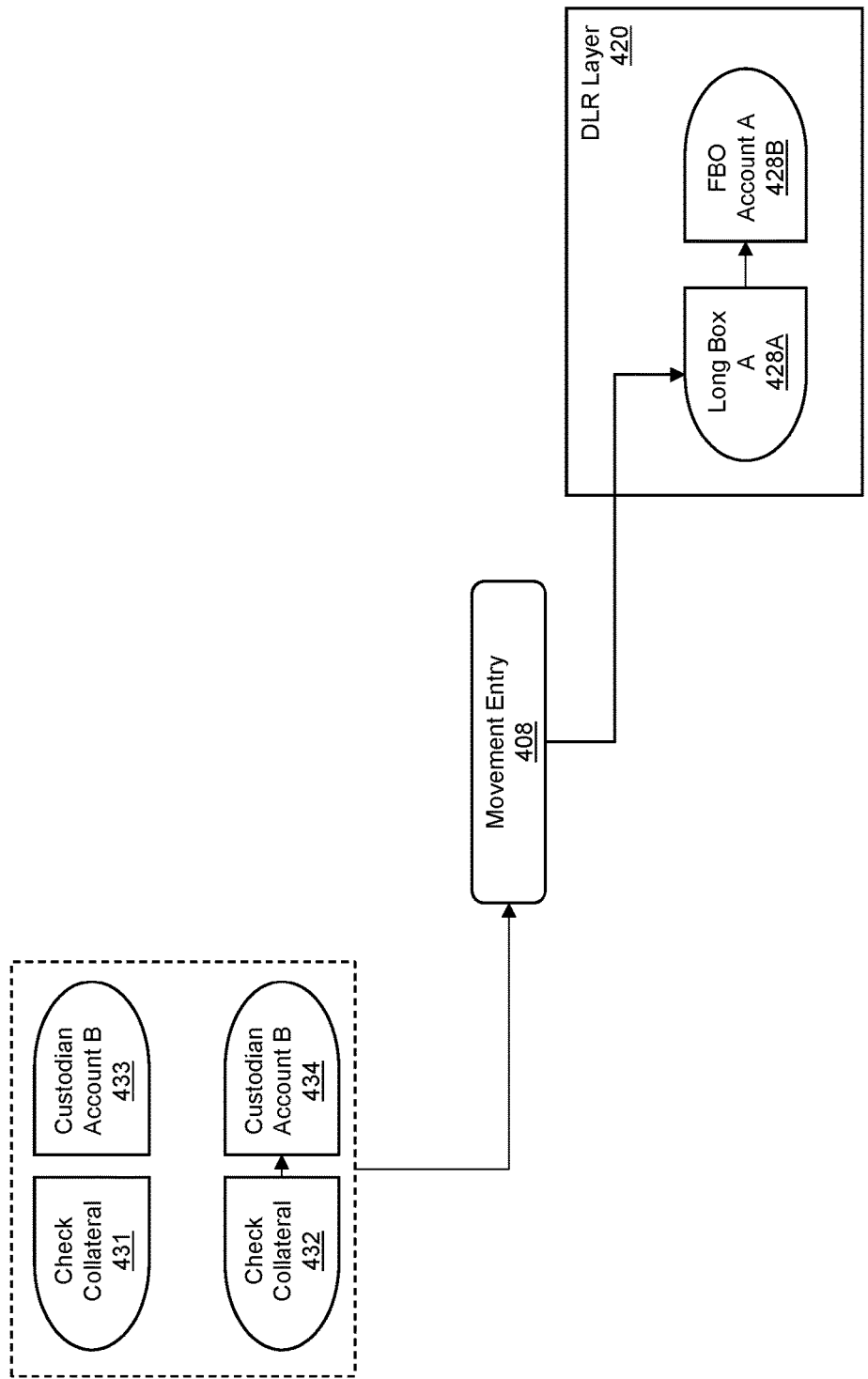
Figure 5A:
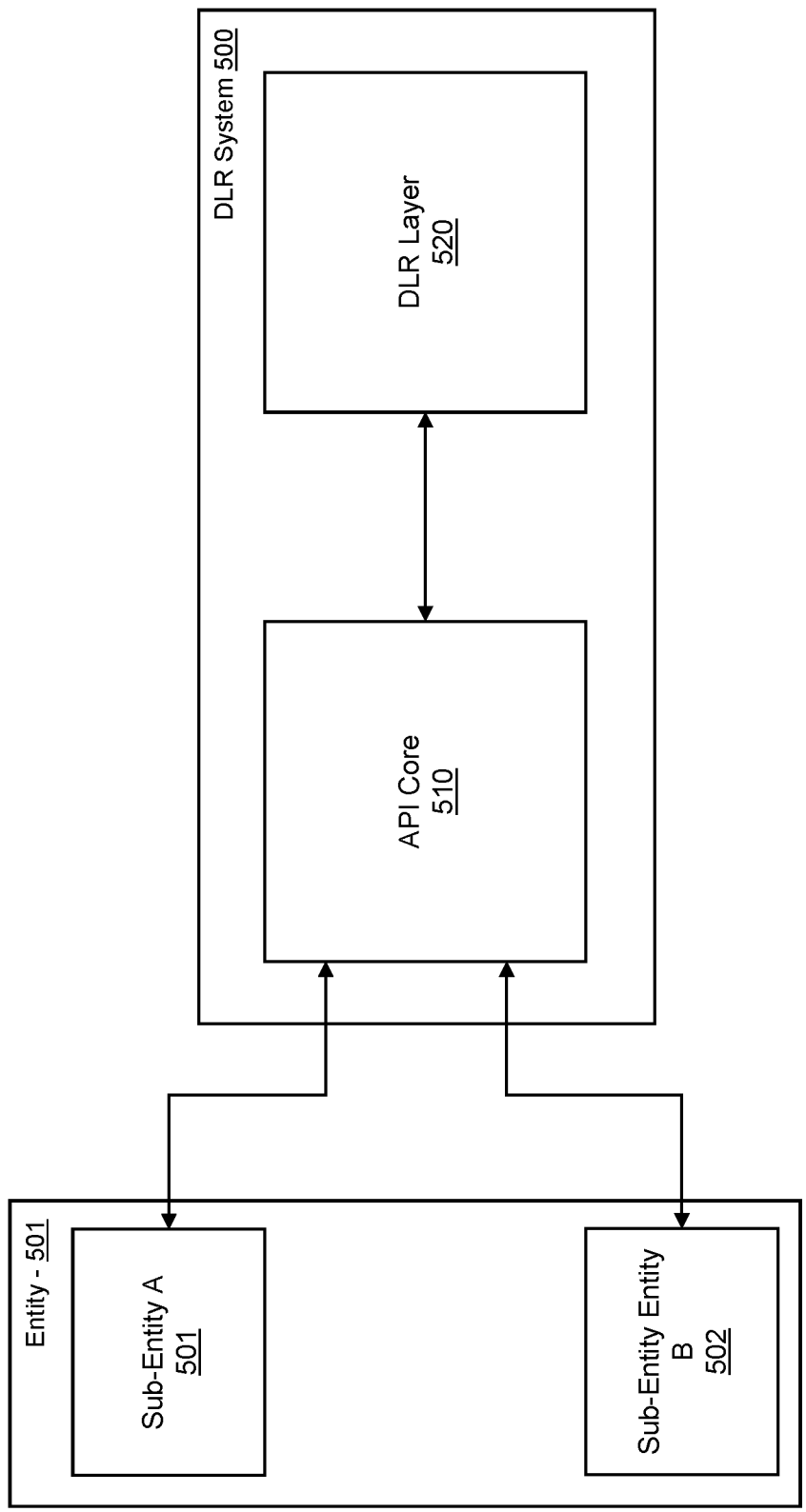
Figure 5B:
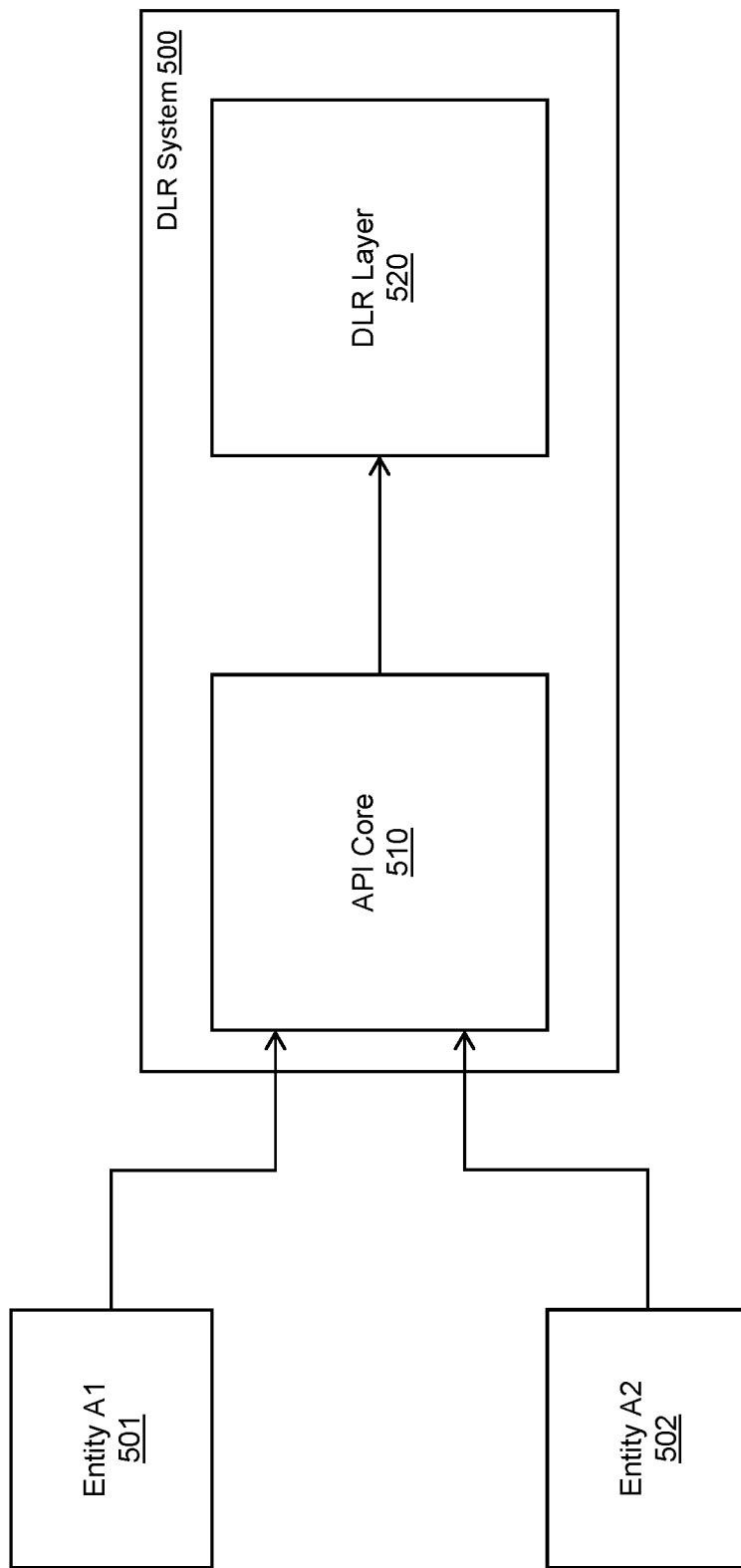
Figure 5C:
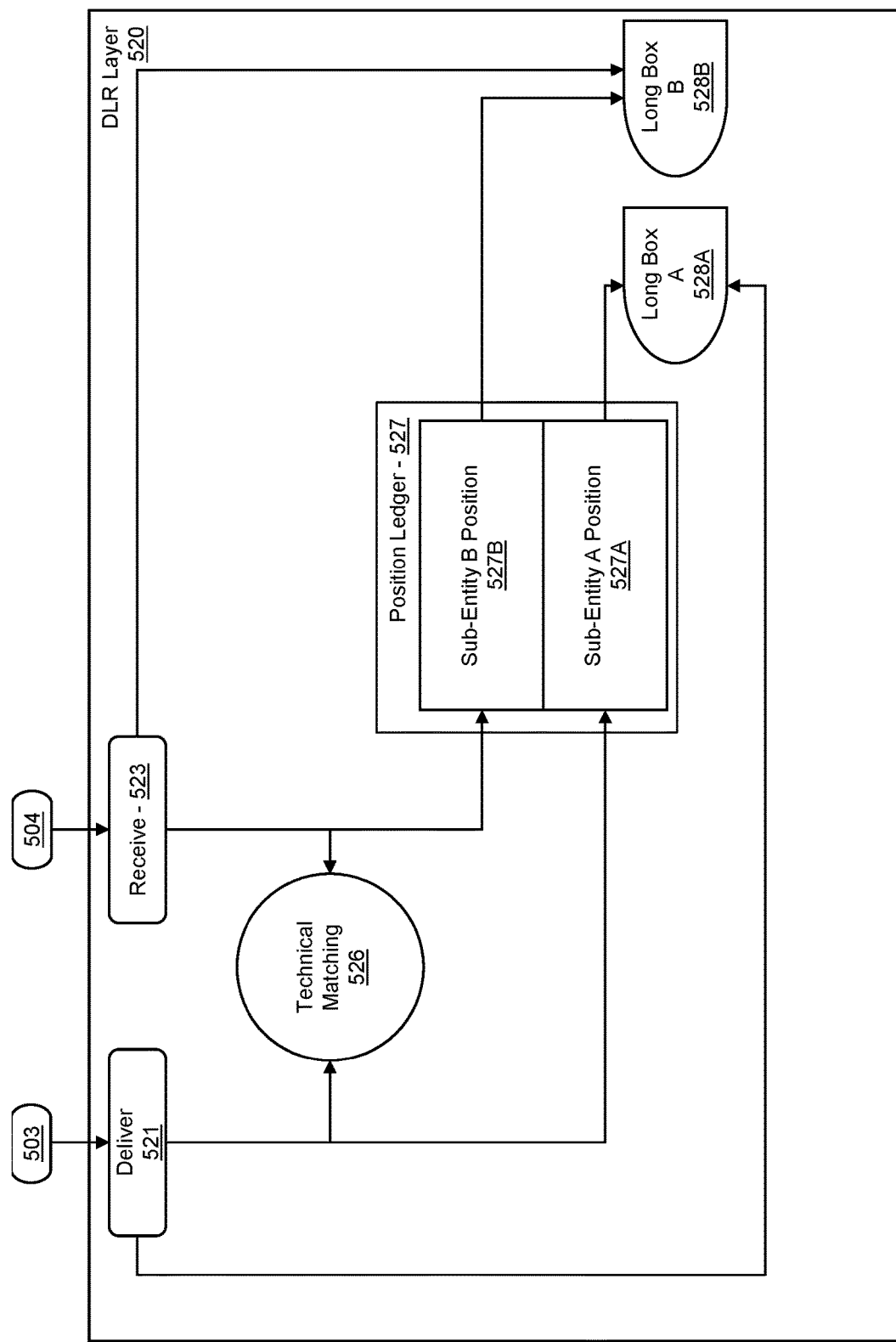
Figure 5D:
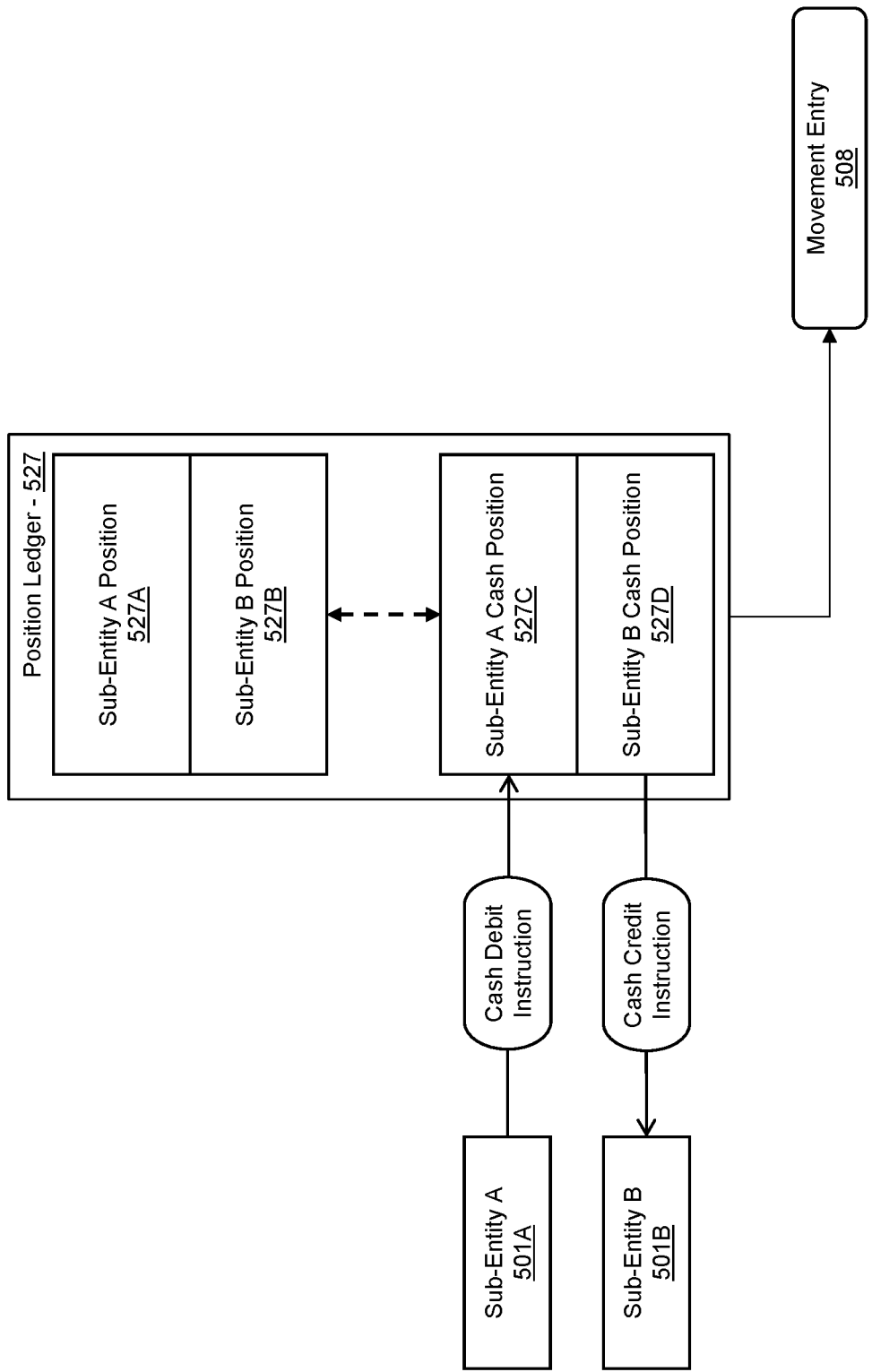

A final inventory after the processes of FIG. 2H-2L is depicted in FIG. 2M. The final inventor in this example may include, e.g., Party A's inventory: Cusip A—5 Million, Cusip B—10 Million, USD—12 Million; Party B's inventory: CUSIPA—7 Million, CUSIPB—5 Million, USD—10 Million.

In some embodiments, each event performed on the distributed ledger layer may be provide to an event management system, e.g., as described for FIG. 1 above. The events may be references in a query store for access by an active contract provider. In some embodiments, a ledger querying service of the API core may therefore query events from the ledger via the active contract provider in order to query contracts and template queries.

FIG. 3A, FIG. 3B, FIG. 3C, FIG. 3D, and FIG. 3E depict a temporary token exchange methodology for paired operation-reverse operation functionality on the DLR system according to one or more embodiments of the present disclosure.

In some embodiments, the DLR system 300 may include a structure that integrates buckets associated with each entity, and held by a third-party custodian. In some embodiments, the entities may include two distinct and unrelated entities.

In some embodiments, an example of a temporary token exchange on the DLR system for paired operation-reverse operation functionality may include, e.g., a repurchase arrangement. In some embodiments, repurchase agreements between parties may be managed on the DLR system using the DLT subject to the terms of the existing standard contracts currently used in the U.S. and U.K. markets for repos, e.g., the Master Repurchase Agreement ("MRA") and the Global Master Repurchase Agreement ("GMRA"). These agreements are governed by New York and English law, respectively. In some embodiments, The DLR solution allows the repo parties, including any third-party custodian, to have visibility, based on permissioning entitlements, to smart contract terms and the collateral as noted on the digital ledger.

Because the MRA does not specifically contemplate the use of a distributed ledger to digitally mirror or represent the collateral or the use of smart contracts to effect specific repo-related steps, users on the DLR system should consider executing an addendum to the MRA to integrate such functionalities into the standard terms of these agreements. Similarly, the users on the DLR system should also consider executing an addendum to any customary custodian agreement to integrate the functionalities of the DLR solution into the custodial process.

In some embodiments, two or more entities, entity A 301 and entity B 302 may interface with the DLR system 300 via an API core 310. In some embodiments, the API layer 310 may include, e.g., the External Data Interface as described in FIG. 1 above, and/or the API core as depicted in FIG. 2A above. In some embodiments, using the API core 310, entity A 301 and entity B 302 may provide instructions to initiate token-based transactions using the SESC's of a DLR layer 320, such as, e.g., the Distribute Ledger Runtime of FIG. 1 and/or the Distributed Ledger Layer of FIG. 2A. In some embodiments, the API core 310 may also facilitate integration of a central depository 330 into the DLR layer 320 to enable the use of custodian accounts for segregating and collateralizing tokens without actually moving the tokens between locations.

In some embodiments, the DLR system 300 may include a requirement that each of entity A 301 and entity B 301 establish two separate accounts, a long box and a "For the Benefit Of" (FBO) account with a custodian including, e.g., the central depository 330. In some embodiments, the central depository 330 may interface with a custodian for both entity A 301 and entity B 302, or with separate custodians for each of entity A 301 and entity B 301.

In some embodiments, the first account that each of entity A 301 and entity B 301 establish with the custodian is a "Long Box Account." The Long Box Account is used to hold securities deposited by an entity for use as collateral to secure the entity's obligation, e.g., the obligation of the selling entity to repurchase a security from the original buyer. The second account that each of entity A 301 and entity B 301 establish with the custodian is a "for the benefit of account" or "FBO Account."

In some embodiments, an entity providing a tokenized asset as collateral for another tokenized asset, such as, e.g., cash, may submit a request to the API core 310. For example, entity A 301 may engage in a paired operation-reverse operation token exchange with Entity B 302 by providing one or more tokenized assets as collateral to entity B 302. In some embodiments, entity A 301, may provide collateral in connection with a temporary token exchange may first deposit the assets that can be used as collateral in entity A's 301 Long Box Account 328A. Although securities in the Long Box Account 328A are intended to be used to meet collateral obligations, such securities are not yet considered collateral by virtue of their deposit into the Long Box Account A 328A, and, therefore, remain under the ownership and control of entity A 301 until actually moved to the FBO Account 328B, which movement occurs upon and in response to, the receipt of a cash payment from the buyer pursuant to a paired operation-reverse operation exchange.

In some embodiments, once moved from the Long Box Account 328A to the FBO Account 328B, however, the securities are deemed to be held as collateral for the benefit of the entity B 302. Holdings in the FBO Account 328B may be held by the custodian pursuant to a "no lien" letter. The letter confirms that the holdings in the FBO Account 328B are not subject to any right, charge, security interest, lien or claim of any kind in favor of the custodian or any person claiming through the custodian.

In some embodiments, as discussed further below, digital representation of collateral on the DLR occurs following the segregation of such collateral with the custodian. Segregation occurs upon the movement of the securities to be used for collateral from the Long Box Account into the FBO Account, which occurs upon the confirmation of cash payment from the buyer of the security being sold. Digital representation enables a specific, tangible real-world asset, such as a specific U.S. Treasury security, to be represented on the digital ledger. This representation will take the form of a one-to-one match, by CUSIP, with the underlying collateral. Accordingly, if there are paired operation-reverse operation exchanges involving two securities with different CUSIPs, two separate digital representations, each representing a different security, respectively, will be added to the digital ledgers.

In some embodiments, the specific steps taken by entity A 301 and entity B 302 with respect to trade acceptance, the initial sale and transfer of collateral, and the repurchase of collateral are outlined below. These steps are also captured by the DLR system 300, which creates a record of each step in the trade initiation and acceptance process.

In some embodiments, entity A 301 may initiate a trade with a request 303 for a trade via a suitable request via the API core 310. In some embodiments, the DLR system 300 may generate a request notification as a result of the request 303 and send the request notification to entity B 302. In some embodiments, entity B 302 receives the request notification, e.g., via the API core 310.

In some embodiments, entity B 302 may select a response 304, e.g., via a suitable input device, to accept or reject the trade. In some embodiments, the selection may be provided to the DLR system 300 via a suitable request via the API core 310. In some embodiments, the DLR system 300 may generate a response notification as a result of entity B's 302 selection and send the response notification to entity A 301. In some embodiments, entity A 301 receives the response notification, e.g., via the API core 310.

In some embodiments, the DLR layer 320 may ingest the request 303 and the response 304 and to form an allocation trade message 321. In some embodiments, the allocation trade message 321 includes terms of the exchange, such as, e.g., dates, digital representation of collateral, nominal value, parties, account information, prices, currency, etc. specified in the request 303, the response 304 or both. In some embodiments, the allocation trade message 321 may be checked for an identifier match. Where the match of identifiers is confirmed, the DLR layer 320 may proceed with the exchange. However, where the match is not confirmed, the exchange may be cancelled and the request 303 and response 304 submitted to a maintenance database 323 to error analysis.

In some embodiments, where the response 304 from entity B 302 accepts the request 303 from entity A 301 and the identifiers match, the DLR layer 310 may trigger the generation of a smart contract governing the exchange. In some embodiments, the smart contract may include, e.g., specific terms for the paired operation-reverse operation exchange (e.g., dates, digital representation of collateral, nominal value, parties, account information, prices, currency).

In some embodiments, to govern both the operation and the reverse operation of the paired operation-reverse operation exchange, the DLR layer 320 may generate a repo smart contract 326 governing the operation of transferring collateralized tokens from entity A 301 to entity B 302, and a reverse repo smart contract 325 to govern the reverse operation of returning the collateralized tokens to entity A 301 upon repayment of a second token.

In some embodiments and, optionally, in combination of any embodiment described above or below, one or more SESCs (e.g., smart contracts) may be configured to track ownership transfer and that allows a third-party (e.g., a regulator) to track asset ownership. For example, the exemplary API core 310 may be programmed to allow external system(s) or API to perform asset token ownership transfer.

For example, one or more SESCs (e.g., smart contracts) may include self-executing code directed to verifying issuance rule(s) such as, but not limited to:
  i. checking if a participant has a segregated custody account setup in existing books and record,
  ii. confirming that a participant, issuing an asset, must locate and move a position (an asset) in a segregated custody account (e.g., locked HIC account of the EOP member node),
  iii. confirming that the participant can only issue quantity equivalent to the position quantity locked in the segregated custody account (e.g., locked HIC account of the EOP member node), and/or
  iv. confirming participant's identity and signature.

For example, one or more SESCs (e.g., smart contracts) may include self-executing code directed to verifying settlement conditions such as, but not limited to:
  i. checking if asset tokens with a given CUSIP and quantity are owned and available with a lender party, and/or
  ii. checking if the available token quantity is greater than required quantity, it would split the token amount into, for example without limitation, two asset token sub-amounts.

In some embodiments, entity A 301 and entity B 302 are committed to the paired operation-reverse operation exchange. This triggers the initial sale and transfer or settlement phase of the transaction.

In some embodiments, the repo smart contract 326 and the reverse repo smart contract 325 are submitted to the digital ledger 327. As a result, tokens assigned to the long box A 328A of entity A 301 are reassigned, and thus transferred, to the FBO account A 328B of entity A 301 for the benefit of entity B 302. In some embodiments, the reverse repo smart contract 325 may control the FBO account B 329 of entity B 302 such that upon receipt of the second token from entity B 302 into the FBO account B 329, a transfer to entity A 301 in the ledger 327 may be executed.

In some embodiments, the repo smart contract 326 may trigger a segregated instruction 306 upon reassigning the tokens to the FBO account A 328B. In some embodiments, the segregated instruction 306 may be communicated to the central depository 330, e.g., via the API core 310. In some embodiments, the central depository 330 holding the physical tokens may check collateral in the custodian account A 331 matching the instructed token collateralization of the segregated instruction 406. Based on contents of entity A's 301 long box A 328A availability of the collateralized asset may be verified and segregated by the custodian at the central depository 330. Upon satisfying the collateral check 331, the collateral check 332 may trigger a transfer of the tokens into the FBO account B 334, where the FBO account B 334 holds the physical assets represented in the FBO account B 329 on the ledger 327.

In some embodiments, to fulfill the opening leg of the exchange, the central depository 330 may issue a cash credit instruction to entity B 302 and a cash debit instruction of corresponding value to entity A 301 according to the terms of the paired operation-reverse operation exchange, and thus provide the agreed upon second asset (e.g., cash) to entity A 301. As a result of the transfer of the second asset, the collateralized token may be moved from the custodian account A 331 of entity A 301 to the custodian account B 333 of entity B 302.

In some embodiments, as a result of the movement into the custodian account B 333, the central depository 330 may issue a movement entry 308, e.g., via the API core 310 back to the DLR layer 320. In some embodiments, the movement entry 308 may trigger terms of the repo smart contract 326 to cause a reassignment of the collateralized tokens from the FBO account A 328B to the FBO account A 329, thus recording to the movement on the ledger 327 for verifiable and immutable segregation, collateralization and movement of tokenized assets for the opening leg of the paired operation-reverse operation exchange. Accordingly, the ledger 327 may accomplish asset segregation while maintaining the physical assets at the central depository 430, thus reducing resources in transfer the asset while also reducing vectors for attach and fraud.

In some embodiments, movement of the collateral to entity B's 302 FBO Account 329 triggers the creation of a digital representation of the collateral on the digital ledger 327 and the sending of a settlement notification from the DLR system 300 to the parties confirming that the collateral has been allocated from entity A 301 to entity B 302 on the distributed ledger 327.

In some embodiments, a closing leg of the paired operation-reverse operation exchange may be triggered based on the reverse smart contract 325 terms. The closing leg mirrors the opening leg except the entities are switched, in that entity B 302 is holder of the collateralized token for transfer into the FBO account A 328A to entity A 301 based on the reverse repo smart contract 325 rather than the repo smart contract 326. Thus, entity A 301 is instructed to pay the second asset back to entity B 302, cuasing the central depository 430 to move the collateralized asset from the custodian account B 333 to the custodian account A 331, and triggering a movement entry 308 to the DLR layer 320 to record the movement by reassigning the collateralized tokens from the FBO account B 329 to the FBO account A 328B.

In some embodiments, the DLR system 300 may also send a settlement notification and represents on the ledger that the collateral and cash have been allocated to the appropriate parties.

FIG. 4A, FIG. 4B, FIG. 4C, FIG. 4D and FIG. 4E depict a temporary token exchange methodology for paired operation-reverse operation functionality on the DLR system between two sub-entities of one entity according to one or more embodiments of the present disclosure. In some embodiments, the DLR system 400 may include a structure that integrates buckets associated with an entity 401 by including separate buckets for each sub-entity of the entity 401. Accordingly, in some embodiments, sub-entity A 401A of entity 401 and sub-entity B 401B of entity 401 may each have two buckets held by a third-party custodian.

In some embodiments, an example of a temporary token exchange on the DLR system for paired operation-reverse operation functionality may include, e.g., a repurchase arrangement. In some embodiments, repurchase agreements between parties may be managed on the DLR system using the DLT subject to the terms of the existing standard contracts currently used in the U.S. and U.K. markets for repos, e.g., the Master Repurchase Agreement ("MRA") and the Global Master Repurchase Agreement ("GMRA"). These agreements are governed by New York and English law, respectively. In some embodiments, The DLR solution allows the repo parties, including any third-party custodian, to have visibility, based on permissioning entitlements, to smart contract terms and the collateral as noted on the digital ledger.

Because the MRA does not specifically contemplate the use of a distributed ledger to digitally mirror or represent the collateral or the use of smart contracts to effect specific repo-related steps, users on the DLR system should consider executing an addendum to the MRA to integrate such functionalities into the standard terms of these agreements. Similarly, the users on the DLR system should also consider executing an addendum to any customary custodian agreement to integrate the functionalities of the DLR solution into the custodial process.

In some embodiments, two or more entities, sub-entity A 401A and sub-entity B 401B may interface with the DLR system 400 via an API core 410. In some embodiments, the API layer 410 may include, e.g., the External Data Interface as described in FIG. 1 above, and/or the API core as depicted in FIG. 2A above. In some embodiments, using the API core 410, sub-entity A 401A and sub-entity B 401B may provide instructions to initiate token-based transactions using the SESC's of a DLR layer 420, such as, e.g., the Distribute Ledger Runtime of FIG. 1 and/or the Distributed Ledger Layer of FIG. 2A. In some embodiments, the API core 410 may also facilitate integration of a central depository 430 into the DLR layer 420 to enable the use of custodian accounts for segregating and collateralizing tokens without actually moving the tokens between locations.

In some embodiments, the DLR system 400 may include a requirement that each of sub-entity A 401A and entity B 401 establish two separate accounts, a long box And a "For the Benefit Of" (FBO) account with a custodian including, e.g., the central depository 430. In some embodiments, the central depository 430 may interface with a custodian for both sub-entity A 401A and sub-entity B 401B, or with separate custodians for each of sub-entity A 401A and entity B 401.

In some embodiments, the first account that each of sub-entity A 401A and entity B 401 establish with the custodian is a "Long Box Account." The Long Box Account is used to hold securities deposited by an entity for use as collateral to secure the entity's obligation, e.g., the obligation of the selling entity to repurchase a security from the original buyer. The second account that each of sub-entity A 401A and entity B 401 establish with the custodian is a "for the benefit of account" or "FBO Account."

In some embodiments, an entity providing a tokenized asset as collateral for another tokenized asset, such as, e.g., cash, may submit a request to the API core 410. For example, sub-entity A 401A may engage in a paired operation-reverse operation token exchange with Sub-entity B 401B by providing one or more tokenized assets as collateral to sub-entity B 401B. In some embodiments, sub-entity A 401A, may provide collateral in connection with a temporary token exchange may first deposit the assets that can be used as collateral in entity A's 401 Long Box Account 428A. Although securities in the Long Box Account 428A are intended to be used to meet collateral obligations, such securities are not yet considered collateral by virtue of their deposit into the Long Box Account A1 428A, and, therefore, remain under the ownership and control of sub-entity A 401A until actually moved to the FBO Account 428B, which movement occurs upon and in response to, the receipt of a cash payment from the buyer pursuant to a paired operation-reverse operation exchange.

In some embodiments, once moved from the Long Box Account 428A to the FBO Account 428B, however, the securities are deemed to be held as collateral for the benefit of the sub-entity B 401B. Holdings in the FBO Account 428B may be held by the custodian pursuant to a "no lien" letter. The letter confirms that the holdings in the FBO Account 428B are not subject to any right, charge, security interest, lien or claim of any kind in favor of the custodian or any person claiming through the custodian.

In some embodiments, as discussed further below, digital representation of collateral on the DLR occurs following the segregation of such collateral with the custodian. Segregation occurs upon the movement of the securities to be used for collateral from the Long Box Account into the FBO Account, which occurs upon the confirmation of cash payment from the buyer of the security being sold. Digital representation enables a specific, tangible real-world asset, such as a specific U.S. Treasury security, to be represented on the digital ledger. This representation will take the form of a one-to-one match, by CUSIP, with the underlying collateral. Accordingly, if there are paired operation-reverse operation exchanges involving two securities with different CUSIPs, two separate digital representations, each representing a different security, respectively, will be added to the digital ledgers.

In some embodiments, the specific steps taken by sub-entity A 401A and sub-entity B 401B with respect to trade acceptance, the initial sale and transfer of collateral, and the repurchase of collateral are outlined below. These steps are also captured by the DLR system 400, which creates a record of each step in the trade initiation and acceptance process.

In some embodiments, sub-entity A 401A may initiate a trade with a request 403 for a trade via a suitable request via the API core 410. In some embodiments, the DLR system 400 may generate a request notification as a result of the request 403 and send the request notification to sub-entity B 401B. In some embodiments, sub-entity B 401B receives the request notification, e.g., via the API core 410.

In some embodiments, sub-entity B 401B may select a response 404, e.g., via a suitable input device, to accept or reject the trade. In some embodiments, the selection may be provided to the DLR system 400 via a suitable request via the API core 410. In some embodiments, the DLR system 400 may generate a response notification as a result of entity B's 402 selection and send the response notification to sub-entity A 401A. In some embodiments, sub-entity A 401A receives the response notification, e.g., via the API core 410.

In some embodiments, the DLR layer 420 may ingest the request 403 and the response 404 and to form an allocation trade message 421. In some embodiments, the allocation trade message 421 includes terms of the exchange, such as, e.g., dates, digital representation of collateral, nominal value, parties, account information, prices, currency, etc. specified in the request 403, the response 404 or both. In some embodiments, the allocation trade message 421 may be checked for an identifier match. Where the match of identifiers is confirmed, the DLR layer 420 may proceed with the exchange. However, where the match is not confirmed, the exchange may be cancelled and the request 403 and response 404 submitted to a maintenance database 423 to error analysis.

In some embodiments, where the response 404 from sub-entity B 401B accepts the request 403 from sub-entity A 401A and the identifiers match, the DLR layer 410 may trigger the generation of a smart contract governing the exchange. In some embodiments, the smart contract may include, e.g., specific terms for the paired operation-reverse operation exchange (e.g., dates, digital representation of collateral, nominal value, parties, account information, prices, currency).

In some embodiments, to govern both the operation and the reverse operation of the paired operation-reverse operation exchange, the DLR layer 420 may generate a repo smart contract 426 governing the operation of transferring collateralized tokens from sub-entity A 401A to sub-entity B 401B, and a reverse repo smart contract 425 to govern the reverse operation of returning the collateralized tokens to sub-entity A 401A upon repayment of a second token.

In some embodiments and, optionally, in combination of any embodiment described above or below, one or more SESCs (e.g., smart contracts) may be configured to track ownership transfer and that allows a third-party (e.g., a regulator) to track asset ownership. For example, the exemplary API core 410 may be programmed to allow external system(s) or API to perform asset token ownership transfer.

For example, one or more SESCs (e.g., smart contracts) may include self-executing code directed to verifying issuance rule(s) such as, but not limited to:
v. checking if a participant has a segregated custody account setup in existing books and record,
vi. confirming that a participant, issuing an asset, must locate and move a position (an asset) in a segregated custody account (e.g., locked HIC account of the EOP member node),
vii. confirming that the participant can only issue quantity equivalent to the position quantity locked in the segregated custody account (e.g., locked HIC account of the EOP member node), and/or
viii. confirming participant's identity and signature.

For example, one or more SESCs (e.g., smart contracts) may include self-executing code directed to verifying settlement conditions such as, but not limited to:
iii. checking if asset tokens with a given CUSIP and quantity are owned and available with a lender party, and/or
iv. checking if the available token quantity is greater than required quantity, it would split the token amount into, for example without limitation, two asset token sub-amounts.

In some embodiments, sub-entity A 401A and sub-entity B 401B are committed to the paired operation-reverse operation exchange. This triggers the initial sale and transfer or settlement phase of the transaction.

In some embodiments, the repo smart contract 426 and the reverse repo smart contract 425 are submitted to the digital ledger 427. As a result, tokens assigned to the long box A1 428A of sub-entity A 401A are reassigned, and thus transferred, to the FBO account A1 428B of sub-entity A 401A for the benefit of sub-entity B 401B. In some embodiments, the reverse repo smart contract 425 may control the FBO account A2 429 of sub-entity B 401B such that upon receipt of the second token from sub-entity B 401B into the FBO account A2 429, a transfer to sub-entity A 401A in the ledger 427 may be executed.

In some embodiments, the repo smart contract 426 may trigger a segregated instruction 406 upon reassigning the tokens to the FBO account A1 428B. In some embodiments, the segregated instruction 406 may be communicated to the central depository 430, e.g., via the API core 410. In some embodiments, the central depository 430 holding the physical tokens may check collateral in the custodian account A1 431 matching the instructed token collateralization of the segregated instruction 406. Based on contents of entity A's 401 long box A1 428A availability of the collateralized asset may be verified and segregated by the custodian at the central depository 430. Upon satisfying the collateral check 431, the collateral check 432 may trigger a transfer of the tokens into the FBO account A2 434, where the FBO account A2 434 holds the physical assets represented in the FBO account A2 429 on the ledger 427.

In some embodiments, to fulfill the opening leg of the exchange, the central depository 430 may issue a cash credit instruction to sub-entity B 401B and a cash debit instruction of corresponding value to sub-entity A 401A according to the terms of the paired operation-reverse operation exchange, and thus provide the agreed upon second asset (e.g., cash) to sub-entity A 401A. As a result of the transfer of the second asset, the collateralized token may be moved from the custodian account A1 431 of sub-entity A 401A to the custodian account A2 433 of sub-entity B 401B.

In some embodiments, as a result of the movement into the custodian account A2 433, the central depository 430 may issue a movement entry 408, e.g., via the API core 410 back to the DLR layer 420. In some embodiments, the movement entry 408 may trigger terms of the repo smart contract 426 to cause a reassignment of the collateralized tokens from the FBO account A1 428B to the FBO account A1 429, thus recording to the movement on the ledger 427 for verifiable and immutable segregation, collateralization and movement of tokenized assets for the opening leg of the paired operation-reverse operation exchange. Accordingly, the ledger 427 may accomplish asset segregation while maintaining the physical assets at the central depository 430, thus reducing resources in transfer the asset while also reducing vectors for attach and fraud.

In some embodiments, movement of the collateral to entity B's 402 FBO Account 429 triggers the creation of a digital representation of the collateral on the digital ledger 427 and the sending of a settlement notification from the DLR system 400 to the parties confirming that the collateral has been allocated from sub-entity A 401A to sub-entity B 401B on the distributed ledger 427.

In some embodiments, a closing leg of the paired operation-reverse operation exchange may be triggered based on the reverse smart contract 425 terms. The closing leg mirrors the opening leg except the entities are switched, in that sub-entity B 401B is holder of the collateralized token for transfer into the FBO account A1 428A to sub-entity A 401A based on the reverse repo smart contract 425 rather than the repo smart contract 426. Thus, sub-entity A 401A is instructed to pay the second asset back to sub-entity B 401B, causing the central depository 430 to move the collateralized asset from the custodian account A2 433 to the custodian account A1 431, and triggering a movement entry 408 to the DLR layer 420 to record the movement by reassigning the collateralized tokens from the FBO account A2 429 to the FBO account A1 428B.

In some embodiments, the DLR system 400 may also send a settlement notification and represents on the ledger that the collateral and cash have been allocated to the appropriate parties.

FIG. 5A, FIG. 5B, FIG. 5C, and FIG. 5D depict a temporary token exchange methodology for paired operation-reverse operation functionality on the DLR system between two sub-entities of one entity without using any custodian according to one or more embodiments of the present disclosure In some embodiments, the DLR system 500 may be configured to perform paired operation-reverse operation exchanges for intra-entity token and asset movements. For example, an entity 501 may have two sub-entities, sub-entity A 501A and sub-entity B 501B. In some embodiments, to further improve the efficiency of the exchange, the central depository may be omitted and a unified depository location integrated with the DLR layer 520. In some embodiments, the unified depository location may include of a single account for both sub-entity A 501 and sub-entity B 502 of the entity 501, which may be held at a third party custodian or internally on the books and records of one of sub-entity A 501 and sub-entity B 502, which may also act as the custodian on the transaction.

In some embodiments, an example of a temporary token exchange on the DLR system for paired operation-reverse operation functionality may include, e.g., a repurchase arrangement. In some embodiments, repurchase agreements between sub-entities of a single entity, such as, e.g., subsidiaries, may be managed on the DLR system using the DLT subject to the terms of the existing standard contracts currently used in the U.S. and U.K. markets for repos, e.g., the Master Repurchase Agreement ("MRA") and the Global Master Repurchase Agreement ("GMRA"). These agreements are governed by New York and English law, respectively. In some embodiments, The DLR solution allows the repo parties, including any third-party custodian, to have visibility, based on permissioning entitlements, to smart contract terms and the collateral as noted on the digital ledger.

Because the MRA does not specifically contemplate the use of a distributed ledger to digitally mirror or represent the collateral or the use of smart contracts to effect specific repo-related steps, users on the DLR system should consider executing an addendum to the MRA to integrate such functionalities into the standard terms of these agreements. Similarly, the users on the DLR system should also consider executing an addendum to any customary custodian agreement to integrate the functionalities of the DLR solution into the custodial process.

In some embodiments, sub-entity A 501A and sub-entity B 501B may interface with the DLR system 500 via an API core 510. In some embodiments, the API layer 510 may include, e.g., the External Data Interface as described in FIG. 1 above, and/or the API core as depicted in FIG. 2A above. In some embodiments, using the API core 510, sub-entity A 501A and sub-entity B 501B may provide instructions to initiate token-based transactions using the SESC's of a DLR layer 520, such as, e.g., the Distribute Ledger Runtime of FIG. 1 and/or the Distributed Ledger Layer of FIG. 2A. In some embodiments, because sub-entity A 501A and sub-entity B 501B are sub-entities of a common entity 501, a central depository 530 can be skipped during the execution of the exchange of assets on in the DLR layer 520. Rather, the DLR layer 520 may incorporate a position ledger 527 associated with entity 501 to record asset positions across each sub-entity of the entity 501. Thus, the position ledger 527 may function as a stand-in of the central depository for use by the custodian. This allows for the actual assets to be held in a single location under a single entity's 501 account, with positions tracked across long box accounts via the position ledger 527.

In some embodiments, the DLR system 500 may include a requirement that each of sub-entity A 501A and sub-entity B 501B may establish an account under the entity 501 in the position ledger 527. In some embodiments, the accounts may include a long box A 528A associated with sub-entity A 501A and a long box B 528B for sub-entity B 501B. In some embodiments, each Long Box is used to hold securities deposited by each sub-entity for use as collateral to secure the sub-entity's obligation, e.g., the obligation of the selling entity to repurchase a security from the original buyer.

In some embodiments, an entity providing a tokenized asset as collateral for another tokenized asset, such as, e.g., cash, may submit a request to the API core 510. For example, sub-entity A 501A may engage in a paired operation-reverse operation token exchange with Sub-entity B 501B by providing one or more tokenized assets as collateral to sub-entity B 501B. In some embodiments, sub-entity A 501A, may provide collateral in connection with a temporary token exchange may first deposit the assets that can be used as collateral in entity A's 501 Long Box Account 528A. Although securities in the Long Box Account 528A are intended to be used to meet collateral obligations, such securities are not yet considered collateral by virtue of their deposit into the Long Box A 528A, and, therefore, remain under the ownership and control of sub-entity A 501A until the position is reallocated to the long box account 528B of sub-entity B 501B, which movement occurs upon and in response to, the receipt of a cash payment from the buyer pursuant to a paired operation-reverse operation exchange.

In some embodiments, as discussed further below, digital representation of collateral on the DLR occurs following the reallocation of such collateral with the custodian. Reallocation occurs upon the movement of the securities to be used for collateral from the Long Box Account A 528A into the long box account B 528B, which occurs upon the confirmation of cash payment from the buyer of the security being sold. Digital representation enables a specific, tangible real-world asset, such as a specific U.S. Treasury security, to be represented on the digital ledger. This representation will take the form of a one-to-one match, by CUSIP, with the underlying collateral. Accordingly, if there are paired operation-reverse operation exchanges involving two securities with different CUSIPs, two separate digital representations, each representing a different security, respectively, will be added to the digital ledgers.

In some embodiments, the specific steps taken by sub-entity A 501A and sub-entity B 501B with respect to trade acceptance, the initial sale and transfer of collateral, and the repurchase of collateral are outlined below. These steps are also captured by the DLR system 500, which creates a record of each step in the trade initiation and acceptance process.

In some embodiments, sub-entity A 501A may initiate a trade with a request 503 for a trade via a suitable request via the API core 510. In some embodiments, the DLR system 500 may generate a request notification as a result of the request 503 and send the request notification to sub-entity B 501B. In some embodiments, sub-entity B 501B receives the request notification, e.g., via the API core 510.

In some embodiments, sub-entity B 501B may select a response 504, e.g., via a suitable input device, to accept or reject the trade. In some embodiments, the selection may be provided to the DLR system 500 via a suitable request via the API core 510. In some embodiments, the DLR system 500 may generate a response notification as a result of entity B's 502 selection and send the response notification to sub-entity A 501A. In some embodiments, sub-entity A 501A receives the response notification, e.g., via the API core 510.

In some embodiments, the DLR layer 520 may ingest the request 503 and the response 504. The DLR layer 520 may generate a deliver 521 request based on the request 503 and a receive 523 request based on the response 504. In some embodiments In some embodiments, the delivery 521 and receive 522 may include terms of the exchange, such as, e.g., dates, digital representation of collateral, nominal value, parties, account information, prices, currency, etc. specified in the request 503, the response 504 or both. This agreement will also specify the obligations of the party in whose name the account is maintained, or on whose books and records the account is maintained, to manage the account and to reflect the allocation of collateral therein on its own books and records and on the digital ledger. In some embodiments, the agreement will specifically contain terms providing that one repo party acknowledges that it is holding the security for the purchaser following the repo transaction.

In some embodiments, the allocation trade message 521 may be checked for an identifier match using technical matching 526 and sufficient position in the long box A 528A to satisfy the terms are checked. Where the match of identifiers is confirmed, the DLR layer 520 may proceed with the exchange. In some embodiments, based on the delivery 521 and the receive 523, a sub-entity A position 527A is updated in the position ledger 527 to reflect the reduced position in long box A 528A. Similarly, based on the delivery 521 and the receive 523, a sub-entity B position 527B is updated in the position ledger 527 to reflect the increased position in long box B 528B based on the reallocation from the long box A 528A.

Thus, in some embodiments, where the response 504 from sub-entity B 501B accepts the request 503 from sub-entity A 501A and the identifiers match, the DLR layer 510 may trigger the generation of a smart contract governing the exchange. In some embodiments, the smart contract may include, e.g., specific terms for the paired operation-reverse operation exchange (e.g., dates, digital representation of collateral, nominal value, parties, account information, prices, currency).

In some embodiments, to govern both the operation and the reverse operation of the paired operation-reverse operation exchange, similar to the description above with respect to FIGS. 3A-3E and FIGS. 4A-4E, the DLR layer 520 may generate a repo smart contract governing the operation of transferring collateralized tokens from sub-entity A 501A to sub-entity B 501B, and a reverse repo smart contract to govern the reverse operation of returning the collateralized tokens to sub-entity A 501A upon repayment of a second token.

In some embodiments and, optionally, in combination of any embodiment described above or below, one or more SESCs (e.g., smart contracts) may be configured to track ownership transfer and that allows a third-party (e.g., a regulator) to track asset ownership. For example, the exemplary API core 510 may be programmed to allow external system(s) or API to perform asset token ownership transfer.

For example, one or more SESCs (e.g., smart contracts) may include self-executing code directed to verifying issuance rule(s) such as, but not limited to:

ix. checking if a participant has a segregated custody account setup in existing books and record, x. confirming that a participant, issuing an asset, must locate and move a position (an asset) in a segregated custody account (e.g., locked HIC account of the EOP member node), xi. confirming that the participant can only issue quantity equivalent to the position quantity locked in the segregated custody account (e.g., locked HIC account of the EOP member node), and/or xii. confirming participant's identity and signature.

For example, one or more SESCs (e.g., smart contracts) may include self-executing code directed to verifying settlement conditions such as, but not limited to:

v. checking if asset tokens with a given CUSIP and quantity are owned and available with a lender party, and/or vi. checking if the available token quantity is greater than required quantity, it would split the token amount into, for example without limitation, two asset token sub-amounts.

In some embodiments, sub-entity A 501A and sub-entity B 501B are committed to the paired operation-reverse operation exchange. This triggers the initial sale and transfer or settlement phase of the transaction.

In some embodiments, the repo smart contract and the reverse repo smart contract are submitted to the position ledger 527. As a result, tokens assigned to the long box A 528A of sub-entity A 501A are reassigned, and thus transferred, to the long box B 528B of sub-entity B 501B according to the reallocation of position in the position ledger 527.

In some embodiments, the repo smart contract may trigger a reverse allocation of the position in the asset via a second token based on a a change in cash position on the position ledger 527. For example, in response to the reallocation of the asset to the long box B 528B, the smart contract may issue a cash credit instruction to sub-entity B 501B and a corresponding cash debit instruction to sub-entity A 501A in order to reallocation position in a cash token from sub-entity B cash position 527D on the position ledger 527 to sub-entity A cash position 527C. Thus, in response to the operation to transfer a token of a position in an asset, a second asset position is transferred in response. This exchange of assets, while illustrated here with a first token and cash, may be performed with any tokenized asset. As a result, the custodian may track and verify the operation for the exchange of tokens on the BLR layer 520 via the position ledger 527, including enabling asset transfer and cash transfer, thus recording to the movement on the position ledger 527 for verifiable and immutable segregation, collateralization and movement of tokenized assets for the opening leg of the paired operation-reverse operation exchange. Accordingly, the position ledger 527 may facilitate collateralization while maintaining the physical assets at the unified box, thus reducing resources in transfer the asset while also reducing vectors for attach and fraud.

In some embodiments, movement of the collateral to sub-entity B's 501B long box 528B triggers the creation of a digital representation of the collateral on the position ledger 527 and the sending of a settlement notification from the DLR system 500 to the parties confirming that the collateral has been allocated from sub-entity A 501A to sub-entity B 501B.

In some embodiments, a closing leg of the paired operation-reverse operation exchange may be triggered based on the reverse smart contract terms. The closing leg mirrors the opening leg except the entities are switched, in that sub-entity B 501B is holder of the collateralized token for transfer into the long box A 528A to sub-entity A 501A based on the reverse repo smart contract rather than the repo smart contract. Thus, sub-entity A 501A is instructed to pay the second asset back to sub-entity B 501B.

In some embodiments, the DLR system 500 may also send a settlement notification and represents on the ledger that the collateral and cash have been allocated to the appropriate parties.

Figure 6:
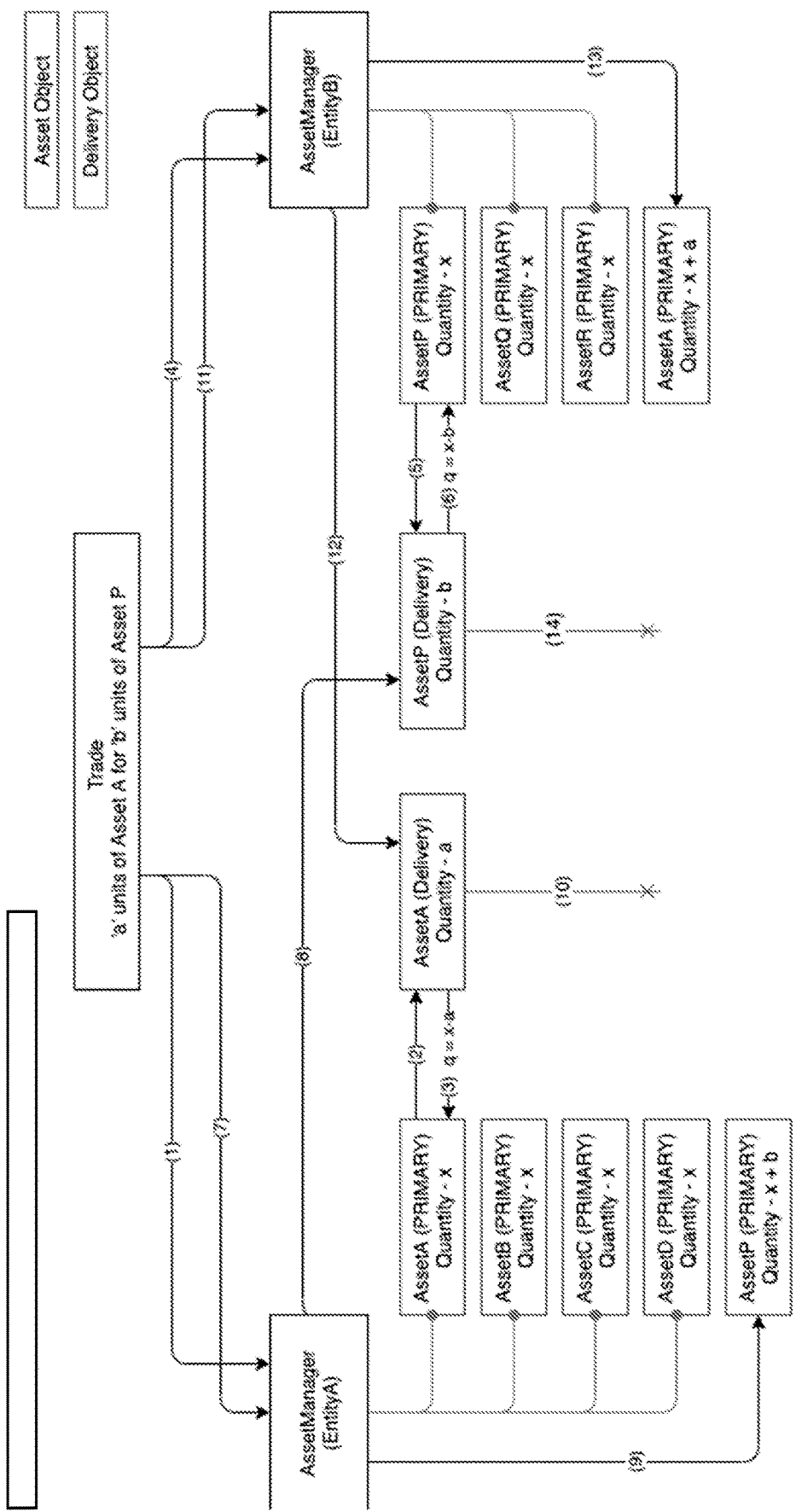

FIG. 6 depicts a block diagram of an automated execution of a single asset repurchase transaction using the system for distributed ledger based repurchase transaction execution in accordance with aspects of embodiments of the present disclosure.

determining, by the at least one processor, a first token stored amount of the first token type in a first token storage associated with the first client device;

generating, by the at least one processor, a segregated first token type having the first token transfer amount;

generating, by the at least one processor, a stored first token type having an updated first token stored amount of the first token stored amount less the first token transfer amount;

deleting, by the at least one processor, the first token stored amount of the first token type from the first token storage;

adding, by the at least one processor, the updated first token stored amount to the first token storage; and transferring, by the at least one processor, the first token transfer amount of the first token type into a first segregated token storage.

In some embodiments, an exchange of tokenized assets may include smart contracts configured to segregate a position in an asset to generate a new token for the position to be delivered to a receiving entity. In some embodiments, a Trade smart contract may specify 'a' units of Asset A to be traded for "b" units of Asset P. In some embodiments, the Trade smart contract may be configured to execute the trade by engaging AssetManager(EntityA) managing the assets (e.g., similar to the Asset Manager of FIG. 2 above) for Entity A in the trade, and AssetManager(EntityB) managing the assets for Entity B.

In some embodiments, Entity A may have tokenized assets recording in the DLT of the DLR system, including, e.g., AssetA(Primary), AssetB(Primary), AssetC(Primary) and AssetD(Primary), each with a recorded quantity x. Similarly, Entity B may have tokenized assets recording in the DLT of the DLR system, including, e.g., AssetP(Primary), AssetQ(Primary) and AssetR(Primary), each with a recorded quantity x. In order to move the 'a' units of Asset A to Entity B, and the 'b' units of Asset P to Entity A, the smart contract may cause the DLR to first instruct AssetManager(EntityA) to create a Delivery(AssetA*a) token. The Delivery(AssetA*a) token includes splitting 'a' units of AssetA(Primary) and create AssetA(Delivery). Once the AssetA(Delivery) is created, the Quantity 'q' of AssetA is updated as 'x' less the 'a' units. Thus, the AssetManager (EntityA) reallocates position in AssetA(Primary) to a new token representing a delivery token of AssetA having 'a' units.

Similarly, in order to move the 'b' units of Asset B to Entity A, and the 'a' units of Asset A to Entity B, the smart contract may cause the DLR to first instruct AssetManager (EntityB) to create a Delivery(AssetP*b) token. The Delivery(AssetP*b) token includes splitting 'b' units of AssetP (Primary) and create AssetP(Delivery). Once the AssetP (Delivery) is created, the Quantity 'q' of AssetP is updated as 'x' less the 'b' units. Thus, the AssetManager(EntityB) reallocates position in AssetP(Primary) to a new token representing a delivery token of AssetP having 'b' units.

In some embodiments, to execute the trade, AssetA(Delivery) is delivered to the AssetManager(EntityB), and the AssetP(Delivery) is delivered to the AssetManager(EntityA). In some embodiments, AssetManager(EntityA) may accept receipt of AssetP(Delivery) by conducting a look-up for AssetP(Primary). Where AssetP(Primary) exists, the AssetManager(EntityA) may simply allocated the 'b' units of AssetP(Delivery) to the AssetP(Primary). However, where AssetP(Primary does not yet exist, AssetManager (EntityA) may generate a new token in the ledger for Entity A for AssetP(Primary).

AssetP(Delivery) may then be merged in the Entity A position in Asset P on the ledger. To do so, the AssetManager (EntityA) may add the 'b' units of AssetP(Delivery) to update the quantity 'x' of AssetP(Primary) to add 'b' units. AssetManager(EntityA) may then archive and decommission AssetP(Delivery).

Similarly, in some embodiments, AssetManager(EntityB) may accept receipt of AssetA(Delivery) by conducting a look-up for AssetA(Primary). Where AssetA(Primary) exists, the AssetManager(EntityB) may simply allocated the 'a' units of AssetA(Delivery) to the AssetA(Primary). However, where AssetA(Primary does not yet exist, AssetManager(EntityB) may generate a new token in the ledger for Entity B for AssetA(Primary).

AssetA(Delivery) may then be merged in the Entity B position in Asset A on the ledger. To do so, the AssetManager (EntityB) may add the 'a' units of AssetA(Delivery) to update the quantity 'x' of AssetA(Primary) to add 'a' units. AssetManager(EntityB) may then archive and decommission As setA(Delivery).

Figure 7:
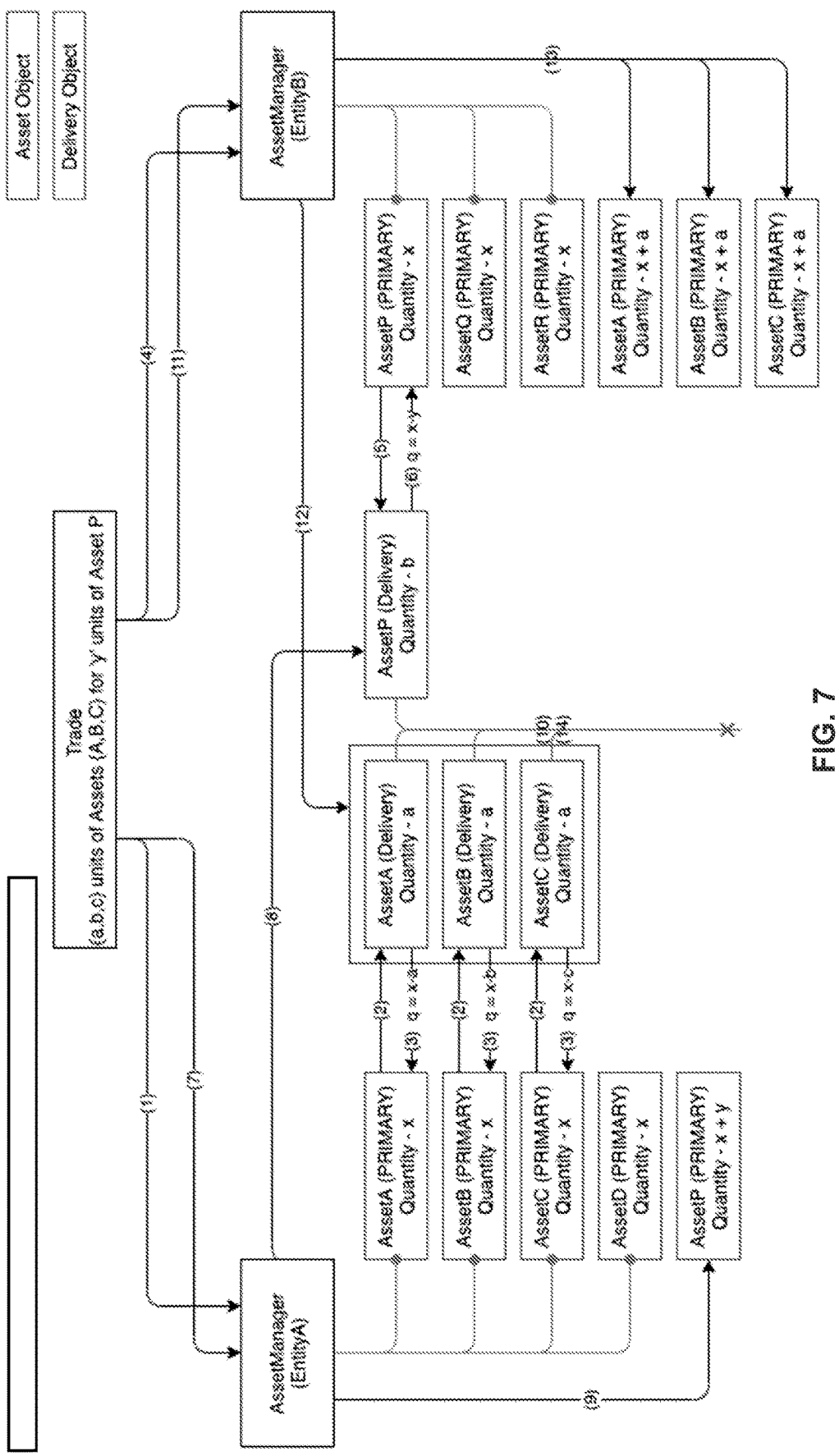

FIG. 7 depicts a block diagram of an automated execution of a mulit-asset repurchase transaction using the system for distributed ledger based repurchase transaction execution in accordance with aspects of embodiments of the present disclosure.

In some embodiments, an exchange of tokenized assets may include smart contracts configured to segregate a position in an asset to generate a new token for the position to be delivered to a receiving entity. In some embodiments, a Trade smart contract may specify 'a' units of Asset A, 'b' units of Asset B and 'c' units of Asset C to be traded for y units of Asset P. In some embodiments, the Trade smart contract may be configured to execute the trade by engaging AssetManager(EntityA) managing the assets (e.g., similar to the Asset Manager of FIG. 2 above) for Entity A in the trade, and AssetManager(EntityB) managing the assets for Entity B.

In some embodiments, Entity A may have tokenized assets recording in the DLT of the DLR system, including, e.g., AssetA(Primary), AssetB(Primary), AssetC(Primary) and AssetD(Primary), each with a recorded quantity x. Similarly, Entity B may have tokenized assets recording in the DLT of the DLR system, including, e.g., AssetP(Primary), AssetQ(Primary) and AssetR(Primary), each with a recorded quantity x. In order to move the 'a' units of Asset A to Entity B, and the 'y' units of Asset P to Entity A, the smart contract may cause the DLR to first instruct AssetManager(EntityA) to create a Delivery(AssetA*a) token, a Delivery(AssetB*b) token and a Delivery(AssetC*c) token.

The Delivery(AssetA*a) token includes splitting 'a' units of AssetA(Primary) and create AssetA(Delivery). Once the AssetA(Delivery) is created, the Quantity 'q' of AssetA is updated as 'x' less the 'a' units. Thus, the AssetManager (EntityA) reallocates position in AssetA(Primary) to a new token representing a delivery token of AssetA having 'a' units.

The Delivery(AssetB*b) token includes splitting 'b' units of AssetB(Primary) and create AssetB(Delivery). Once the AssetB(Delivery) is created, the Quantity 'q' of AssetB is updated as 'x' less the 'b' units. Thus, the AssetManager (EntityA) reallocates position in AssetB(Primary) to a new token representing a delivery token of AssetB having 'b' units.

The Delivery(AssetC*c) token includes splitting 'c' units of AssetC(Primary) and create AssetC(Delivery). Once the AssetC(Delivery) is created, the Quantity 'q' of AssetC is updated as 'x' less the 'c' units. Thus, the AssetManager (EntityA) reallocates position in AssetC(Primary) to a new token representing a delivery token of AssetC having 'c' units.

Similarly, in order to move the 'y' units of Asset B to Entity A, and the 'a' units of Asset A to Entity B, the smart contract may cause the DLR to first instruct AssetManager (EntityB) to create a Delivery(AssetP*b) token. The Delivery(AssetP*b) token includes splitting 'y' units of AssetP (Primary) and create AssetP(Delivery). Once the AssetP (Delivery) is created, the Quantity 'q' of AssetP is updated as 'x' less the 'y' units. Thus, the AssetManager(EntityB) reallocates position in AssetP(Primary) to a new token representing a delivery token of AssetP having 'y' units.

In some embodiments, to execute the trade, AssetA(Delivery), AssetB(Delivery) and AssetC(Delivery) are delivered to the AssetManager(EntityB), and the AssetP(Delivery) is delivered to the AssetManager(EntityA). In some embodiments, AssetManager(EntityA) may accept receipt of AssetP(Delivery) by conducting a look-up for AssetP (Primary). Where AssetP(Primary) exists, the AssetManager (EntityA) may simply allocated the 'y' units of AssetP (Delivery) to the AssetP(Primary). However, where AssetP (Primary does not yet exist, AssetManager(EntityA) may generate a new token in the ledger for Entity A for AssetP (Primary).

AssetP(Delivery) may then be merged in the Entity A position in Asset P on the ledger. To do so, the AssetManager (EntityA) may add the 'y' units of AssetP(Delivery) to update the quantity 'x' of AssetP(Primary) to add 'y' units. AssetManager(EntityA) may then archive and decommission AssetP(Delivery).

Similarly, in some embodiments, AssetManager(EntityB) may accept receipt of AssetA(Delivery), AssetB(Delivery) and AssetC(Delivery) by conducting a look-up for AssetA (Primary), AssetB(Primary) and AssetC(Primary). Where AssetA(Primary), AssetB(Primary) and AssetC(Primary) exist, the AssetManager(EntityB) may simply allocated the units of AssetA(Delivery), AssetB(Delivery) and AssetC (Delivery) to the AssetA(Primary), AssetB(Primary) and AssetC(Primary), respectively. However, where any one or more of AssetA(Primary), AssetB(Primary) and AssetC(Primary) do not yet exist, AssetManager(EntityB) may generate new tokens in the ledger for Entity B for the asset or assets that do not yet exist.

AssetA(Delivery) may then be merged in the Entity B position in Asset A on the ledger. To do so, the AssetManager( ) may add the 'a' units of AssetA(Delivery) to update the quantity 'x' of AssetA(Primary) to add 'a' units. AssetManager(EntityB) may then archive and decommission AssetA(Delivery).

AssetB(Delivery) may be merged in the Entity B position in Asset B on the ledger. To do so, the AssetManager (EntityB) may add the 'b' units of AssetB(Delivery) to update the quantity 'x' of AssetB(Primary) to add 'b' units. AssetManager(EntityB) may then archive and decommission As setB (Delivery). AssetC(Delivery) may be merged in the Entity B position in Asset C on the ledger. To do so, the AssetManager(EntityB) may add the 'c' units of AssetC (Delivery) to update the quantity 'x' of AssetC(Primary) to add 'c' units. AssetManager(EntityB) may then archive and decommission As setC(Delivery).

Figure 8:
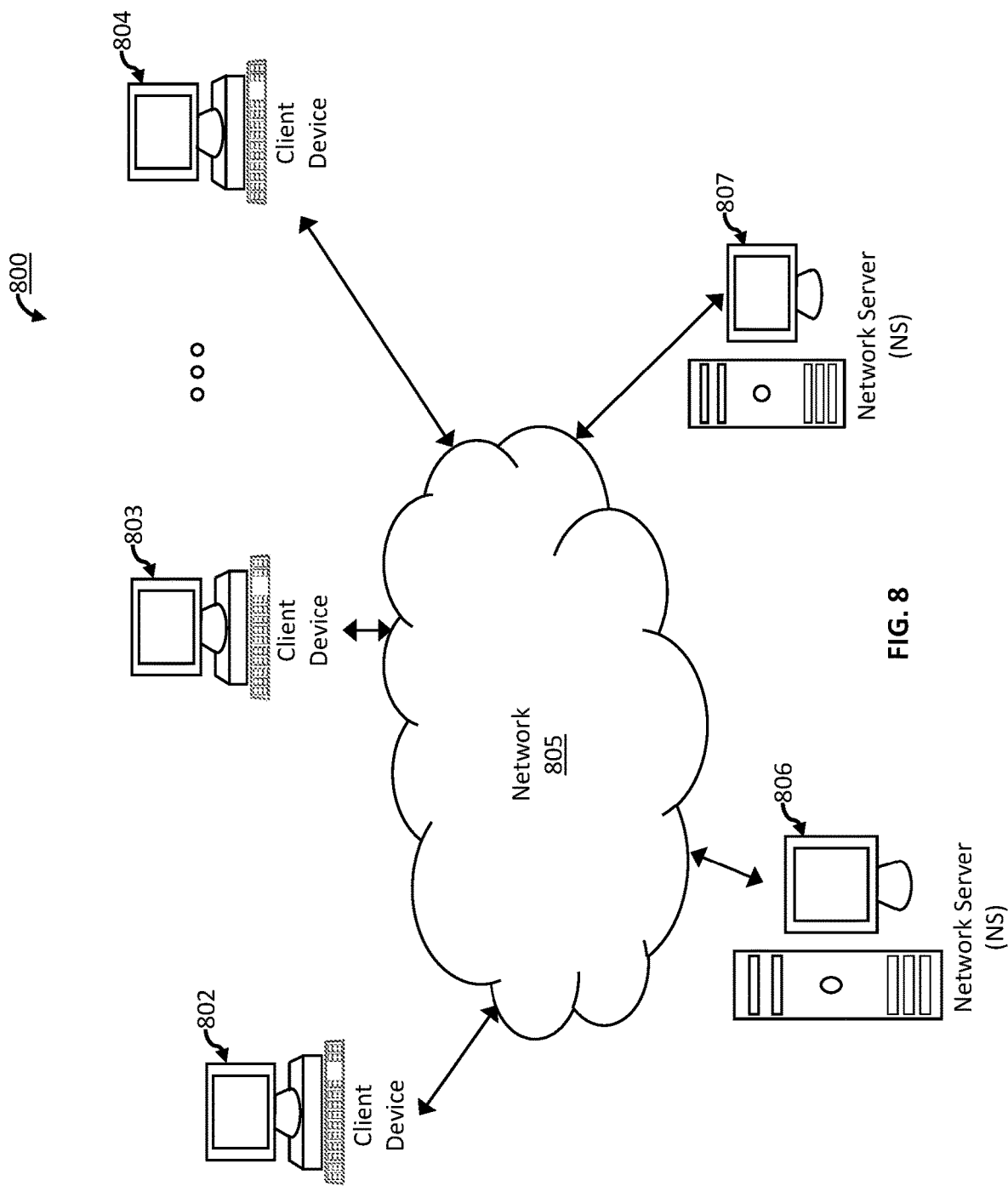

FIG. 8 depicts a block diagram of an exemplary computer-based system and platform 800 in accordance with one or more embodiments of the present disclosure.

However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 800 may be configured to manage a large number of members and concurrent transactions, as detailed herein. In some embodiments, the exemplary computer-based system and platform 800 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 8, member computing device 802, member computing device 803 through member computing device 804 (e.g., clients) of the exemplary computer-based system and platform 800 may include virtually any computing device capable of receiving and sending a message over a network (e.g., cloud network), such as network 805, to and from another computing device, such as servers 806 and 807, each other, and the like. In some embodiments, the member devices 802-804 may be personal computers, multiprocessor systems, microprocessor-based or programmable consumer electronics, network PCs, and the like. In some embodiments, one or more member devices within member devices 802-804 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 802-804 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 802-804 may include may run one or more applications, such as Internet browsers, mobile applications, voice calls, video games, videoconferencing, and email, among others. In some embodiments, one or more member devices within member devices 802-804 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 802-804 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 802-804 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 805 may provide network access, data transport and/or other services to any computing device coupled to it. In some embodiments, the exemplary network 805 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 805 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 805 may include and implement, as an alternative or in conjunction with one or more of the above, a WiMAX architecture defined by the WiMAX forum. In some embodiments and, optionally, in combination of any embodiment described above or below, the exemplary network 805 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 805 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 805 may also include mass storage, such as network attached storage (NAS), a storage area network (SAN), a content delivery network (CDN) or other forms of computer or machine readable media.

In some embodiments, the exemplary server 806 or the exemplary server 807 may be a web server (or a series of servers) running a network operating system, examples of which may include but are not limited to Apache on Linux or Microsoft IIS (Internet Information Services). In some embodiments, the exemplary server 806 or the exemplary server 807 may be used for and/or provide cloud and/or network computing. Although not shown in FIG. 8, in some embodiments, the exemplary server 806 or the exemplary server 807 may have connections to external systems like email, SMS messaging, text messaging, ad content providers, etc. Any of the features of the exemplary server 806 may be also implemented in the exemplary server 807 and vice versa.

In some embodiments, one or more of the exemplary servers 806 and 807 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 801-804.

In some embodiments and, optionally, in combination of any embodiment described above or below, for example, one or more exemplary computing member devices 802-804, the exemplary server 806, and/or the exemplary server 807 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 9:
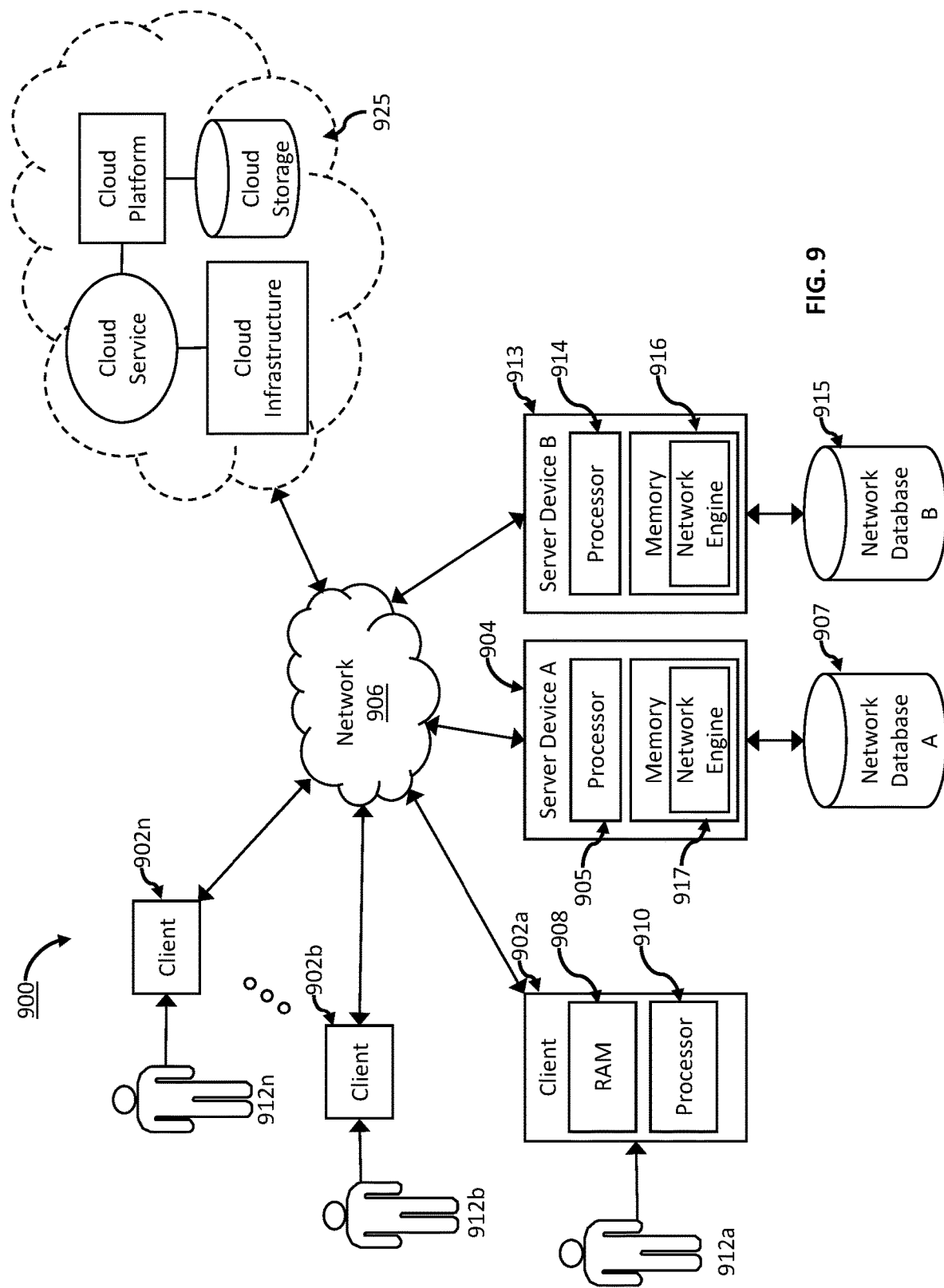

FIG. 9 depicts a block diagram of another exemplary computer-based system and platform 900 in accordance with one or more embodiments of the present disclosure.

However, not all of these components may be required to practice one or more embodiments, and variations in the arrangement and type of the components may be made without departing from the spirit or scope of various embodiments of the present disclosure. In some embodiments, the member computing devices 902a, 902b thru 902n shown each at least includes a computer-readable medium, such as a random-access memory (RAM) 908 coupled to a processor 910 or FLASH memory. In some embodiments, the processor 910 may execute computer-executable program instructions stored in memory 908. In some embodiments, the processor 910 may include a microprocessor, an ASIC, and/or a state machine. In some embodiments, the processor 910 may include, or may be in communication with, media, for example computer-readable media, which stores instructions that, when executed by the processor 910, may cause the processor 910 to perform one or more steps described herein. In some embodiments, examples of computer-readable media may include, but are not limited to, an electronic, optical, magnetic, or other storage or transmission device capable of providing a processor, such as the processor 910 of client 902a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 902a through 902n may also comprise a number of external or internal devices such as a mouse, a CD-ROM, DVD, a physical or virtual keyboard, a display, or other input or output devices. In some embodiments, examples of member computing devices 902a through 902n (e.g., clients) may be any type of processor-based platforms that are connected to a network 906 such as, without limitation, personal computers, digital assistants, personal digital assistants, smart phones, pagers, digital tablets, laptop computers, Internet appliances, and other processor-based devices. In some embodiments, member computing devices 902a through 902n may be specifically programmed with one or more application programs in accordance with one or more principles/methodologies detailed herein. In some embodiments, member computing devices 902a through 902n may operate on any operating system capable of supporting a browser or browser-enabled application, such as Microsoft™ Windows™, and/or Linux. In some embodiments, member computing devices 902a through 902n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 902a through 902n, users, 912a through 902n, may communicate over the exemplary network 906 with each other and/or with other systems and/or devices coupled to the network 906. As shown in FIG. 9, exemplary server devices 904 and 913 may be also coupled to the network 906. In some embodiments, one or more member computing devices 902a through 902n may be mobile clients.

In some embodiments, at least one database of exemplary databases 907 and 915 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 10:
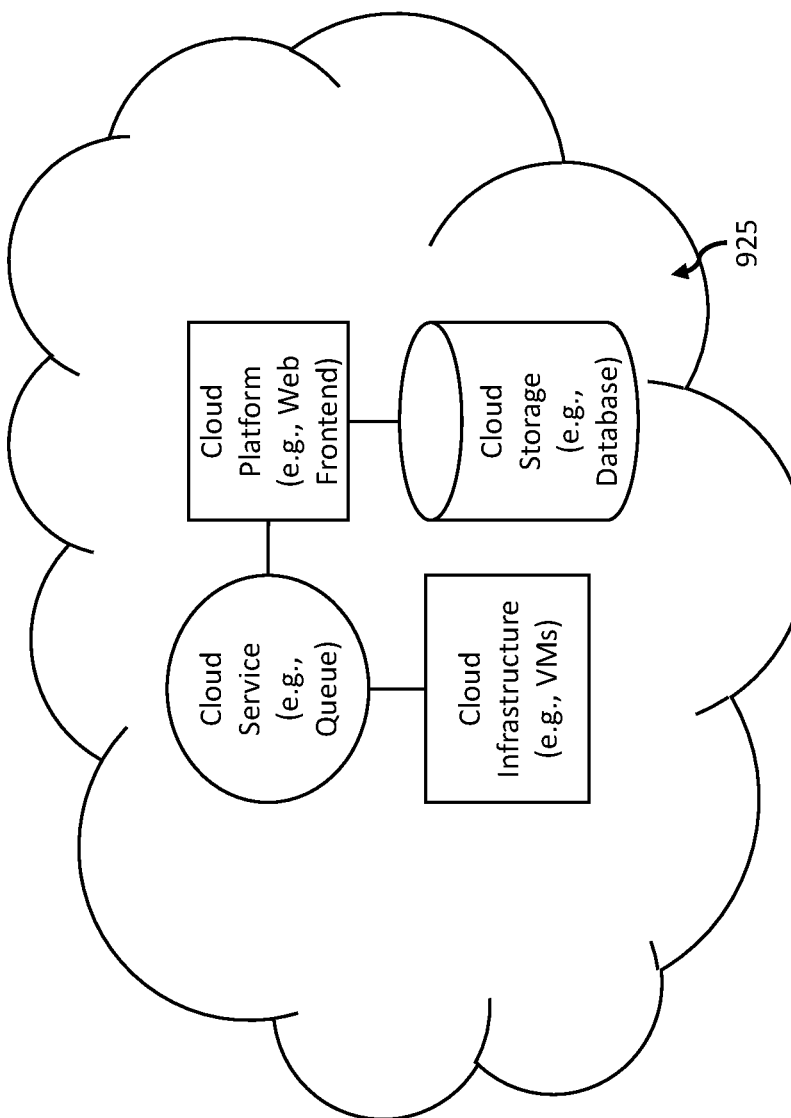
Figure 11:
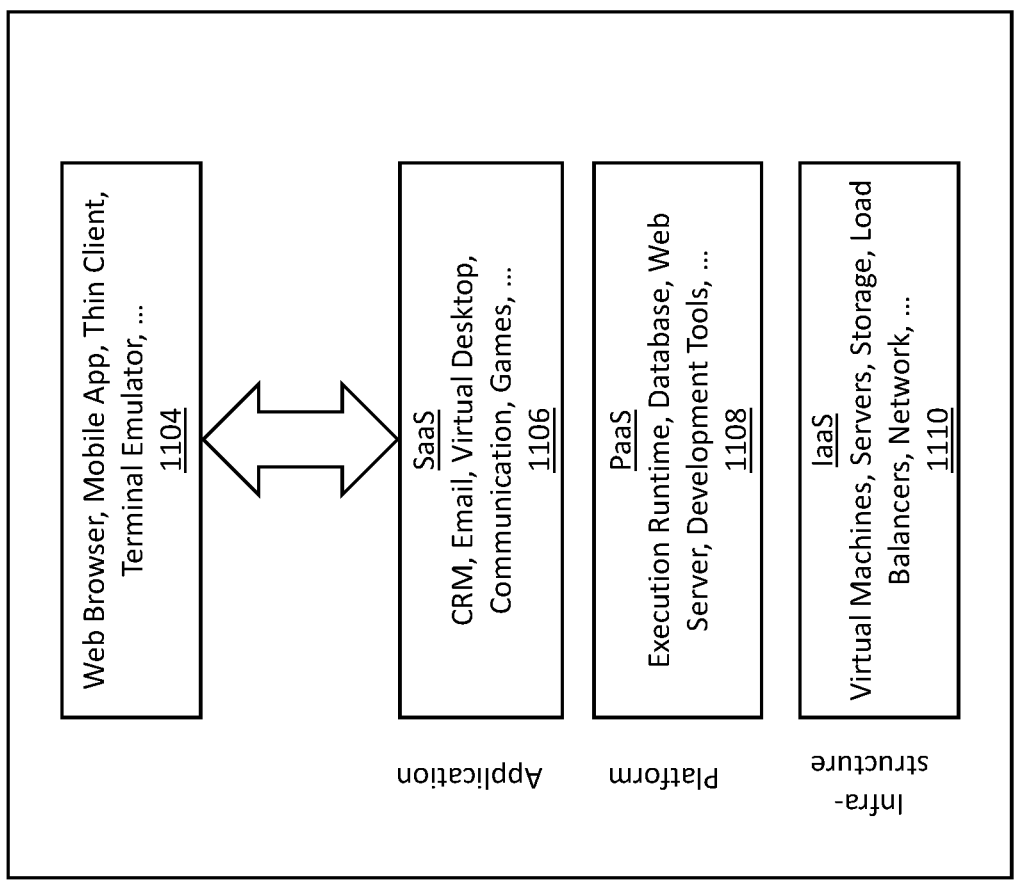

In some embodiments, the exemplary inventive computer-based systems/platforms, the exemplary inventive computer-based devices, and/or the exemplary inventive computer-based components of the present disclosure may be specifically configured to operate in a cloud computing/architecture 925 such as, but not limiting to: infrastructure a service (IaaS) 1110, platform as a service (PaaS) 1108, and/or software as a service (SaaS) 1106 using a web browser, mobile app, thin client, terminal emulator or other endpoint 1104. FIGS. 10 and 11 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, an activity initiation request from a first client device associated with a first user;
wherein the activity initiation request comprises:
at least one operation on a blockchain for exchange of a first token type for a second token type, and
at least one reverse operation on the blockchain for exchange of the second token type for the first token type upon at least one condition being satisfied;
wherein the first client device is a node on the blockchain;
generating, by the at least one processor, at least one self-executing software container (SESC) on the blockchain;
wherein the at least one SESC comprises a plurality of instructions for execution of the at least one operation and the at least one reverse operation based at least in part on the at least one condition;
wherein the plurality of instructions of the at least one SESC is configured to cause the at least one processor to:
detect a transfer of the first token type into at least one segregated token storage;
wherein the first client device has permissions to access the at least one segregated token storage;
detecting, by the at least one processor, a transfer of the second token type from a second token storage associated with the second client device to a first token storage associated with the first client device;
automatically locking, by the at least one processor, access to the first token type in the at least one segregated token storage according to condition-dependent permissions in response to the transfer of the second token type;
wherein the second client device has the condition-dependent permissions to access the first token type in the at least one segregated token storage;
detecting, by the at least one processor, the at least one reverse operation matching the at least one condition;
automatically unlocking, by the at least one processor and in response to the detected at least one reverse operation of the first token type, access to the first token type in the at least one segregated token storage for access by the first client device; and
displaying, via the first client device, a rendering of a token return notification associated with the first token type.

2. The method of claim 1, wherein the activity initiation request comprises activity parameters comprising at least one of:
a first token transfer amount associated with the first token type,
a second token transfer amount associated with the second token type, at least one condition identifier identifying the at least one condition,
a time identifier identifying a time limit to satisfy the at least one condition, a first client device identifier identifying the first client device, and
a second client device identifier identifying the second client device.

3. The method of claim 2, further comprising:
generating, by the at least one processor, at least one instruction of the plurality of instructions based at least in part on each activity parameter of the activity parameters; and
generating, by the at least one processor, the at least one SESC based at least in part on the plurality of instructions.

4. The method of claim 2, further comprising:
determining, by the at least one processor, a first token stored amount of the first token type in a first token storage associated with the first client device;
generating, by the at least one processor, a segregated first token type having the first token transfer amount;
generating, by the at least one processor, a stored first token type having an updated first token stored amount of the first token stored amount less the first token transfer amount; deleting, by the at least one processor, the first token stored amount of the first token type from the first token storage;
adding, by the at least one processor, the updated first token stored amount to the first token storage; and
transferring, by the at least one processor, the first token transfer amount of the first token type into a first segregated token storage.

5. The method of claim 1, further comprising:
receiving, by the at least one processor, an asset-linked data segregation message comprising an indication of a movement of a first asset-linked data into the first segregated data structure; and
generating, by the at least one processor, the first token type in the first segregated token storage to represent the first asset-linked data in the first segregated data structure.

6. The method of claim 1, further comprising:
receiving, by the at least one processor, an asset-linked data provision message comprising an indication of a provision of a second asset-linked data in a second client data structure; wherein the second client data structure comprises a schema configured to store the second asset-linked data; and
generating, by the at least one processor, the second token type in a second client token storage to represent the second asset-linked data in the second client data structure.

7. The method of claim 1, wherein the first client device, the second client device and the first segregated token storage are associated with a particular entity; and
wherein the first segregated token storage and the second segregated token storage are the same segregated token storage.

8. The method of claim 1, further comprising instructing, by the at least one processor, at least one display associated with the first client device to render a second token type receipt notification indicating receipt of the second token type in the first token storage.

9. The method of claim 8, further comprising:
receiving, by the at least one processor, at least one first token type return request from the first client device;
wherein the first token type return request comprises a return of the second token type according to the at least one condition; and
initiating, by the at least one processor, the at least one reverse operation.

10. The method of claim 1, further comprising instructing, by the at least one processor, at least one display associated with the first client device to render a first token type return notification indicating receipt of the first token type in the first segregated token storage.

11. A system comprising:
a non-transient computer memory, storing software instructions;
at least one processor of a computing device, the at least one processor executes software instructions, wherein the computing device is programmed to:
   receive activity initiation request from a first client device associated with a first user;
   wherein the activity initiation request comprises:
      at least one operation for exchange of a first token type for a second token type, and
      at least one reverse operation for exchange of the second token type for the first token type upon at least one condition being satisfied; wherein the first token type comprises a first cryptographic hash on a blockchain;
         wherein the second token type comprises a second cryptographic hash on the blockchain;
         wherein the first client device is a node on the blockchain;
   receive an activity initiation response from a second client device associated with a second user;
      wherein the activity initiation response indicates an acceptance of the activity initiation request, the acceptance corresponding to the at least one operation and the at least one reverse operation within the activity initiation request;
      wherein the second client device is a node on a blockchain;
   generate at least one self-executing software container (SESC) on the blockchain;
      wherein the at least one SESC comprises a plurality of instructions for execution of the at least one operation and the at least one reverse operation based at least in part on the at least one condition;
wherein the plurality of instructions of the at least one SESC is configured to:
   detect a transfer of the first token type into a first segregated token storage;
      wherein the first segregated data structure is associated with a first segregated data structure of a third-party entity;
      wherein the first client device has permissions to access the first segregated token storage;
      wherein the first segregated data structure comprises a schema configured to store the first token type;
   detect a transfer of the second token type from a second token storage associated with the second client device to a first token storage associated with the first client device;
   automatically initiate a transfer of the first token type from the first segregated data structure to a second segregated token storage in response to the transfer of the second token type;
      wherein the second segregated token storage is associated with a second segregated data structure of the third-party entity;
      wherein the second client device has condition-dependent permissions to access the second segregated token storage; wherein the first segregated data structure comprises a schema configured to store the first token type;
   detect the at least one reverse operation matching the at least one condition;
   initiate a transfer via the detected at least one reverse operation of the first token type from the second segregated token storage back to the first segregated token storage and
   display, via the first client device, a rendering of a token return notification associated with the first token type.

12. The system of claim 11, wherein the activity initiation request comprises activity parameters comprising at least one of:
   a first token transfer amount associated with the first token type,
   a second token transfer amount associated with the second token type, at least one condition identifier identifying the at least one condition,
   a time identifier identifying a time limit to satisfy the at least one condition, a first client device identifier identifying the first client device, and
   a second client device identifier identifying the second client device.

13. The system of claim 12, wherein the at least one processor is further configured to execute the software instructions which cause the at least one processor to perform steps to:
   generate at least one instruction of the plurality of instructions based at least in part on each activity parameter of the activity parameters; and
   generate the at least one SESC based at least in part on the plurality of instructions.

14. The system of claim 12, wherein the at least one processor is further configured to execute the software instructions which cause the at least one processor to perform steps to:
   determine a first token stored amount of the first token type in a first token storage associated with the first client device;
   generate a segregated first token type having the first token transfer amount;
   generate a stored first token type having an updated first token stored amount of the first token stored amount less the first token transfer amount;
   delete the first token stored amount of the first token type from the first token storage; add the updated first token stored amount to the first token storage; and
   transfer the first token transfer amount of the first token type into a first segregated token storage.

15. The system of claim 11, wherein the at least one processor is further configured to execute the software instructions which cause the at least one processor to perform steps to:
   receive an asset-linked data segregation message comprising an indication of a movement of a first asset-linked data into the first segregated data structure; and
   generate the first token type in the first segregated token storage to represent the first asset-linked data in the first segregated data structure.

16. The system of claim 11, wherein the at least one processor is further configured to execute the software instructions which cause the at least one processor to perform steps to:
   receive an asset-linked data provision message comprising an indication of a provision of a second asset-linked data in a second client data structure;
      wherein the second client data structure comprises a schema configured to store the second asset-linked data; and generate the second token type in a second client token storage to represent the second asset-linked data in the second client data structure.

17. The system of claim 11, wherein the first client device, the second client device and the third-party entity are associated with a particular entity; and
   wherein the first segregated data structure and the second segregated data structure are the same segregated data structure.

18. The system of claim 11, wherein the at least one processor is further configured to execute the software instructions which cause the at least one processor to perform steps to instruct at least one display associated with the first client device to render a second token type receipt notification indicating receipt of the second token type in the first token storage.

19. The system of claim 18, wherein the at least one processor is further configured to execute the software instructions which cause the at least one processor to perform steps to:
   receive at least one first token type return request from the first client device;
      wherein the first token type return request comprises a return of the second token type according to the at least one condition; and
   initiate the at least one reverse operation.

20. The system of claim 11, wherein the at least one processor is further configured to execute the software instructions which cause the at least one processor to perform steps to instruct at least one display associated with the first client device to render a first token type return notification indicating receipt of the first token type in the first segregated token storage.

\* \* \* \* \*